US012585803B2

(12) United States Patent
Robinson et al.

(10) Patent No.: US 12,585,803 B2
(45) Date of Patent: Mar. 24, 2026

(54) COMPUTERIZED TOOLS TO IMPLEMENT A PERMISSION WORKBENCH APPLICATION TO MODIFY SETS OF PERMISSIONS THAT PROVIDE ACCESS TO ENTERPRISE DATA OBJECTS

(71) Applicant: Certinia Inc., San Jose, CA (US)

(72) Inventors: Neil Robinson, San Francisco, CA (US); Heidi Minzner, North Andover, MA (US); Julianne Prekaski, San Francisco, CA (US); Raymond J. Ridl, Jr., San Francisco, CA (US); Paul Allen, San Francisco, CA (US); Aleksei Murashin, Harrogate (GB); Pedro Vallesquino Ruiz, San Francisco, CA (US); Farhan Sheikh, San Francisco, CA (US); Shaun Doyle, San Francisco, CA (US)

(73) Assignee: Certinia Inc., Austin, TX (US)

( * ) Notice: Subject to any disclaimer, the term of this patent is extended or adjusted under 35 U.S.C. 154(b) by 383 days.

(21) Appl. No.: 18/086,593

(22) Filed: Dec. 21, 2022

(65) Prior Publication Data

US 2024/0211958 A1    Jun. 27, 2024

(51) Int. Cl.
G06Q 30/01          (2023.01)
G06F 21/62          (2013.01)
(52) U.S. Cl.
CPC ................................ G06F 21/6209 (2013.01)
(58) Field of Classification Search
CPC ................................................. G06F 21/6209
(Continued)

(56) References Cited

U.S. PATENT DOCUMENTS 5,796,952 A     8/1998  Davis et al.
10,812,482 B1 * 10/2020  Xu ........................ G06F 21/604
(Continued)

FOREIGN PATENT DOCUMENTS

JP            2006099759 A     4/2006
WO      WO2006026686 A1     3/2006

OTHER PUBLICATIONS

Turban et al., "A Framework for Adopting Collaboration 2 tools for Virtual Group Decision Making", Group Decis Negot (2011) 20, Published online: Oct. 15, 2010, Springer Science+ Business Media B.V., pp. 137-154.

(Continued)

*Primary Examiner* — Tony Mahmoudi
(74) *Attorney, Agent, or Firm* — Carr & Ferrell LLP

(57)              ABSTRACT

Various embodiments relate generally to data science and data analysis, computer software and systems, and computing architectures and data models configured to facilitate management and performance of enterprise functions, and, more specifically, to an enterprise computing and data processing platform configured to implement applications and computerized tools configured to facilitate implementation of an enterprise data model to generate and manage component data objects representing enterprise tasks and processes, as well as portions thereof, any of which may be used to create and modify an enterprise data flow or a process flow, for example, using an enterprise computerized tool. In some examples, a method includes activating one or more applications as computerized tools to access subsets of one or more permissions, identifying an enterprise function data object to generate a third subset of permissions.

18 Claims, 36 Drawing Sheets

(58) Field of Classification Search

USPC .......................................................... 707/784

See application file for complete search history.

(56) References Cited

U.S. PATENT DOCUMENTS

| | | | |
|---|---|---|---|
| 11,294,771 B1 | 4/2022 | Chopra et al. | |
| 11,381,563 B1 * | 7/2022 | Gafa | H04W 12/64 |
| 11,837,003 B2 | 12/2023 | Arnett | |
| 2004/0027258 A1 | 2/2004 | Pechatnikov et al. | |
| 2004/0117358 A1 | 6/2004 | von Kaenel et al. | |
| 2005/0033511 A1 | 2/2005 | Pechatnikov et al. | |
| 2007/0044072 A1 | 2/2007 | Hayles | |
| 2009/0271514 A1 | 10/2009 | Thomas et al. | |
| 2012/0109835 A1 | 5/2012 | Barefoot et al. | |
| 2012/0296898 A1 | 11/2012 | Cormode et al. | |
| 2012/0311672 A1 * | 12/2012 | Connor | H04L 63/10 |
| | | | 726/4 |
| 2013/0104078 A1 | 4/2013 | Miyazaki | |
| 2014/0040058 A1 | 2/2014 | Aklian | |
| 2014/0344446 A1 | 11/2014 | Rjeili et al. | |
| 2016/0371080 A1 | 12/2016 | Rath et al. | |
| 2019/0066052 A1 | 2/2019 | Boutros et al. | |
| 2019/0258756 A1 | 8/2019 | Minwalla et al. | |
| 2021/0064771 A1 * | 3/2021 | Julaih | G06F 21/6218 |
| 2021/0103649 A1 * | 4/2021 | Korus | G06F 9/4881 |
| 2021/0150489 A1 * | 5/2021 | Haramati | G06F 16/252 |
| 2021/0390507 A1 * | 12/2021 | Reynolds | G06F 16/212 |
| 2022/0035775 A1 | 2/2022 | Sriharsha et al. | |
| 2022/0335148 A1 | 10/2022 | Gandhi et al. | |
| 2022/0358239 A1 * | 11/2022 | Borsato | G06F 21/604 |
| 2023/0196811 A1 | 6/2023 | Arnett | |
| 2024/0080360 A1 | 3/2024 | Maloo et al. | |
| 2024/0211957 A1 | 6/2024 | Robinson | |
| 2024/0211959 A1 | 6/2024 | Sheikh | |
| 2025/0103747 A1 * | 3/2025 | Norcross | G06F 21/602 |

OTHER PUBLICATIONS

Yildiz et al., "A Knowledge-Based Risk Mapping Tool for Cost Estimation of International Construction Projects," 1 Department of Civil Engineering, Middle East Techinical University, Turkey, Automation in Construction 43 (2014), Aprli 3, 2014, pp. 144-155.

* cited by examiner

300

400

500

600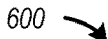
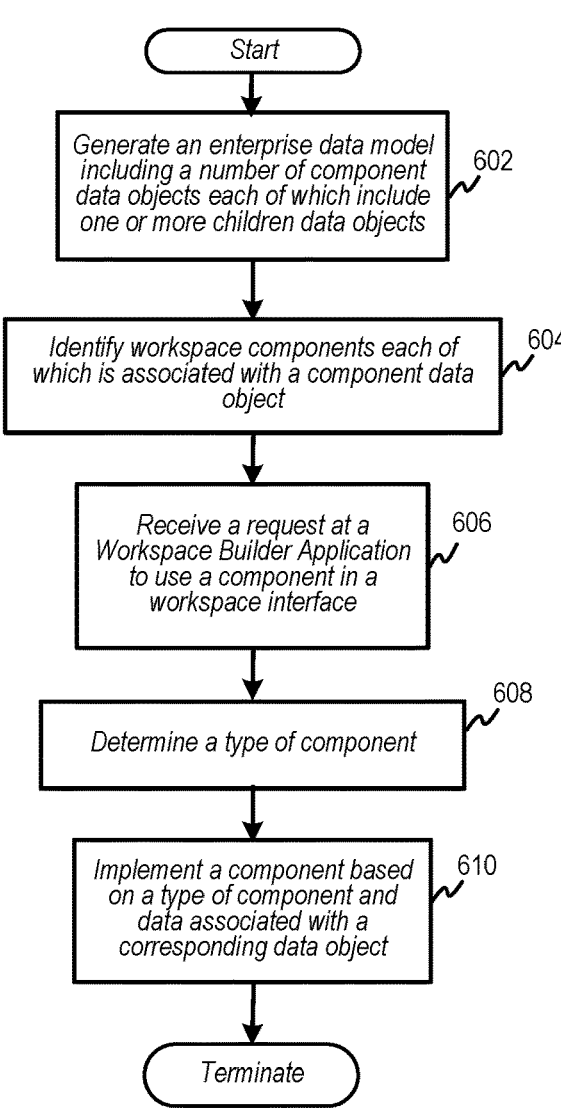
FIG. 6

700

1400

Workspace Interface
1450

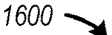

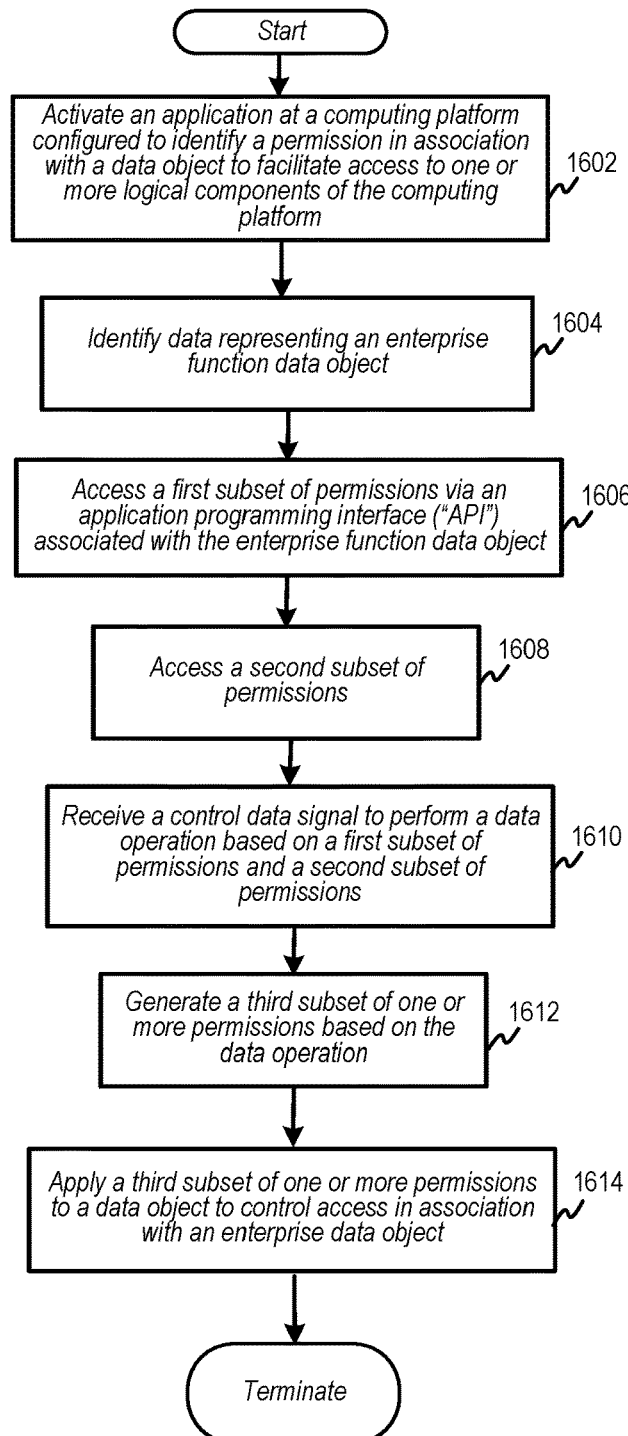

1600

Start

Activate an application at a computing platform configured to identify a permission in association with a data object to facilitate access to one or more logical components of the computing platform                    1602

Identify data representing an enterprise function data object                    1604

Access a first subset of permissions via an application programming interface ("API") associated with the enterprise function data object                    1606

Access a second subset of permissions                    1608

Receive a control data signal to perform a data operation based on a first subset of permissions and a second subset of permissions                    1610

Generate a third subset of one or more permissions based on the data operation                    1612

Apply a third subset of one or more permissions to a data object to control access in association with an enterprise data object                    1614

Terminate

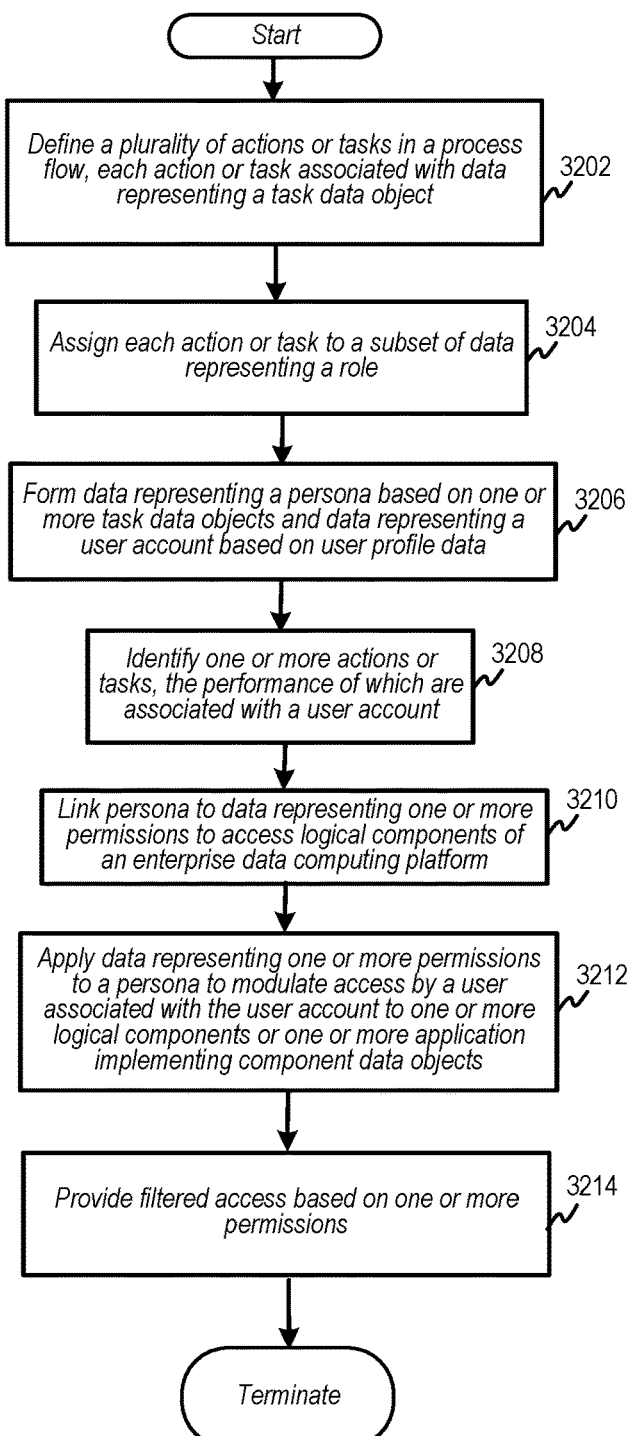

3200

Start

Define a plurality of actions or tasks in a process flow, each action or task associated with data representing a task data object 3202

Assign each action or task to a subset of data representing a role 3204

Form data representing a persona based on one or more task data objects and data representing a user account based on user profile data 3206

Identify one or more actions or tasks, the performance of which are associated with a user account 3208

Link persona to data representing one or more permissions to access logical components of an enterprise data computing platform 3210

Apply data representing one or more permissions to a persona to modulate access by a user associated with the user account to one or more logical components or one or more application implementing component data objects 3212

Provide filtered access based on one or more permissions 3214

Terminate

| Computing Device 3505 | Mobile Computing Device 3506 | Wearable Computing Device 3507 |
|---|---|---|

Network(s)
3510

Server
3515

Enterprise Data Computing Platform

3550

Data Store
3516

| Web Application 3524 | Electronic Mail Application 3526 | Electronic Messaging Application 3528 | Social Networking Services 3530 | Directory Services 3532 |
|---|---|---|---|---|

COMPUTERIZED TOOLS TO IMPLEMENT A PERMISSION WORKBENCH APPLICATION TO MODIFY SETS OF PERMISSIONS THAT PROVIDE ACCESS TO ENTERPRISE DATA OBJECTS

CROSS-REFERENCE TO APPLICATIONS

This nonprovisional application is related to U.S. patent applications having U.S. patent application Ser. No. 18/086, 591, filed Dec. 21, 2022 and entitled "COMPUTERIZED TOOLS TO ACCESS AN ENTERPRISE DATA MODEL FOR IMPLEMENTING COMPONENT DATA OBJECTS" and U.S. patent Application Ser. No. 18/086,596, filed Dec. 21, 2022 and entitled "COMPUTERIZED TOOLS TO IMPLEMENT A PERSONA BUILDER APPLICATION TO MODIFY ACCESS TO LOGICAL COMPONENTS OF AN ENTERPRISE COMPUTING PLATFORM," all of which are herein incorporated by reference in their entirety for all purposes.

FIELD

Various embodiments relate generally to data science and data analysis, computer software and systems, and computing architectures and data models configured to facilitate management and performance of enterprise functions, and, more specifically, to an enterprise computing and data processing platform configured to implement applications and computerized tools configured to facilitate implementation of an enterprise data model to generate and manage component data objects representing enterprise tasks and processes, as well as portions thereof, any of which may be used to create and modify an enterprise data flow or a process flow, for example, using an enterprise computerized tool.

BACKGROUND

Advances in computing hardware and software have fueled exponential growth in analyzing and managing various constituent processes and functions of enterprises, as well as other organizations. For example, computing methodologies and architectures have been developed to implement customer relationship management ("CRM") technologies. Further advancements led to development of software and computing platforms configured to implement enterprise resource planning ("ERP") technologies to further enhance management of business processes.

An aim of conventional enterprise-related software and computing processes is to drive enterprise processes and workflows to accomplish tasks, at the expense of diminished focus on the various disparate enterprise activities and computing platforms necessary to complete such tasks. For example, an enterprise (or any organization or entity) may traditionally provide any number of services as projects (e.g., specialized resources to implement a computing solution, etc.), deliver any number of tangible items, goods, or products (e.g., computing devices, software products, etc.), manage any number of licenses or subscriptions (e.g., software licenses or subscriptions), and perform any number of other tasks that might otherwise risk operation of an enterprise or an organization as, for example, a customer. Usually, known enterprise-related software and computing processes are typically not well-suited to accurately manage the aforementioned enterprise functions to avoid risk to the enterprise, its internal business process, and its financial health.

Adoption and implementation of software-as-a-service ("SaaS") occurs in many industries including high-tech, software, professional services, and many other fields of endeavor. As an example, business-to-business ("B2B") enterprises and organizations optimize types of offerings, pricing, promotions, and the like, which increases the burden of managing operations of an enterprise to provide products and/or services based on the traditional SaaS model. Also, transparency between "front office" (e.g., sales) and "back office" (e.g., finance) functional activities is generally lacking to effectively correct enterprise processes to avoid or mitigate risk as to meeting key performance indicator metrics.

Also, an enterprise providing, selling, or licensing a software product conventionally provides more than the software product itself. For example, an enterprise may not only purchase or sell software as a service ("SaaS"), but may also provide professional services for implementation, training, and other managed services or ancillary products. Typically, a relationship with a customer is initiated through a selling process, and continues throughout multiple years of activity, any of which may be subject to contractual terms that drives the processes of an enterprise to fulfill its commitment to a customer.

Given the drawbacks of the various conventional enterprise-related software and computing processes, in view of the increasing complexity of managing and implementing enterprise data, enterprises are at risk of attrition, cancellations, and loss of customers.

Further, traditional computerized tools and applications provided by typical customer relationship management ("CRM") platforms can have a degree of flexibility in use, such as the implementation of "page layouts." But inherent flexibility causes difficulties as applied to enterprise resource planning ("ERP") technologies, such as managing versioning or upgrades in enterprise applications in view of underlying CRM applications. An abundance of flexibility in ERP and CRM applications, and interactions that may be a combination thereof, may cause various non-standardized workflows that will degenerate such that benefits of the CRM application are reduced. Further, consumers of enterprise resource planning software services typically are challenged to adapt conventional enterprise applications, such as on a per-user basis, to personalized experiences relevant to a role or function within an organization and its computerized process flows.

Thus, what are needed are one or more solutions to create, adapt, configure, manage, and provide enterprise applications and services that facilitate efficient and expeditious deployment of computerized tools targeted to a corresponding role or process while enhancing security, without the limitations of conventional techniques.

BRIEF DESCRIPTION OF THE DRAWINGS

Various embodiments or examples ("examples") of the invention are disclosed in the following detailed description and the accompanying drawings:

FIG. 6 is a flow diagram as another example of implementing a workspace application as a computerized tool to manage enterprise data, according to some embodiments;

FIG. 16 is a flow diagram as an example of implementing an application configured to configure, manage, and identify data representing permissions associated with one or more data objects configured to manage enterprise processes, according to some embodiments;

FIG. 32 is a flow diagram as another example of implementing an application configured to configure, manage, and identify data representing personas associated with one or more data objects configured to manage enterprise processes, according to some embodiments;

DETAILED DESCRIPTION

Figure 1:
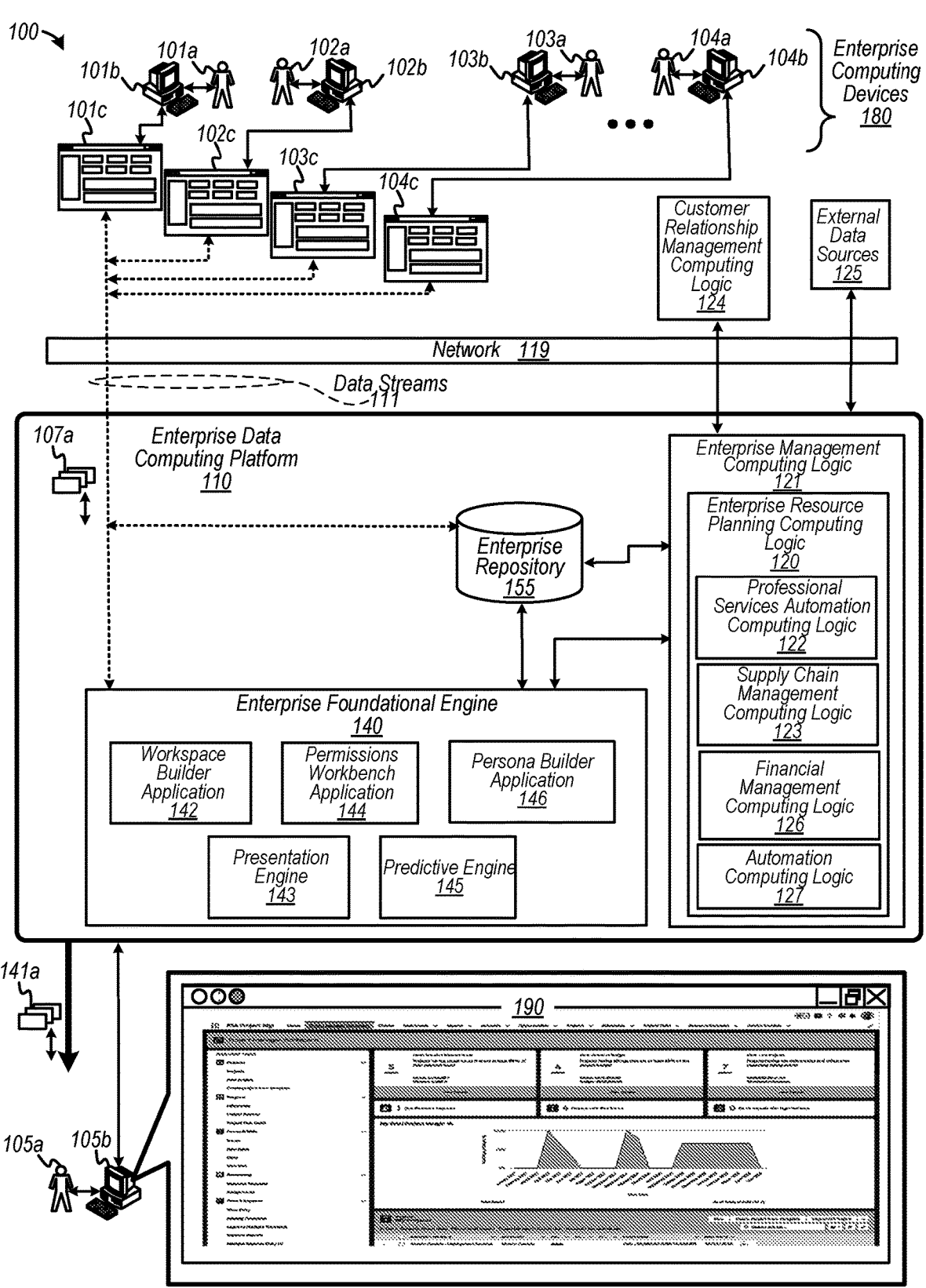
FIG. 1 is a diagram depicting an example of an enterprise foundational engine configured to facilitate deployment of computerized tools to generate and implement an enterprise data model to manage component data objects configured to manage computerized enterprise data flows, according to some embodiments.

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in any arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description or providing unnecessary details that may be already known to those of ordinary skill in the art.

As used herein, "system" may refer to or include the description of a computer, network, or distributed computing system, topology, or architecture implementing hardware or software, or both, using various computing resources that are configured to provide computing features, functions, processes, elements, components, or parts, without any particular limitation as to the type, make, manufacturer, developer, provider, configuration, programming or formatting language, service, class, resource, specification, protocol, or other computing or network attributes. As used herein, "software" or "application" may also be used interchangeably or synonymously with, or refer to, a computer program, software, program, firmware, or any other term that may be used to describe, reference, or refer to a logical set of instructions that, when executed, performs a function or set of functions in association with a computing system or machine, regardless of whether physical, logical, or virtual and without restriction or limitation to any particular implementation, design, configuration, instance, or state. Further, "platform" may refer to any type of computer hardware (hereafter "hardware") or software, or any combination thereof, that may use one or more local, remote, distributed, networked, or computing cloud (hereafter "cloud")-based computing resources (e.g., computers, clients, servers, tablets, notebooks, smart phones, cell phones, mobile computing platforms or tablets, and the like) to provide an application, operating system, or other computing environment, such as those described herein, without restriction or limitation to any particular implementation, design, configuration, instance, or state. Distributed resources such as cloud computing networks (also referred to interchangeably as "computing clouds," "storage clouds," "cloud networks," or, simply, "clouds," without restriction or limitation to any particular implementation, design, configuration, instance, or state) may be used for processing and/or storage of varying quantities, types, structures, and formats of data, without restriction or limitation to any particular implementation, design, or configuration.

As used herein, data may be stored in various types of data structures including, but not limited to databases, data repositories, data warehouses, data stores, or other data structures or memory configured to store data in various computer programming languages and formats in accordance with various types of structured and unstructured database schemas such as SQL, MySQL, NoSQL, DynamoDB™, etc. Also applicable are computer programming languages and formats similar or equivalent to those developed by data facility and computing providers such as Amazon® Web Services, Inc. of Seattle, Washington, FMP, Oracle®, Salesforce.com, Inc., or others, without limitation or restriction to any particular instance or implementation. DynamoDB™, Amazon Elasticsearch Service, Amazon Kinesis Data Streams ("KDS")™, Amazon Kinesis Data Analytics, and the like, are examples of suitable technologies provided by Amazon Web Services ("AWS"). Another example of cloud computing services include the Google® cloud platform that may implement a publisher-subscriber messaging service (e.g., Google® pub/sub architecture). Yet in another example, cloud computing and messaging services may include Apache Kafka, Apache Spark, and any other Apache software application and platforms, which are developed and maintained by Apache Software Foundation of Wilmington, Delaware, U.S.A.

Further, references to databases, data structures, memory, or any type of data storage facility may include any embodiment as a local, remote, distributed, networked, cloud-based, or combined implementation thereof. For example, social networks and social media (e.g., "social media") using different types of devices may generate (i.e., in the form of posts (which is to be distinguished from a POST request or call over HTTP) on social networks and social media) data in different forms, formats, layouts, data transfer protocols, and data storage schema for presentation on different types of devices that use, modify, or store data for purposes such as electronic messaging, audio or video rendering (e.g., user-generated content, such as deployed on YouTube®), content sharing, or like purposes. Data may be generated in various formats such as text, audio, video (including three dimensional, augmented reality ("AR"), and virtual reality ("VR"), or others, without limitation, as electronic messages for use on social networks, social media, and social applications (e.g., "social media") such as Twitter® of San Francisco, California, Snapchat® as developed by Snap® of Venice, California, Messenger as developed by Facebook®, WhatsApp®, or Instagram® of Menlo Park, California, Pinterest® of San Francisco, California, LinkedIn® of Mountain View, California, and others, without limitation or restriction. In various embodiments, the term "content" may refer to, for example, one or more of executable instructions (e.g., of an application, a program, or any other code compatible with a programming language), textual data, image data, video data, audio data, or any other data.

In some examples, data may be formatted and transmitted via electronic messaging channels (i.e., transferred over one or more data communication protocols) between computing resources using various types of data communication and transfer protocols such as Hypertext Transfer Protocol ("HTTP"), Transmission Control Protocol ("TCP")/Internet Protocol ("IP"), Internet Relay Chat ("IRC"), SMS, text messaging, instant messaging ("IM"), File Transfer Protocol ("FTP"), or others, without limitation. As described herein, disclosed processes implemented as software may be programmed using Java®, JavaScript®, Scala, Python™, XML, HTML, and other data formats and programs, without limitation. Disclosed processes herein may also implement software such as Streaming SQL applications, browser applications (e.g., Firefox™) and/or web applications, among others. In some examples, a browser application may implement a JavaScript framework, such as Ember.js, Meteor.js, ExtJS, AngularJS, and the like. References to various layers of an application architecture (e.g., application layer or data layer) may refer to a stacked layer application architecture such as the Open Systems Interconnect ("OSI") model or others. As described herein, a distributed data file may include executable instructions as described above (e.g., JavaScript® or the like) or any data constituting content (e.g., text data, video data, audio data, etc.), or both.

In accordance with other examples, systems, software, platforms, and computing clouds, or any combination thereof, may be implemented to provide customer relationship management ("CRM") functionalities, examples of which may be provided by Salesforce.com® of San Francisco, CA, USA, Oracle® CRM of Austin, TX, USA, SAP® CRM of Walldorf, Baden-Württemberg, Germany, and others. In accordance with some examples, systems, software, platforms, and computing clouds, or any combination thereof, may be implemented to provide enterprise resource planning ("ERP") functionalities, examples of which may be provided by FinancialForce.com, Inc.® (now Certinia Inc.) of San Francisco, CA, USA, Oracle® ERP of Austin, TX, USA, Microsoft® Dynamics AX, of Redmond, WA, USA, and others.

FIG. 1 is a diagram depicting an example of an enterprise foundational engine configured to facilitate deployment of computerized tools to generate and implement an enterprise data model to manage data objects configured to manage computerized enterprise data flows, according to some embodiments. Diagram 100 depicts an example of an enterprise data computing platform 110 configured to compute, monitor, analyze, and respond to values of enterprise data 107a in data streams 111, including streams of financial data, to aggregate enterprise data for evaluating risk, such as financial risk, to an enterprise, organization, or any entity to avoid or mitigate possible risks to its various business processes associated with one or more software application functions and computing systems of an enterprise. In some examples, enterprise data computing platform 110 may be configured to optimize processes of an organization, which may reflect on a positive and "healthy" environment by monitoring various parameters and subsets of data to ensure one or more goals or data thresholds of an organization are tuned to operate in accordance with rules set forth by an entity. Enterprise data computing platform 110 may be configured to provide a centralized way of viewing and monitoring enterprise processes (e.g., via a workspace interface), thereby providing a 360-degree, or summarized, view of products or services (e.g., resources) an enterprise has to offer, such as professional services, subscriptions, and goods, within specific units of time.

In the example shown, enterprise foundational engine 140 may be disposed in an enterprise data computing platform 110, which may also include enterprise management computing logic 121. Enterprise management computing logic 121 may include enterprise resource planning ("ERP") computing logic 120 configured to detect, store, manage, and analyze data from any number of business activities or functions of an enterprise. In some examples, enterprise resource planning ("ERP") computing logic 120 may include professional services automation ("PSA") logic 122 that may be configured to facilitate project and resource management, as well as other business processes for pro- fessionally-related businesses and services, such as consul- tants, attorneys, information technologists ("IT" profession- als), and the like. Enterprise resource planning ("ERP") computing logic 120 may include enterprise applications, such as supply chain management computing ("SCM") logic 123 configured to manage supply chain processes of an enterprise, such as identifying orders, manufacturing or procuring a product, and managing inventory. ERP comput- ing logic 120 may also include financial management ("FM") computing logic 126 configured to generate and facilitate financial-related functions, such as maintaining general ledger ("GL") data, accounts payable/receivable ("AP/AR") data, "billing data," revenue recognition data, etc. In other examples, enterprise resource planning ("ERP") computing logic 120 may include any other application configured to facilitate data modeling of enterprise and organization workflows, whereby any other application may enhance operation of the enterprise or organization. In accordance with at least one implementation, any of ERP computing logic 120, PSA logic 122, SCM logic 123, and FM computing logic 126 may be implemented as logic, platforms, and/or applications maintained by Financial- Force.com, Inc., of San Francisco, CA, USA. Further, an enterprise data computing platform 110 may be configured to access any number of external data sources 125 (e.g., third-party applications), for example, via one or more APIs.

Enterprise resource planning ("ERP") computing logic 120 may also include automation computing logic 127 that can be configured to automatically extract one or more of project data, billing data, and supply chain data (and asso- ciated metadata) from multiple disparate data sources, any of which may be different software applications, different oper- ating systems, and/or different database repositories. In at least one implementation, automation computing logic 127 may be configured to implement at least a portion of a runbook application (or any other application or program- matic script) that may be configured to automatically access- through runbook automation-any number of disparate data sources from which to retrieve enterprise-related data for use by enterprise foundational engine 140 or any other element of enterprise data computing platform 110. Runbook auto- mation may also be implemented to perform any other enterprise function, such as consolidating multiple revenue streams for generating comprehensive invoices that include each of the multiple revenue streams associated with an engagement, as well as managing revenue contracts to comply with rules defining recognized revenue, among other things, some of which may be in accordance with best practices (e.g., FP&A).

Further, enterprise resource planning ("ERP") computing logic 120 may be configured to communicate electronically with (e.g., integrated with, or "built on") customer relation- ship management ("CRM") computing logic 124, which may be configured to manage interactions among an enter- prise and third-party computing devices (e.g., customer devices). Customer relationship management computing logic 124 may be configured to provide systems and soft- ware-based functionalities to monitor interactions between customers/users and an enterprise, especially regarding sales workflows, marketing workflows, customer service work- flows, accounting workflows, and the like. In accordance with at least one implementation, customer relationship management ("CRM") computing logic 124 may be imple- mented as logic, platforms, and/or applications maintained by Salesforce.com, Inc., of San Francisco, CA, USA, or any other CRM computing platform. Any of ERP computing logic 120, PSA logic 122, SCM logic 123, FM computing logic 126, and automation computing logic 127 may be configured to communicate electronically with an enterprise repository 155 and enterprise foundational engine 140 to exchange data to generate, maintain, and modify data asso- ciated with one or more component data objects for gener- ating data that is to be presented or displayed as, for example, as workspace interface 190 or workspace inter- faces 101c, 102c, 103c, and 104c, which in some cases, may be used to modify an enterprise process (e.g., automatically).

Note that enterprise-related data may populate one or more component data objects to include one or more of project data, billing data, and supply chain data, or other like data, whereby component data objects may be stored in enterprise repository 155 in a data arrangement constituting an enterprise data model. Enterprise repository 155 may be configured to store enterprise data 107a and other data in one or more data arrangements in any database technology (e.g., as relational databases, graph databases, etc.). As shown, enterprise foundational engine 140 may be configured to receive or exchange enterprise data 107a and other data in real time (or near real time) (e.g., via a pipeline or an event-driven architecture, or any other computing or data architecture). Also, enterprise foundational engine 140 may be configured to access enterprise data 107a and other data as stored in enterprise repository 155.

Enterprise data computing platform 110 may be config- ured to exchange data with enterprise computing devices 180, any of which may be configured to perform or facilitate any number of business functions for an enterprise, such as sales, marketing, project planning, finance, accounting, pro- curement, inventory management, human resource manage- ment, supply chain management, and the like. In this example, computing devices 101b, 102b, 103b, and 104b may be associated with users 101a, 102a, 103a, and 104a, respectively. For example, computing device 101b may be configured to perform sales-related functions via a sales- centric user interface 101c, computing device 102b may be configured to perform finance-related functions via a finance-centric user interface 102c, computing device 103b may be configured to perform project management-related functions via a project-centric user interface 103c, and computing device 104b may be configured to perform supply chain management-related functions via a supply- centric user interface 104c.

Business function-centric user interfaces 101c, 102c, 103c, and 104c, as well as workspace interface 190, may be configured to implement workspace interfaces, persona builder interfaces, and permissions workbench interfaces to exchange enterprise data via data streams 111 with the enterprise data computing platform 110 over a network 119, such as the Internet or any other network. Enterprise data streams 111 may include enterprise data 107a and other data.

Further to diagram 100, enterprise functional foundational engine 140 may include a workspace builder application 142, a permissions workbench application 144 and the persona builder application 146. Workspace builder appli- cation 142 may be configured to generate a workspace interface 190 with which to generate workspace interfaces 101c, 102c, 103c, and 104c that include configurable inter- face portions each associated with a component data object. Examples of configured interface portions may include a configurable navigation component, one or more alert/key performance indicator ("KPI") components, one or more component data values (e.g., "counts"), a configurable analytics interface portion, and a configurable list view interface portion based on data derived from multiple sources and multiple applications (e.g., CRM, ERP, PSA, and other applications).

A permissions workbench application 144 may be configured to generate subsets of permissions to access enterprise applications through upgrades, and may be further configured to create subsets of permissions by comparing subsets of permissions based on role, business function, or persona to add or exclude ("mute") permissions. Also, a derived set of permissions may be generated by merging multiple subsets of permissions in combination. Persona builder application 146 may be configured to execute instructions to receive user input via a persona interface to correlate a user and user account data to a role and to a subset of permissions. Permissions workbench application 144 and persona builder application 146 may facilitate customizable permission workbench interfaces to manage permissions in a flexible manner to reduce complexities of accessing or deploying enterprise applications as well as software upgrades.

A workspace builder application, a persona builder application, and a permissions workbench application are configured to generate customizable workspaces, persona interfaces, and permissions workbench interfaces that access data from multiple sources of application data, such as CRM application data, ERP application data, external third-party application data, and any other enterprise application data via any number of APIs to access data in an enterprise data computing platform or externally at a cloud-based CRM application without, for example, opening up different webpages or page layouts to access data from different sources. A workspace builder application may be configured to generate formatting data (e.g., XML, JSON, etc.) to form a workspace interface as an automatically-generated hybrid web page that combines visual "look and feel" elements from CRM web interfaces, ERP web pages, external third-party web pages, and the like. Thus, a workspace interface may provide an integrated web page regardless of sources of enterprise-related data.

Presentation engine 143 may be configured to format or otherwise transform data 141$a$ representing one or more subsets of component data objects and other enterprise-related data in various degrees of aggregation or granularity for presentation at, for example, user interfaces 101$c$, 102$c$, 103$c$, and 104$c$ associated computing devices 101$b$, 102$b$, 103$b$, and 104$b$, which are respectively implemented by user 101$a$, user 102$a$, user 103$a$, and user 104$a$ of enterprise computing devices 180, among others. In some examples, presentation engine 143 may include logic configured to generate a workspace interface 190 at a system administrator computing device 105$b$ associated with a system administrator user 105$a$. According to some examples, presentation engine 143 may be configured to execute instructions to activate a dashboard application or any application associated with enterprise foundational engine 140, enterprise management computing logic 121 and customer relationship management computing logic 124.

Predictive engine 145 may include logic configured to predict optimal implementation of interface portions of a workspace interface, to analyze data patterns indicating a proposed modification to a business process, a persona, a set of permissions, and any other enterprise-related data. Predictive engine 145 may include logic configured to predict may be configured to implement any machine learning algorithm, deep-learning algorithm, or any other predictive algorithm (e.g., Bayesian, etc.), including, but not limited to algorithms implementing support vector machines ("SVMs"), various types of neural networks (e.g., convolutional neural networks ("CNN"), recurrent neural networks ("RNN"), artificial neural networks ("ANN"), and the like), various regression techniques, various k-means computations, or any other like algorithms. In one example, predictive engine 145 may be configured to optimize any subset of enterprise-related data and associations among component object data in an enterprise data model based on analyzing data patterns that may be matched against machine-predicted patterns or against a set of one or more rules.

Any of the described elements of FIG. 1, or any other processes described herein, may be implemented as software, hardware, firmware, circuitry, or a combination thereof. Further, any of elements of FIG. 1 may be centralized or may be distributed among any cloud-based computing systems.

Figure 2:
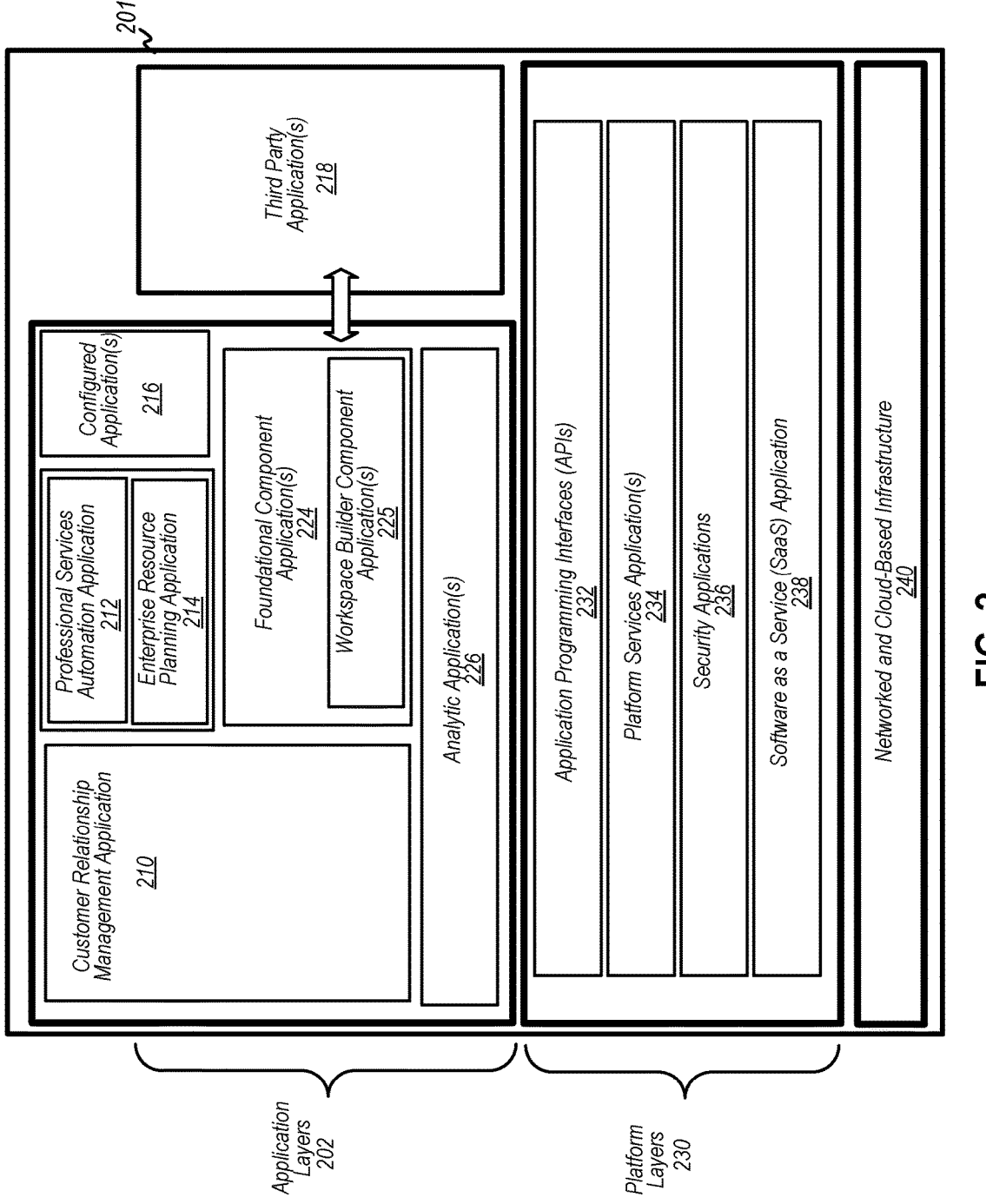
FIG. 2 illustrates an example of a layered architecture for implementing, generating, and managing an enterprise data computing application, according to some examples.

FIG. 2 illustrates an example of a layered architecture for implementing, generating, and managing an enterprise data computing application, according to some examples. Diagram 200 depicts platform application stack ("stack") 201, which is neither a comprehensive nor a fully inclusive layered architecture to implement using computerized tools, such as interactive workspace interfaces (and generation thereof), to manage and process enterprise data as a function of, for example, a subset of permissions or a persona, or both. One or more elements depicted in diagram 200 of FIG. 2 may include structures and/or functions as similarly-named or similarly-numbered elements depicted in other drawings, or as otherwise described herein, in accordance with one or more examples, such as described relative to FIG. 1 to 2, or any other figure or description herein.

Platform application stack 201 may include application layers 202 disposed upon platform layers 230, which, in turn, may be disposed upon a layer of networked and cloud-based infrastructures 240. Networked and cloud-based infrastructure layer 240 may include any cloud-based database or data storage service. In at least one example, networked and cloud-based infrastructure layer 240 may include a multi-tenant architecture, whereby an instance of an application or executable code and server platforms may provide services to multiple users.

Platform layers 230 may include a layer of application programming interfaces ("APIs") 232, one or more platform services applications 234, any number of security applications 236, and software as a service ("SaaS") 238 application layer. At least some examples of APIs implemented in API layer 232 may be described in FIG. 3. One or more platform services applications 234 of FIG. 2 may be configured to (1) provide configurability in structuring enterprise applications, (2) provide notifications and messaging through an electronic communications channel, (3) provide an architecture for implementing workflows, (4) provide location data, such as geolocation data, and (5) any other platform service suitable for supporting, for example, applications associated with application layers 202. An example of platform services applications 234 may implement applications developed and maintained by Salesforce.com, Inc. Security applications 236 may include security applications configured to provide two (2) factor authentication, secure password and session policies, single sign-on ("SSO") session and user authentication services, security as a function of user profiles, and any other security-centric application data configured to maintain security of data transport through application layers 202, platform layers 230, and networked and cloud-based infrastructure layer 240. Software as a service 238 application layer provides for software delivery and access from a remote host (e.g., cloud-based servers) to a local client user, whereby software as a service 238 application layer may communicate data via networked and cloud-based infrastructure layer 240. In some examples, software as a service layer 238 application layer may be implemented using Force.com™ and/or Lightning Platform™, both provided by Salesforce.com, Inc., or any other software as a service application or any other platform as a service ("PaaS"), and the like.

Application layers 202 may include a customer relationship management application ("CRM") 210, a professional services automation ("PSA") application 212, an enterprise resource planning ("ERP") application 214, configured application(s) 216, and foundational component applications 224, which may include workspace builder component applications 225, and one or more analytic applications 226. Customer relationship management application 210 may be implemented as provided by Salesforce.com, Inc., CRM, as well as any other CRM applications, such as Oracle® CRM applications, SAP® CRM applications, and the like. Professional services automation application 212 may be configured to facilitate project and resource management, as well as other business processes including professionally-related businesses and services. Enterprise resource planning application 214 may be configured to manage and enhance performance and financial aspects associated among exchanges of data between an enterprise and a customer/user (or client). Also, SOQL (e.g., Salesforce Object Query Language) may be implemented to query component data objects in an enterprise data model stored in a data repository.

Foundational component application(s) 224 is depicted as including at least workspace builder component application(s) 225, as described herein. Foundational component applications 224 may also include a permissions workbench application (not shown) and a persona builder application (not shown). In some examples, foundational component application(s) 224 may be implemented as, or in association with, enterprise foundational engine 140 of FIG. 1. Foundational component application(s) 224 of FIG. 2 may include a subset of applications, for example, to manage user accounts and permissions via permissions workbench application 144 of FIG. 1, and to create persona data objects to represent personas associated with users, roles, and applications. Also, foundational component applications 224 of FIG. 2 may include an application to manage exchange rates among currencies and manage engagement during lifecycles with customers. An example of foundational component applications [124] 224 is an application Foundations™ provided by FinancialForce.com, Inc (now Certinia Inc.).

Analytic applications 226 may include logic to facilitate data exploration, visualization, and generation of insights for an enterprise or organization. Analytic applications 226 may include logic configured to perform or implement machine learning algorithm, deep-learning algorithm, or any other predictive algorithm (e.g., Bayesian, etc.). In at least one example, analytic applications 226 may be implemented using Salesforce Einstein™ of Salesforce.com, Inc., or any other analytics application. Configured applications 216 may include applications in one or more application exchange platforms, such as AppExchange of Salesforce. com, Inc., whereas third-party applications 218 may be accessible external to platform application stack 201 and configured applications 216. Third-party applications 218 may be accessed to provide enhanced functionality of platform application stack 201.

Figure 3:
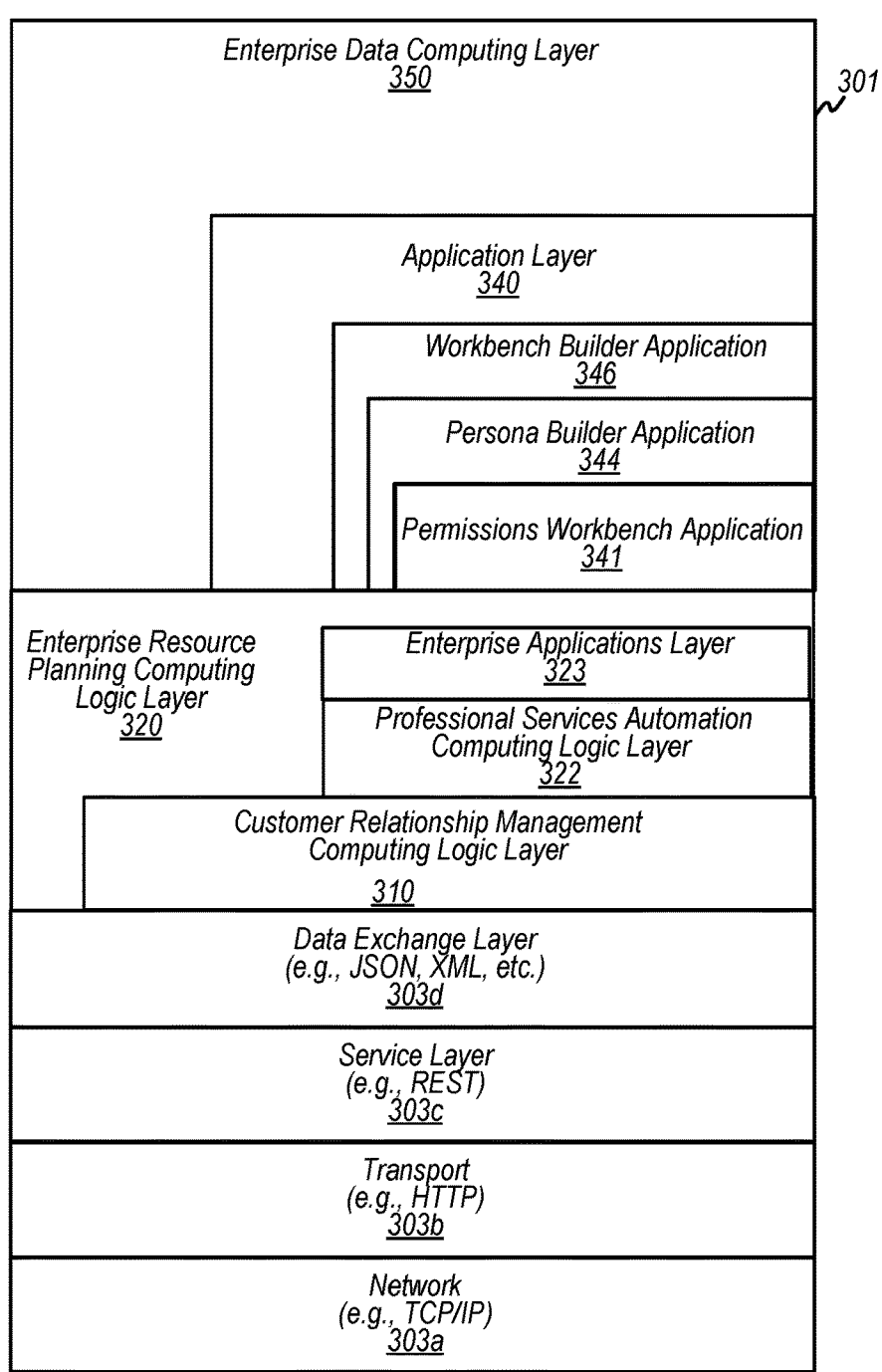
FIG. 3 illustrates another example of a layered architecture for implementing, generating, and managing an enterprise data computing application, according to some examples.

FIG. 3 illustrates another example of a layered architecture for implementing, generating, and managing an enterprise data computing application, according to some examples. Diagram 300 depicts application stack ("stack") 301, which is neither a comprehensive nor a fully inclusive layered architecture for managing and processing enterprise data. One or more elements depicted in diagram 300 of FIG. 3 may include structures and/or functions as similarly-named or similarly-numbered elements depicted in other drawings, or as otherwise described herein, in accordance with one or more examples, such as described relative to FIG. 1 to 2, or any other figure or description herein.

Application stack 301 may include an enterprise data computing layer 350 disposed upon an enterprise resource planning computing logic layer 320, which, in turn, may be disposed upon any number of lower layers (e.g., layers 303a to 303d). Enterprise resource planning computing logic layer 320 may be disposed on data exchange layer 303d, which may be implemented using any programming language, such as Javascript, Java, Python, Apex™, etc., or any other format to effect generation and communication of requests and responses among computing devices and computational resources constituting an enterprise and an enterprise resource planning application and/or platform. Data exchange layer 303d may be disposed on a service layer 303c, which may provide a transfer protocol or architecture for exchanging data among networked applications. For example, service layer 303c may provide for a RESTful-compliant architecture and attendant web services to facilitate GET, PUT, POST, DELETE, and other methods or operations. In other examples, service layer 303c may provide, as an example, SOAP web services based on remote procedure calls ("RPCs"), or any other like services or protocols. Service layer 303c may be disposed on a transport layer 303b, which may include protocols to provide host-to-host communications for applications via an HTTP or HTTPS protocol, in at least this example. Transport layer 303b may be disposed on a network layer 303a, which, in at least this example, may include TCP/IP protocols and the like. Note that in accordance with some examples, layers 303a to 303d facilitate implementation of a data channel to communicate data representing workspace data, permissions data, persona data, and any other data (e.g., control signal data), as set forth herein.

Enterprise resource planning computing logic layer 320 may be configured to detect, store, manage, and analyze data from any number of business activities or functions of an enterprise. As shown, enterprise resource planning computing logic layer 320 may include an enterprise applications layer 323 of any number of enterprise applications, and a professional services automation computing logic layer 322 that may be configured to facilitate project and resource management, and to provide other business-related functionality. Enterprise resource planning computing logic layer 320 and/or enterprise applications layer 323 may also be configured to provide functionality to manage various business functions, such as sales, pre-sale opportunity development, accounting, billing, revenue recognition, procurement, inventory management, project management, human capital management ("HCM") (optionally), supply chain management ("SCM"), among various other business functions. Enterprise resource planning computing logic layer 320 may implement also a Billing Central ("BC") software application, an Accounts Payable ("AP") application, an Accounts Receivable ("AR") application, a Financial Management ("FM") software application, and any other enterprise-related application, whether disposed in enterprise resource planning computing logic layer 320 or disposed anywhere else, such as in the cloud.

In at least one example, enterprise resource planning computing logic layer 320 and professional services automation computing logic layer 322 may be implemented as logic, platforms, and/or applications maintained by FinancialForce.com, Inc., of San Francisco, CA, USA. In some examples, enterprise resource planning computing logic layer 320 may include an enterprise applications layer 323 and a professional services automation computing logic layer 322, both of which may be layered upon a customer relationship management computing logic layer 310. Customer relationship management computing logic layer 310 may be configured to manage interactions (via any application programming interface, or "API") among an enterprise and third-party entities and computing devices. An example of functionality provided at customer relationship management computing logic layer 310 may include CRM-related logic, platforms, and/or applications maintained by Salesforce.com, Inc., of San Francisco, CA, USA. In accordance with some examples, layers 320, 322, and 310 may include communication layers (e.g., application programming interface, or "API," layers). Examples of APIs or other communicative applications may include any code-based data connector that may facilitate communication throughout application stack 301 and external thereto, such as any API that may comply with any specification-compliant format, which may include JSON, YAML, RAML, XML, etc., or an API compliant with OpenAPI specifications. Also, an API compatible with Apex™ programming language may be implemented. Layers 320, 322, and 310 may also include business components and a process and/or application builder, both of which may be implemented as Lightning components and Lightning App Builder (e.g., as maintained by Salesforce.com, Inc.), or as any other component or application builder.

As shown, enterprise data computing layer 350 may be disposed on or otherwise built on layers 320, 323, 322, and 310 in one non-limiting example, and enterprise application functionality as described herein. Enterprise data computing layer 350 may include any distribution and implementation of layers 320, 323, 322, and 310, or any other application or logic layers. Further to diagram 300, enterprise data computing layer 350 may include (or may be layered upon) an application layer 340 that includes logic constituting a workbench builder application layer 346 configured to generate data for presentation in a user interface, a persona builder application layer 344, and permissions workbench application layer 341. Further, enterprise resource planning computing logic layer 320 may include an enterprise applications layer 323, a professional services automation computing logic layer 322, and a customer relationship manager computing logic layer 310 having functionalities described herein.

Any of the described layers of FIG. 3 or any other processes described herein in relation to other figures may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including, but not limited to, Python™, ASP, ASP.net, .Net framework, Ruby, Ruby on Rails, C, Objective C, C++, C#, Adobe® Integrated Runtime™ (Adobe® AIR™), ActionScript™, Flex™, Lingo™, Java™, JSON, Javascript™, Ajax, Perl, COBOL, Fortran, ADA, XML, MXML, HTML, DHTML, XHTML, HTTP, XMPP, PHP, and others, including SQL™, SPARQL™, Turtle™, etc., as well as any proprietary application and software provided or developed by FinancialForce.com, Inc. (now Certinia Inc.) or Salesforce.com, Inc. As an example, the described techniques herein may be implemented using APEX™, Lightning Experience™ ("LEX"), which may integrate Lightning Web Components™ ("LWC") and other Lightning components, as well as any other applications or services of Salesforce.com, Inc. The above-described techniques may be varied and are not limited to the embodiments, examples or descriptions provided.

Figure 4:
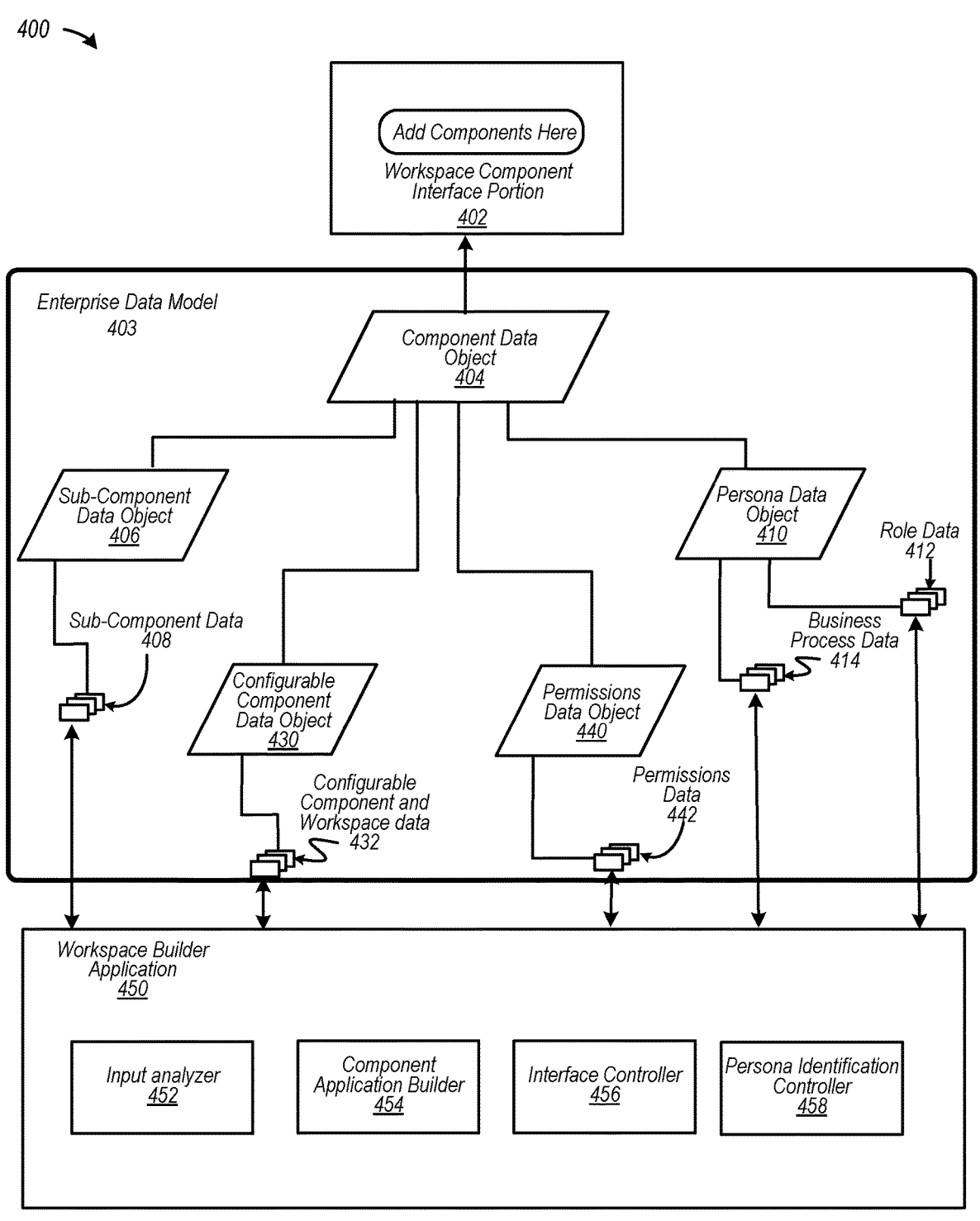
FIG. 4 is a diagram depicting an example of an enterprise data model with which a workspace builder application may be configured to generate one or more workspace component interface portions for display in an interactive workspace interface, according to some embodiments.

FIG. 4 is a diagram depicting an example of an enterprise data model with which a workspace builder application may be configured to generate one or more workspace component interface portions for display in an interactive workspace interface, according to some embodiments. As shown in diagram 400 a workspace builder application 450 may be configured to generate or interact with an enterprise data model 403 to facilitate the generation of a workspace component interface portion 402, which may be aggregated with other components in an interface to form an interactive workspace interface to form a "workspace" with which to monitor and manage control flows of activity of an enterprise, regardless whether computerized or otherwise.

As shown, workspace component interface portion 402 may be associated with digitization of data for presentation in a workspace component interface portion 402, data of which may be derived from an enterprise data model 403. Enterprise data model 403 may include any number of component data objects 404 with which to implement and generate a workspace interface based on one or more personas linked to one or more permissions. Note that enterprise data model 403 depicts component data object 404, however, there may be multiple component data objects 404 in enterprise data model 403 to generate and support any number of workspace interface components for any number of workspace interfaces.

In the example shown, component data object 404 may include data representing an object as a constituent in a data model, such as enterprise data model 403. A component data object 404 may include a data arrangement configured to represent an entity, such as an enterprise entity or process (or portions thereof). Component data object 404 may include an attribute representing, for example, a data field that represents a characteristic or property of a data object. In at least one example, a component data object may be configured to facilitate the generation or implementation of a component, such as a component in a workspace interface as a computerized tool.

Component data object 404 may include any data as well as subsidiary, subordinate, or children component data objects, such as one or more sub-component data objects 406, one or more configurable component data objects 430, one or more permissions data objects 440, and one or more persona data objects 410. A sub component data object 406 may include a data arrangement configured to include any supplemental data associated with one or more data types that may be associated with enterprise data. Sub-component data 408 may be used to facilitate implementation of one or more component data objects 404 (e.g., data describing links to other data and component data objects), as well as ancillary data. As a further example, sub-component data 408 may be configured to present workspace components collaboratively in a display based on a priority, a portion of the priority being derived from a size of the digital display in terms of pixels as well as a priority of data with which to interact.

A permissions data object 440 may include a data arrangement including permissions data 442 configured to provide permissions (e.g., authorization to access a subset of any enterprise application) based on a permission type. For example, a permission type may specify permissions and types of access to data classified based on a permissions set group, a permission set, or a user profile. A permissions set group may include groups of data representing permissions each of which are a set of permissions (i.e., a permissions set) that may specify a subset of permissions associated within a group. For example, a permissions group for a warehouse worker may be assigned a number of permissions from each of a permission set group, such as "check and adjust inventory" permission set group, "view items in inventory" permission set group, "view sales orders" permissions set group, "manage backorders" permission set group, among any other groups of permissions. Further to the example, a permission set group "manage backorders" may include a subset of specific permissions, such as "view backorder," "view inventory position," "view sales order," "view sales order line item," and the like. An example of a hierarchy of permissions, such as described above, may be depicted in relation to FIG. 34. In some examples, permissions to access any subset of an enterprise data computing data platform may include fewer or greater permissions than to execute read, create, edit or update, and delete (e.g., "CRUD") data operations regarding any component data object of an enterprise data model and any logical component, as well as any other data.

In some examples, permissions data object 440 may include a data arrangement containing data representing a first subset of permission data associated with a first application and a second subset of permission data associated with the second application, whereby the first application may be a customer relationship management ("CRM") application and the second application may be an enterprise application, such as an enterprise resource planning ("ERP") application. Thus, permissions data object 440 may be configured as a data arrangement that includes a combination of a first subset of permissions to access a first application and a second subset of permissions to access a second application, or any combination thereof. As such, permissions data object 440 may include a data arrangement that has permissions data configured to access multiple applications, such as multiple cloud-based applications, the implementation of which may be based on a combination of functions.

For example, one or more permissions may be configured to access data and/or permissions associated with one or more of a CRM application and an ERP application. Hence, data representing a permission may include data that includes individual permissions for a CRM application, individual permissions for an ERP application, individual permissions for any other application, or any combination thereof. In at least one example, one or more application programming interfaces ("APIs") may be configured to provide access to permissions for an enterprise data computing platform in communication with a customer relationship management ("CRM") computing platform, whereby access via an API is to perform an enterprise function based on one or more permissions, at least one of which is accessible via an API.

A configurable component data object 430 may include data, such as configurable component and workspace data

432, which may be configured to present workspace components collaboratively in a display based on a priority, a portion of the priority being derived from a size of the digital display in terms of pixels (e.g., as viewed in a mobile phone or in a larger display, such as 3840×2160 pixels, whether fewer or greater). Configurable component data object 430 may include configurable component and workspace data 432, which may include data configured to generate a configurable navigation component, such as configurable navigation components 702 of FIG. 7, data configured to generate a configurable alert or KPI ("key performance indicator" data) component 802 or configurable data value component 852 of FIGS. 8A and 8B. In some examples, configurable component data object 430 may include data representing configurable workspace components to generate, monitor, and depict analytic data or reports, such as depicted as configurable analytics component 902 of FIG. 9. Further, configurable component data object 430 of FIG. 4 may include data representing configurable components to generate, monitor, and depict a "list view" of accessible data as a configurable list view component 1002 of FIG. 10, for example. A list view interface component portion may be configured to provide an interactive interface portion via a computerized tool to interact with one or more sources of data arranged in a data arrangement that may be accessed and manipulated in a hierarchical manner, whereby a selected item may expose additional data with which to operate upon.

Figure 33:
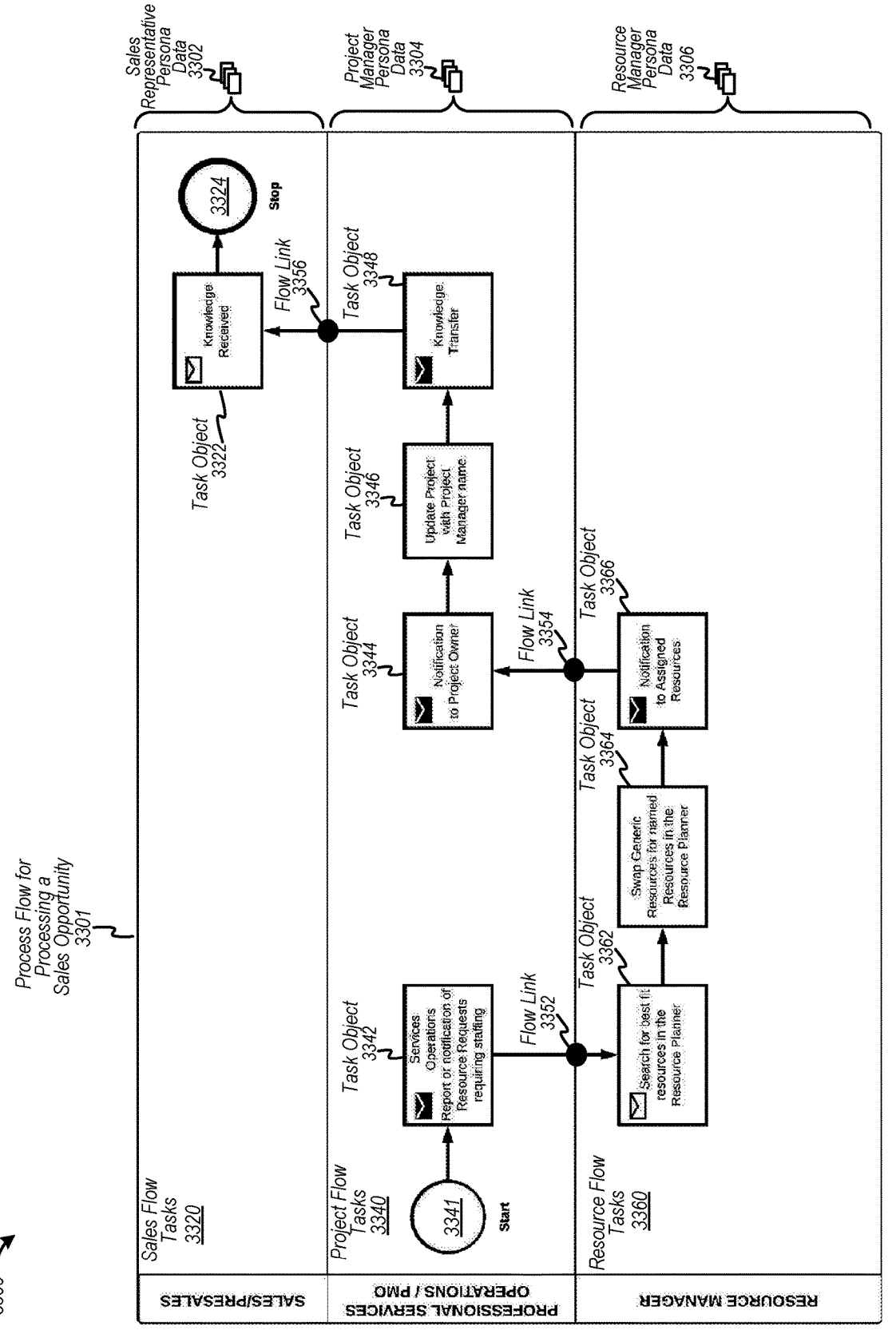
FIG. 33 is a diagram depicting a process flow and sub-flows associated with an enterprise and personas linked to task data objects, according to some examples.

A persona data object 410 may include role data 412 or business process data 414, or a combination thereof. Data representing a persona data object 410 may include data representing a role or a portion of a functional flow in an organization based on skills of a user in a role as well as accessibility to perform one or more functions in a workflow in an enterprise. In at least one example a user account associated with a user and user profile, which may include data representing various attributes of the user as a portion of role data 412, which may be associated with one or more enterprise functions, or roles to perform a function of a business or organization. Business process data 414 may include data representing a process in any organization, such as depicted in FIG. 33, any of which may be associated with a role or a user account. In some examples, persona data object 410 includes data representing permissions and roles within an organization to facilitate presentation of a workspace application.

Workspace builder application 450 may be configured to generate, supplement, and/or implement data representing component data object 404 or any other data. As shown, workspace builder application 450 at least includes an input analyzer 452, a component application builder 454, an interface controller 456, and a persona identification controller 458. An input analyzer 452 is configured to receive data representing one or more user inputs, any of which may be configured to activate formation or implementation of a workspace component to present in an interactive computerized tool, such as a workspace. In at least one example, input analyzer 452 may be configured to receive data representing a user, whereby input analyzer 452 may be configured to identify attributes of a user as well as a role or enterprise function with which the user is associated.

Component application builder 454 may be configured to receive data and implement that data in, at least, a form that may be data-driven and configured to generate one or more components for implementing a workspace interface configured to manage, at least in some examples, resources and processes of a portion of an enterprise work-flow. In various implementations, component application builder 454 may be configured to implement one or more applications to generate and implement any workspace interactive computerized tool by aggregating or including one or more workspace component interface portions 402 to form a workspace interface.

Interface controller 456 may include logic configured to receive and transmit user input to present data in a display to provide a workspace based on one or more workspace component interface portion 402. Workspace builder application 450 may optionally include a persona identification controller 458, which may be an application and/or logic configured to govern generation and implementation of workspace component interface portion 402 based on data representing a user, data representing a role, data representing a task in a business flow, or any other data.

Figure 5:
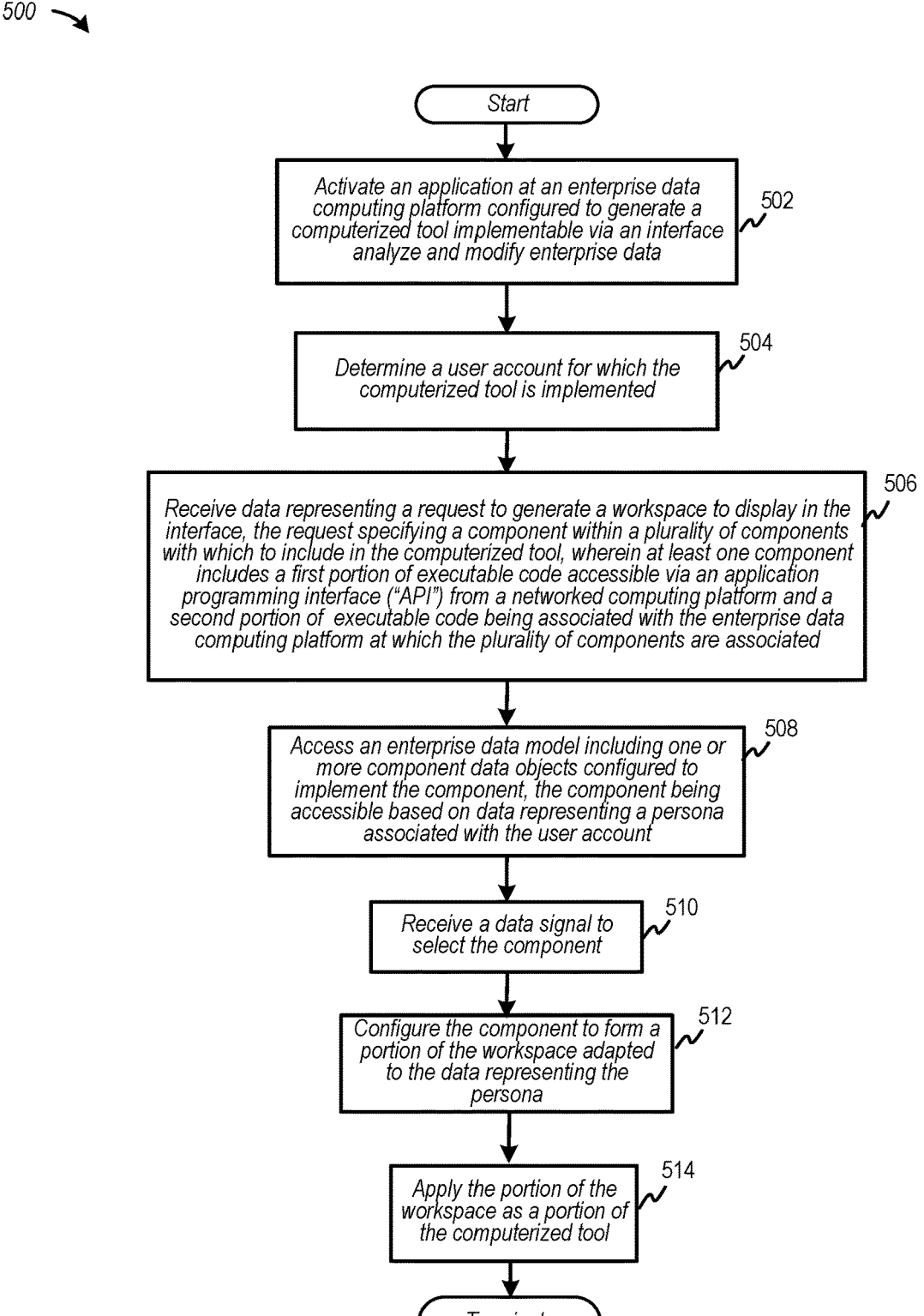
FIG. 5 is a flow diagram as an example of implementing a workspace application as a computerized tool to manage enterprise data, according to some embodiments.

FIG. 5 is a flow diagram as an example of implementing a workspace application as a computerized tool to manage enterprise data, according to some embodiments. At 502 of flow 500, an application may be activated at an enterprise data computing platform configured to generate a computerized tool implementable via an interface, whereby the computerized tool may be configured to analyze and modify enterprise data. At 504, a user account may be configured to include data representing a user (and associated persona data) for which a computerized tool is implemented to, for example, generate a workspace interface. In some examples, determining a user account may include identifying data representing at least one enterprise function associated with a user account, whereby an enterprise function may be a data object representing a role or a task object in a business process with which logic described herein may be configured to generate, monitor, and control.

At 506, data representing a request to generate a workspace to display in the interface may be received. The request may include data representing or otherwise specifying a component within a number of components with which to include in the computerized tool. A component may include a first portion of executable code accessible via an application programming interface ("API") from a networked computing platform, such as a CRM application, and a second portion of executable code being associated with an enterprise data computing platform, which may include an ERP application.

At 508, an enterprise data model including one or more component data objects may be configured to be accessible based on data representing data representing a persona associated with a user account. In some examples, data representing a persona may at least include attributes describing aspects of a user and association with one or more roles or enterprise functions. At 510, a data signal to select a component may be received. For example, a data signal may include data configured to implement any number of data signals to configure alert data or KPI component data, navigational component data, analytic component data, list view component data, and the like.

At 512, a component may be configured to form a portion of a workspace associated with data representing a persona. In some examples, receiving configuration data to configure the component to perform a function may be configured to perform one or more functions associated with a workspace interface. Further, configuring a component may include generating code to identify an API to access data for which to perform a function (e.g., an enterprise function). At 514, a portion of a workspace, such as a component data object, may be applied as a portion of a computerized tool.

FIG. 6 is a flow diagram as another example of implementing a workspace application as a computerized tool to manage enterprise data, according to some embodiments. At 602 of flow 600, an enterprise data model may be generated to include a number of component data objects, each of which may include one or more child data objects. As described in FIG. 4, a component data object in an enterprise data model may include one or more of a sub-component data object, a configurable component data object, a permissions data object, a persona data object, or any other data arrangement configured to include enterprise data. At 604, one or more workspace components may be identified, each of which may be associated with the component data object. At 606, data representing a request may be received into a workspace builder application to implement one or more components of a workspace interface.

At 608, a type of component may be determined based on input data, whereby the input data may specify one or more components for implementation in a workspace interface, such as a navigational data object, an alert data object, a KPI data object, a count data object, an analytics data object, a list view data object, or any other data object. At 610, a component and its associated data object-related data may be selected, based on type, for implementing a portion of an interactive workspace interface.

Figure 7:
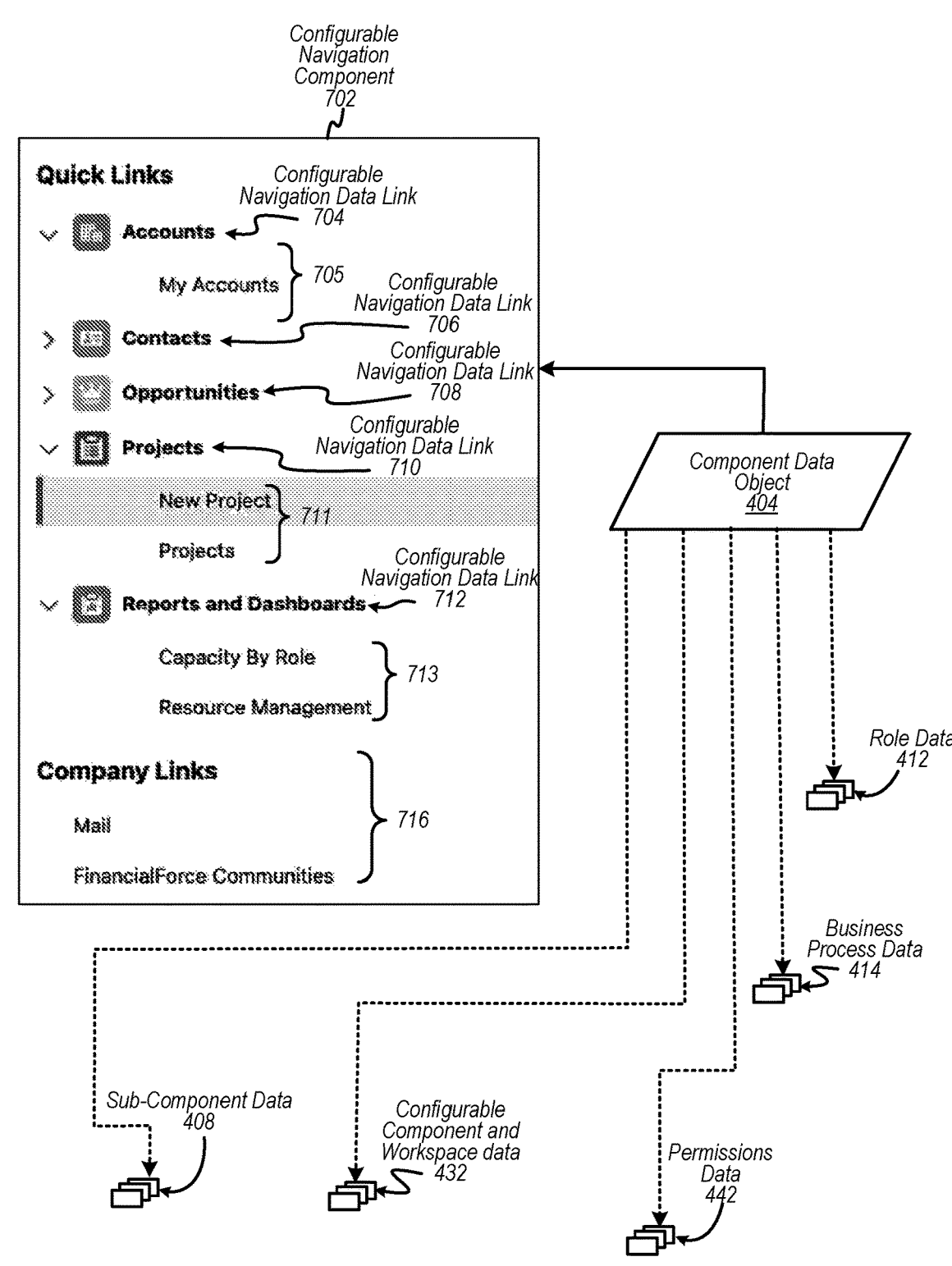
FIGS. 7 to 10 depicts examples of workspace components associated with data associated with one or more component data objects, according to some examples.

FIG. 7 depicts an example of a workspace component associated with data associated with one or more component data objects, according to some examples. Diagram 700 depicts a configurable navigation component 702 generated by a workspace builder application, whereby configurable navigation component 702 is associated with component data object 404. Types of data implemented in configurable navigation component 702 may be based on a function of role data 412 including persona data, business process data 414, and permissions data 442. In some examples, configurable component and workspace data 432 may include links to data representing applications, dashboards, objects, reports, tabs, URLs, and any other feature. One or more elements depicted in diagram 700 of FIG. 7 may include structures and/or functions as similarly-named or similarly-numbered elements depicted in other drawings, or as otherwise described herein, in accordance with one or more examples, such as described relative to FIG. 1 to 4, or any other figure or description herein. Note that any data link depicted in FIG. 7 (or otherwise described herein) need not be limited to any application, dashboard, object, report, tab, URL, or any other feature, and further may be linked to a group of data, one or more objects, or any subset of data. Also, the term "data link" is not limited to URLs, but may include any electronic communication link or communication channel (e.g., protocol), such as via APIs or otherwise, such as a reference or data pointer (e.g., a hashed data value).

In the example shown, configurable navigation component 702 may include data representing a configurable navigation data link 704 to "accounts," which includes at least a lower level link 705 to "my accounts." Configurable navigation component 702 may include data representing a configurable navigation data link 706 to "contacts," data representing a configurable navigation data link 708 to "opportunities," and a data representing configurable navigation data link 710 to "project," which is shown to include at least two links 711 to lower hierarchical levels including "new projects" and "projects." Configurable navigation component 702 may include a configurable navigation data link 712 configured to link to "reports and dashboards" based on data 713 representing a "capacity by role" and "resource management." Further configurable navigation component 702 may include links 716 to URLs that may refer to external data sources or applications. According to some examples, data representing data links 704, 706, 708, 710, 712, and 716 may be included in a data arrangement including sub-component data 408.

Configurable navigation component 702, as a navigation pane, may be implemented as a Lightning™ component in a workspace page layout provided by, for example, a CRM application. The navigation pane may provide quick access to the most commonly-used tab pages for a specific role or business process as defined by the workspace. Configurable navigation component 702 of a workspace may include links to data relevant to a role associated with a persona. Within this area, there can be up to any number of hierarchical levels that may be expandable or collapsible, and may link to one or more business process models or process flows. Configurable navigation component 702 provides a tailored experience to any page or object within a workspace interface as well as relevant external content that is accessible via a URL or other linking functionalities. In some examples, configurable navigation component 702 may provide system administrators with an ability to deliver customized navigation experiences for end users.

Figure 8A:
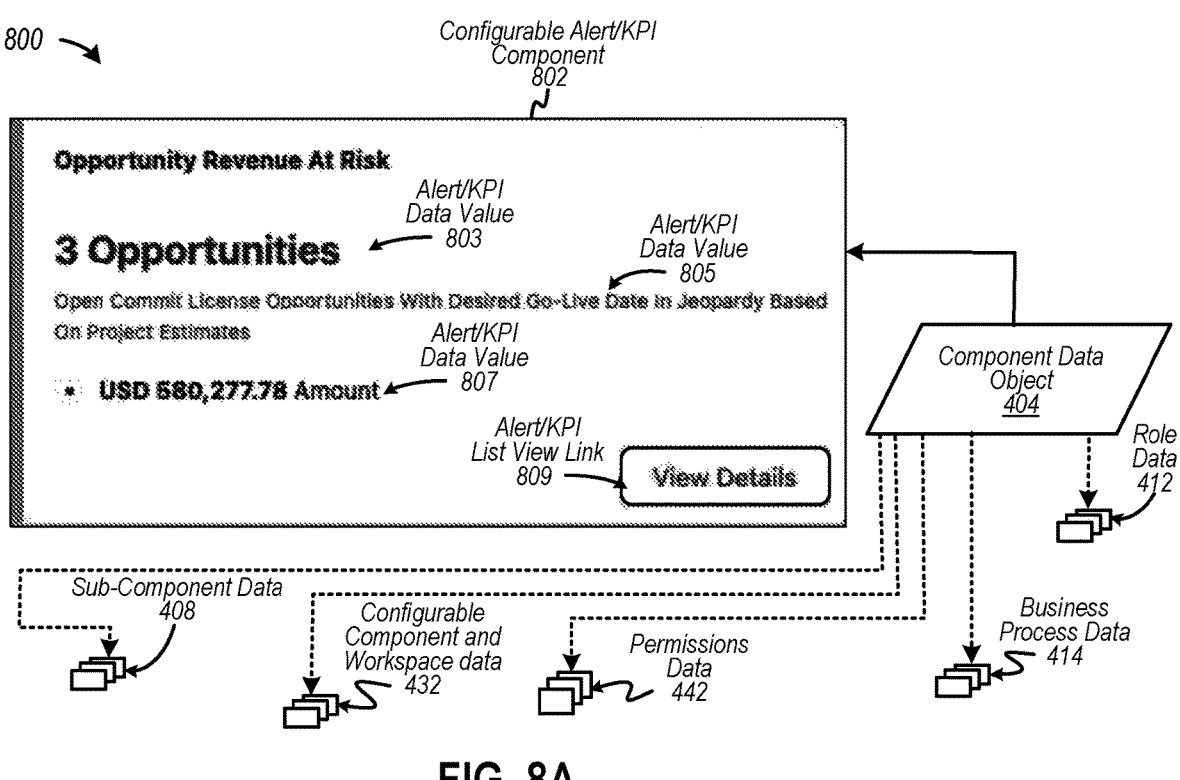

FIG. 8A depicts an example of a workspace component associated with data associated with one or more component data objects, according to some examples. Diagram 800 depicts a configurable alert/KPI interface portion 802 interface portion generated by a workspace builder application, whereby configurable alert/KPI component 802 may be associated with component data object 404. Types of data implemented in configurable alert/KPI interface portion 802 may be based on a function of role data 412 including persona data, business process data 414, and permissions data 442. In some examples, configurable component and workspace data 432 may include links to data representing mission-critical data that may impact one or more business processes and enterprise goals if, for example, not acted upon whether automatically, semi-automatically, or manually. As shown, configurable alert/KPI component 802 includes alert/KPI data value 803 as an identifier ("3" Opportunities). Alert/KPI data value 805 includes data representing a description of alert/KPI data value 807 (e.g., USD 580,277.78) which depicts a measurable key performance indicator ("KPI"). User input 809 can activate a link to access a list view, an example of which is depicted in FIG. 10.

Figure 8B:
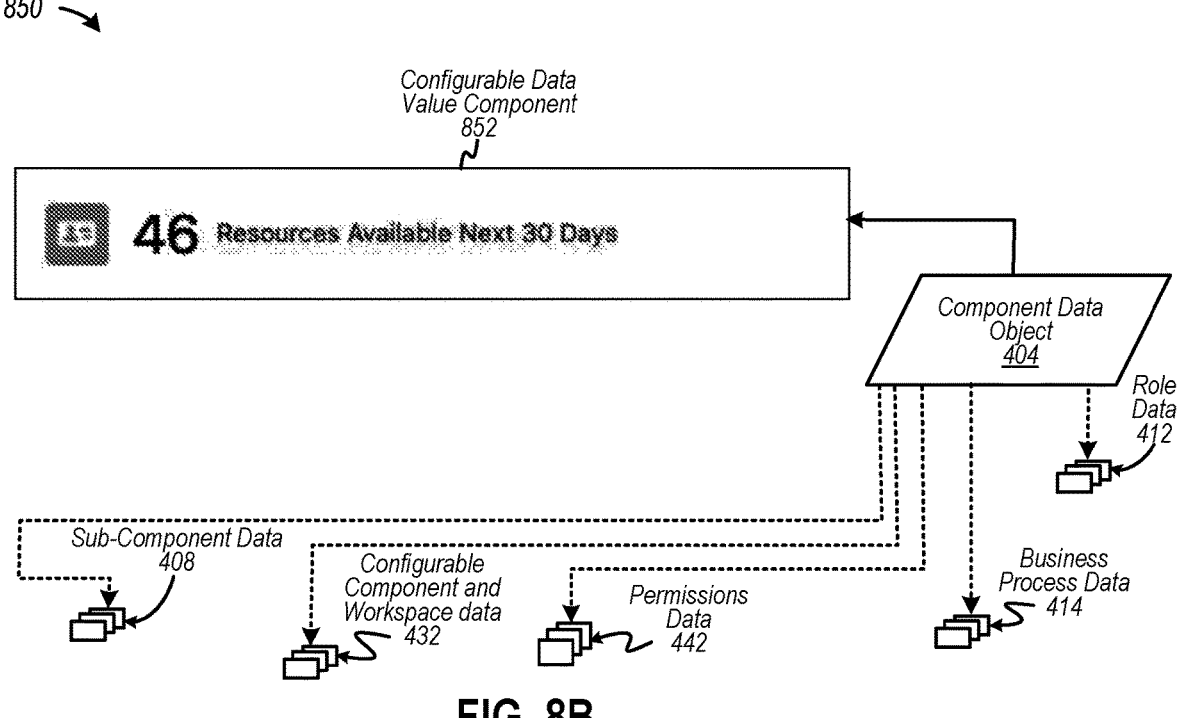

FIG. 8B depicts an example of a workspace component associated with data associated with one or more component data objects, according to some examples. Diagram 850 depicts a configurable data value component 852 as an interface portion generated by a workspace builder application, whereby configurable data value component 852 is associated with component data object 404. Types of data implemented in configurable data value component 852 may be based on a function of role data 412 including persona data, business process data 414, and permissions data 442. In some examples, configurable component and workspace data 432 may include links to data representing a numeric value, such as a "count," which summarizes data. As shown, configurable data value component 852 represents a "count" of "46 resources available for the next 30 days," which may be relevant to a project manager or any other role.

Figure 9:
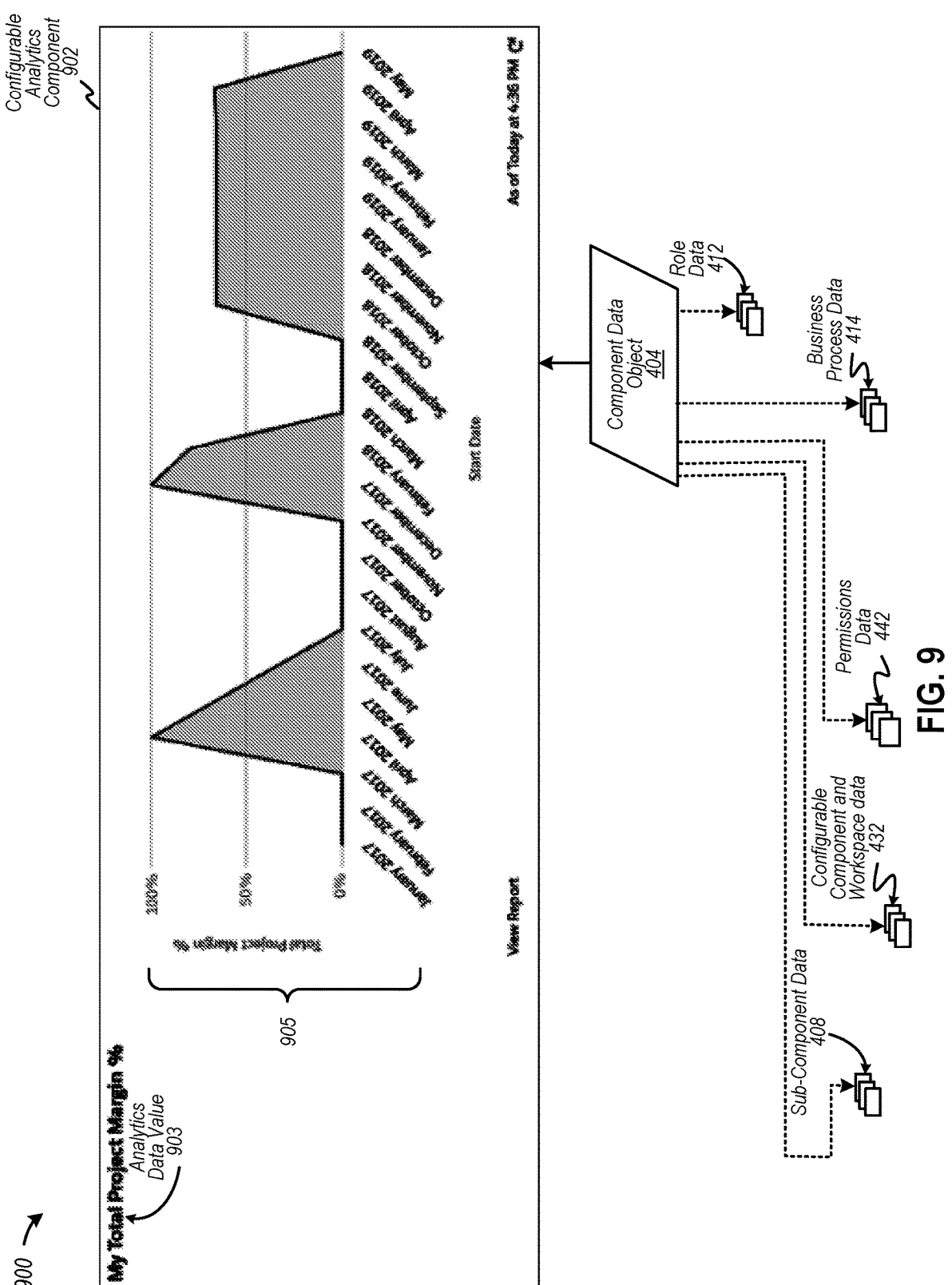

FIG. 9 depicts an example of a workspace component associated with data associated with one or more component data objects, according to some examples. Diagram 900 depicts a configurable analytics component 902 as an interface portion generated by a workspace builder application, whereby configurable analytics component 902 is associated with component data object 404. Types of data implemented in configurable analytics component 902 may be based on a function of role data 412 including persona data, business process data 414, and permissions data 442. In some examples, configurable component and workspace data 432 may include links to data derived from an analytics application and formatted for presentation based on data generated by an interface controller. The presentation may be a portion of an interface (e.g., using HTML, XML, or the like). As shown, configurable component and workspace data 432 may include data representing an analytics data value 903 (e.g., a description) as well as data values 905 representing a "total project margin" in terms of percentage over time.

Figure 10:
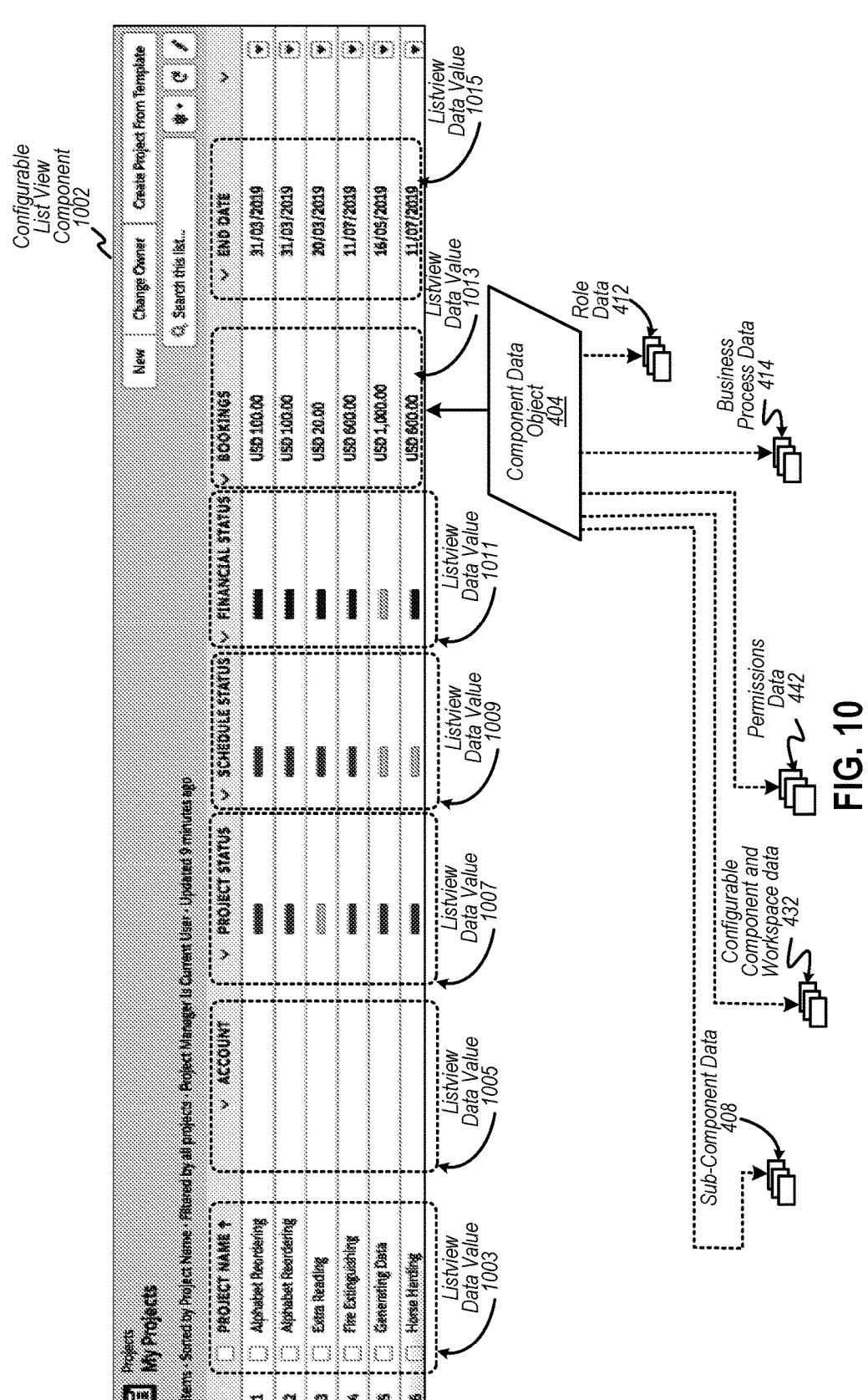

FIG. 10 depicts an example of a workspace component associated with data associated with one or more component data objects, according to some examples. Diagram 1000 depicts a configurable list view component 1002 as an interface portion generated by a workspace builder application, whereby configurable list view component 1002 may be associated with component data object 404. Types of data implemented in configurable list view component 1002 may be based on a function of role data 412 including persona data, business process data 414, and permissions data 442. In some examples, configurable component and workspace data 432 may include links to data representing various list view data values ("project name") 1003, list view data values ("account identifiers") 1005, list view data values ("project status") 1007, list view data values ("scheduled status") 1009, list view data values ("financial status") 1011, list view data values ("bookings") 1013, and list view data values ("end date") 1015.

Figure 11:
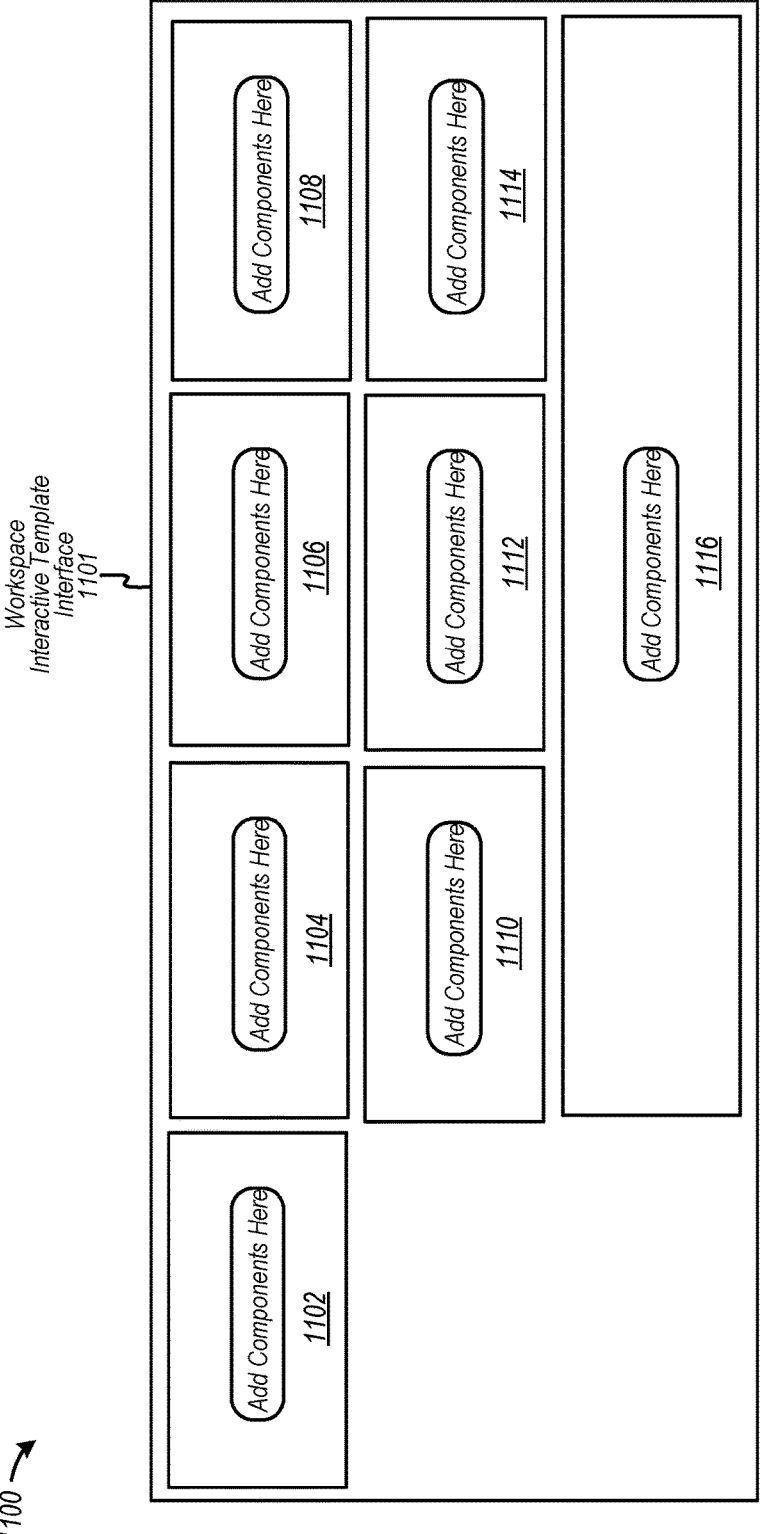
FIG. 11 depicts an example of a workspace interactive template interface, according to some embodiments.

FIG. 11 depicts an example of a workspace interactive template interface, according to some embodiments. As shown, diagram 1100 includes workspace interactive template interface 1101, which includes configurable interface portions 1102 to 1116. In at least one example, configurable interface portion 1102 may be configured to implement a configurable navigation component, configurable interface portions 1104 to 1108 may be configured to implement configurable alert/KPI components, configurable interface portions 1110 to 1114 may be configured to implement configurable data value components, and one or more configurable interface portions 1116 may be configured to implement a configurable analytics component and/or a configurable list view component. Note that any description of a component is not intended to be limited to navigation components, but may refer to any component that may be, for example, implemented in an application, in software, or as any subset of executable instructions.

Figure 12:
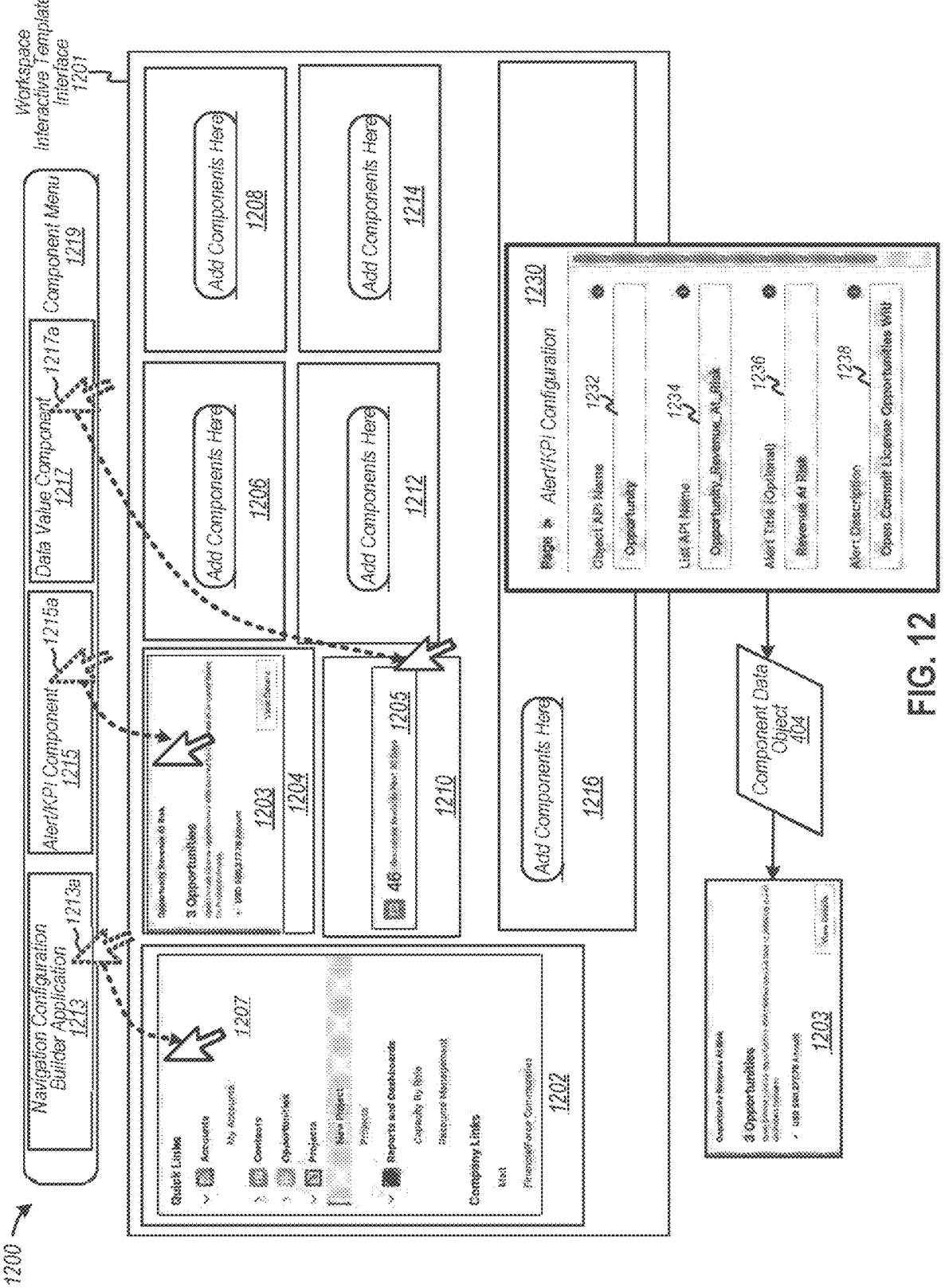
FIG. 12 depicts an example of using a workspace builder application to implement a workspace interactive template interface to generate a workspace interface, according to some embodiments.

FIG. 12 depicts an example of using a workspace builder application to implement a workspace interactive template interface to generate a workspace interface, according to some embodiments. Diagram 1200 depicts a workspace interactive template 1201 interacting with sources of data with which to build a workspace, the sources of data included in a component menu 1219 interface portion. As shown, a selection element 1213a may be configured, under operation of a workspace builder application, to "drag and drop" a configurable navigation component 1207 in configurable interface portion 1202 from a navigation configuration builder application 1213. A selection element 1215a may be configured by a workspace builder application to "drag and drop" a configurable alert/KPI component 1203 in configurable interface portion 1204 from one or more components representing alert/KPI component data 1215. A selection element 1217a may be configured by a workspace builder application to "drag and drop" a configurable data value component 1205 in configurable interface portion 1210 from one or more components representing data value component data 1217. Other configurable interface portions 1206, 1208, 1212, 1214, and 1216 may be implemented similarly. Further to diagram 1200, implementing configurable alert/KPI component 1203 may generate data 1230 automatically (or may be implemented manually) to include an object API name 1232, a list API name 1234, an alert title 1236, and an alert description 1238, as well as any other data, at least some of which may be stored in component data object 404 in association with configurable alert/KPI component 1203.

Figure 13:
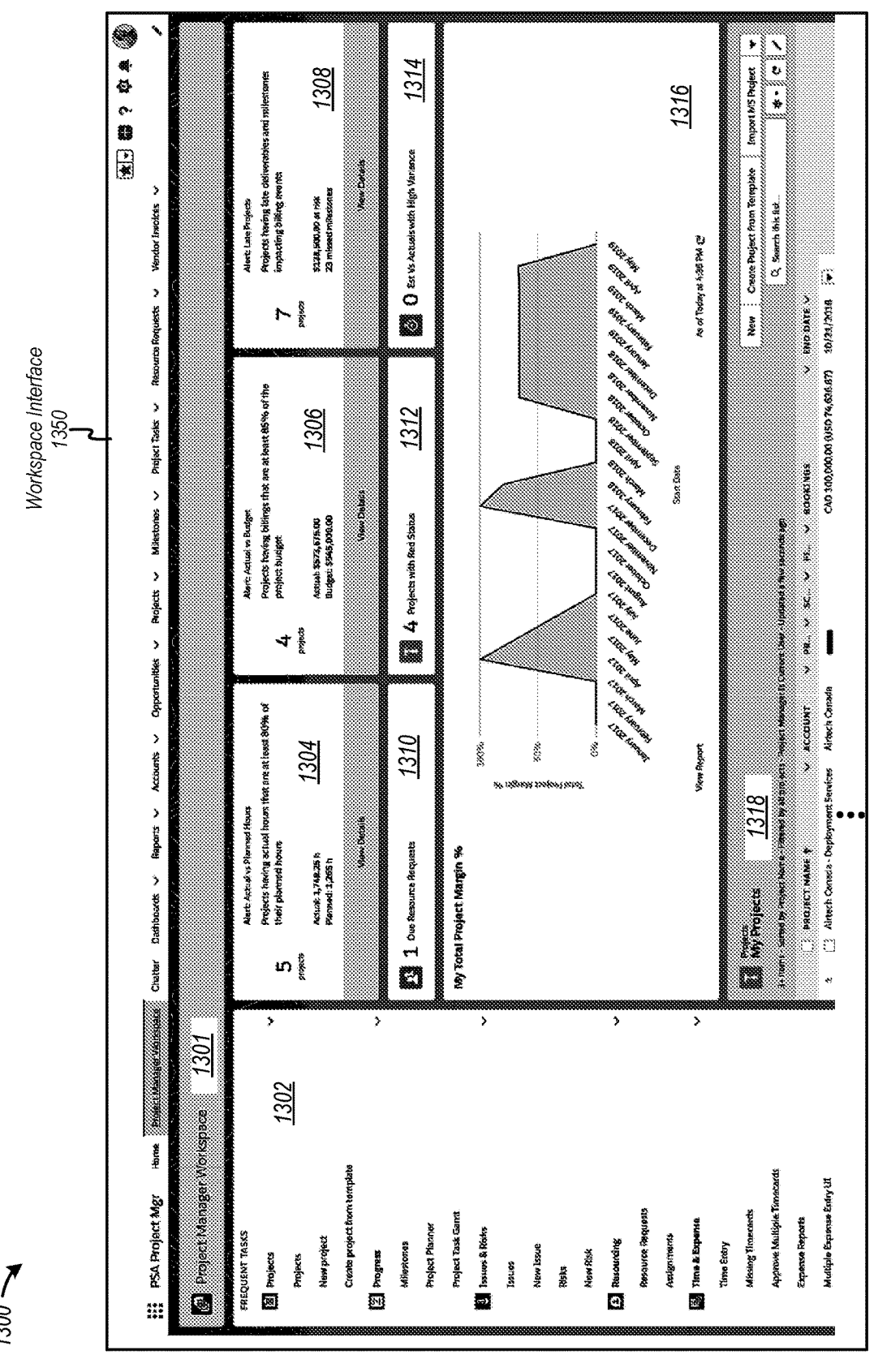
FIGS. 13 and 14 depict examples of workspace interfaces generated using a workspace builder application, according to some examples.
Figure 14:
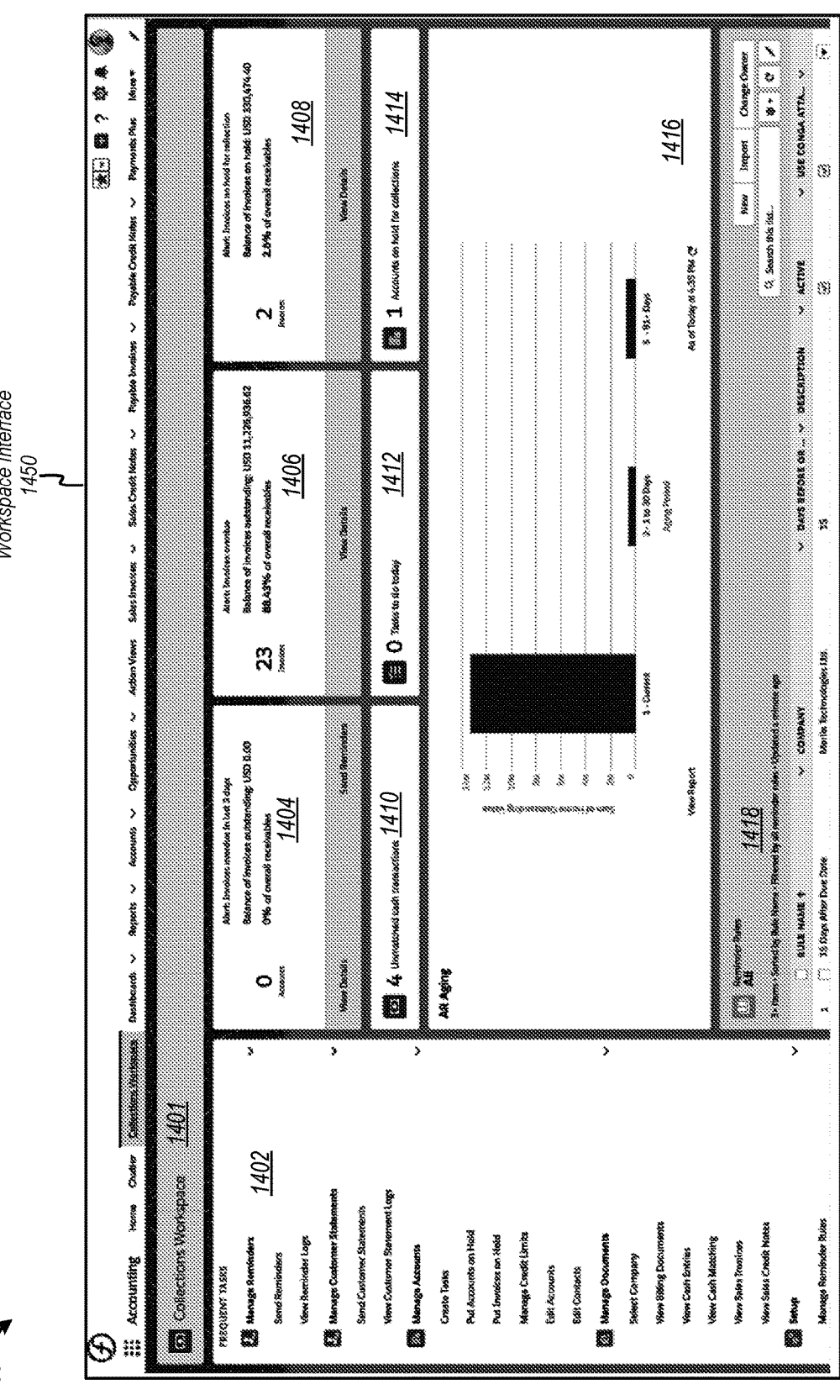

FIGS. 13 and 14 depict examples of workspace interfaces generated using a workspace builder application, according to some examples. Diagram 1300 of FIG. 13 may include a workspace interface 1350 configured to provide a project manager workspace 1301, which may be configured to be customized in accordance with a persona, a role, a business function, set of permissions, and the like. Project manager workspace 1301 includes configurable navigation component 1302, configurable alert/KPI components 1304 to 1308, configurable data value components 1310 to 1314, configurable analytics component 1316, and a configurable list view component 1318. Diagram 1400 of FIG. 14 may include a workspace interface 1450 configured to provide a collections workspace 1401, which may be configured to be customized in accordance with a persona, a role, a business function, set of permissions, and the like. Collections workspace 1401 includes configurable navigation component 1402, configurable alert/KPI components 1404 to 1408, configurable data value components 1410 to 1414, configurable analytics component 1416, and a configurable list view component 1418.

A workspace builder application is configured to generate customizable workspaces that access data from multiple sources of application data, such as CRM application data, ERP application data, external third-party application data, and any other enterprise application data via any number of APIs to access data in an enterprise data computing platform or externally at a cloud-based CRM application without, for example, opening up different webpages or page layouts to access data from different sources. A workspace builder application may be configured to generate formatting data (e.g., XML, JSON, etc.) to form a workspace interface as an automatically-generated hybrid web page that combines visual "look and feel" elements from CRM web interfaces, ERP web pages, external third-party web pages, and the like. Thus, a workspace interface may provide an integrated web page regardless of sources of enterprise-related data.

Figure 15:
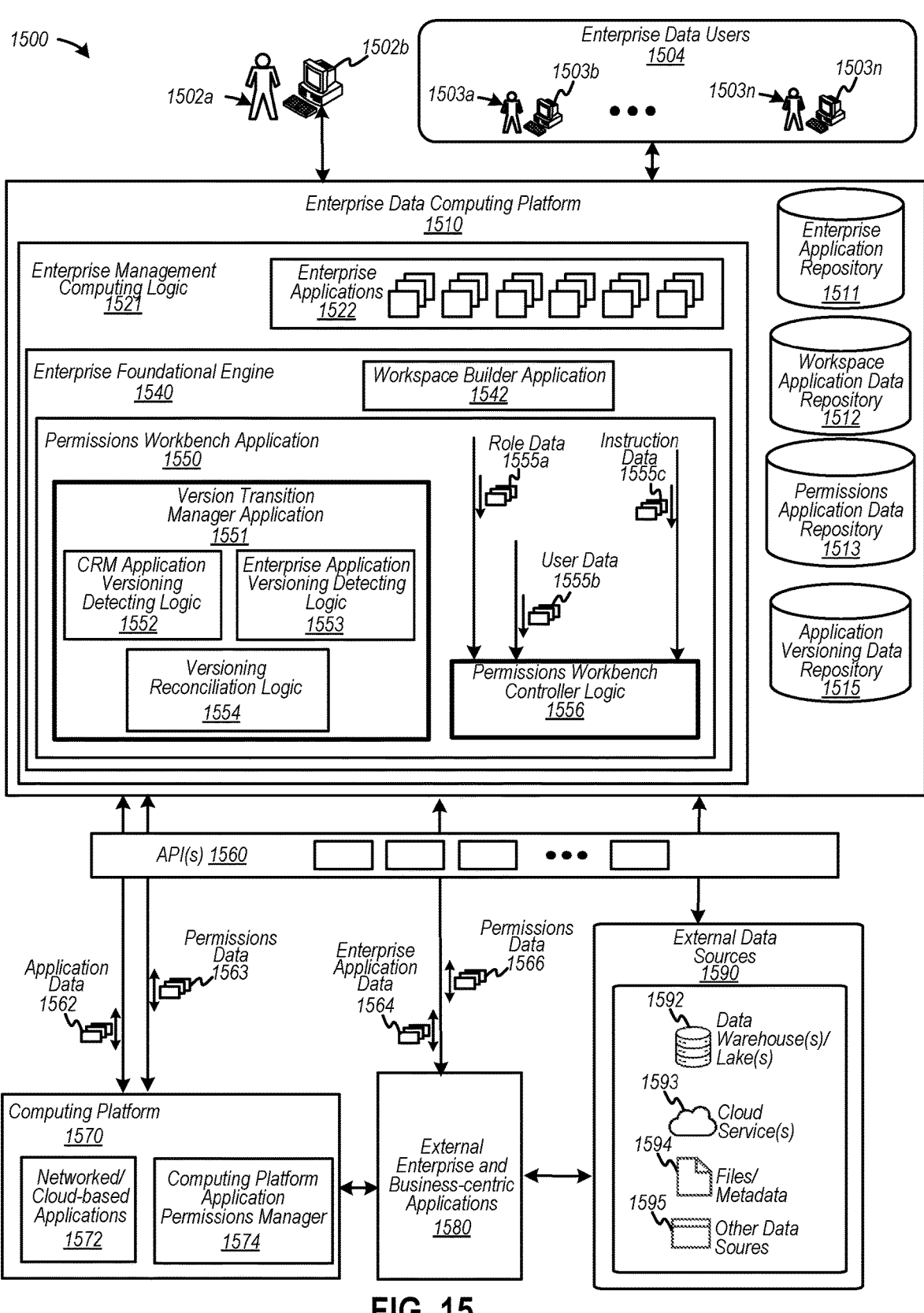
FIG. 15 is a diagram depicting an example of an enterprise foundational engine including a permissions workbench application configured to manage and generate permissions, according to some embodiments.

FIG. 15 is a diagram depicting an example of an enterprise foundational engine including a permissions workbench application configured to manage and generate permissions, according to some embodiments. Diagram 1500 depicts an enterprise data computing platform 1510 including enterprise management computing logic 1521 and enterprise applications 1522 to facilitate implementation of enterprise resource planning ("ERP") and professional services automation ("PSA") functionalities, as well as other enterprise-related functionalities. Examples of enterprise applications 1522 are described in accordance with FIG. 1. As shown, enterprise data computing platform 1510 of FIG. 15 may exchange application data 1562 via APIs 1560 with a computing platform 1570, which may be configured to implement a customer relationship management ("CRM")

application as networked/cloud-based applications 1572. Enterprise data users 1504 may include any number of users 1503a to 1503n, such as product managers, salespersons, accounts payable and accounts receivable clerks, warehouse managers, or any other person having a role in an organization. Users 1503a to 1503n may access enterprise management computing logic 1521 and enterprise applications 1522 via computing devices 1503b to 1503n.

Further to diagram 1500, enterprise management computing logic 1521 may include an enterprise foundational engine 1540, which, in turn, may include a workspace builder application 1542 and a permissions workbench application 1550. In some examples, a system administrator 1502a may implement a computing device 1502b as a computerized tool to generate a subset of permissions to filter or otherwise identify functionalities associated with a user account, including a workspace application based on the permissions. An example of an enterprise foundational engine 1540 is a Foundations™ Application developed and maintained by FinancialForce.com, Inc. of San Francisco, CA. In some examples, a subset of permissions may authorize or restrict data presented to a user, such as in a workspace computerized tool interface. Hence, computing device 1502b may be configured to access permissions workbench application 1550 to provide role data 1555a, user data 1555b and instruction data 1555c to implement permissions workbench controller logic 1556 to generate one or more permission sets. In various examples, permissions workbench controller logic 1556 may be configured to compare sets of permissions to identify one or more permissions to add or exclude a permission to form a distinct permission set. Also, permissions workbench controller logic 1556 may be configured to merge multiple permission sets of data to form a derived permission set.

In at least one example, permissions workbench controller logic 1556 may be configured to combine a subset of ERP-related (or PSA-related) permissions generated at permissions workbench controller logic 1556 with one or more permissions received via APIs 1560 as permissions data 1563 from, for example, computing platform applications permissions manager 1574 at a customer relationship management ("CRM") application 1572. Enterprise management computing logic 1521 and enterprise applications 1522 may be configured to access other enterprise application data 1564 and other permissions data 1566 via APIs 1560 in association with one or more external enterprise and business-centric applications 1580. Examples of external enterprise and business-centric applications 1580 may include third-party applications, such as accounting applications or any other application. Thus, one or more permissions may include a combination of permissions received as permissions data 1566.

Further, permissions workbench application 1550 may include a version transition manager application 1551 configured to manage permissions and permission types during upgrades in versioning of customer relationship management ("CRM") application 1572 and ERP-related (or PSA-related) applications. Version transition manager application 1551 may include CRM application versioning detecting logic 1552 configured to detect upgrades and new versions to one or more portions of customer relationship management ("CRM") application 1572, and may further include enterprise application versioning detecting logic 1553 configured to detect upgrades and new versions to one or more portions of ERP-related (or PSA-related) applications. Versioning reconciliation logic 1554 may be configured to reconcile different permissions and permission requirements based on modifications and upgrades to any software application so as to maintain sets of permissions throughout an application upgrade. Note that customer relationship management ("CRM") application 1572 may be implemented as an application provided by Salesforce.com, Inc., at least in one example. CRM application 1572 may be implemented using any other CRM applications as well. In some examples, customer relationship management ("CRM") technologies may refer to any customer or client data in the context of data associated with any computing platform (e.g., a Salesforce CRM platform, a FinancialForce computing platform, etc.).

As shown, enterprise management computing logic 1521 and enterprise applications 1522 may be configured to access external data sources 1590 via APIs 1560 to receive data from any data storage or data arrangement, such as a data warehouse or a data lake 1592, one or more cloud services 1593, one or more data files and metadata files 1594, and any other external data 1595. Further, enterprise management computing logic 1521 and enterprise applications 1522 may be configured to access data repositories 1511 to 1515, which may include an enterprise application repository 1511 configured to store enterprise data, a workspace application data repository 1512 configured to store component data objects and a data model including a number of component data objects, a permissions application data repository 1513 configured to store permissions data in a data arrangement constituting a permissions data model, and an application versioning data repository 1515 configured to store application versioning data to maintain permissions over application updates and versions.

FIG. 16 is a flow diagram as an example of a flow 1600 implementing an application configured to configure, manage, and identify data representing permissions associated with one or more data objects configured to manage enterprise processes, according to some embodiments. In some examples, a subset of permissions may be used to filter or otherwise identify functionalities associated with a user account, especially to configure a workspace interface (or any other interface) using a computerized tool that includes a workspace application configured based on the permissions. In some examples, a subset of permissions may authorize or restrict data presented to a user, such as in a workspace computerized tool interface.

At 1602, an application at a computing platform may be activated to identify or assign data representing a permission (or one or more permissions) in association with a data object, such as a component data object. In some examples, a component data object may include data as an object as described herein, and, in some instances, may be implemented to support enterprise data management via a workspace interface of a computerized tool, such as a computerized tool. As an example, assigning data representing a permission to a data object may constitute at least assigning a component data object with which to customize a workspace interface computerized tool for use to implement a persona, a user profile, a process flow (e.g., a business process flow), or the like. In some examples, an application may be implemented as a permissions workbench application, or any other application configured to manage permissions over a CRM and ERP application or any other application.

Further, activating an application at a computing platform may be configured to identify a permission in association with a data object, such as a component data object, to facilitate access to one or more logical components of a computing platform. A logical component may include any application or sub-application, or a portion of code, configured to facilitate analysis and implementation of enterprise data as described herein. In some examples, a logical component may constitute a portion of the component data object, and may include an application or a portion thereof. In other examples, a logical component may include data representing a workspace as well as any component thereof, including a navigational component. In at least one instance, a logical component may include data representing a page layout based on executable instructions exchanged via an API with an underlying platform application, such as a CRM application.

At 1604, data representing an enterprise function object may be identified, whereby an enterprise function object may include a subset of data in a data arrangement that specifies data relating to a specific function (e.g., a task object), such as a role or function performed via a portion of an application associated with a user. As such, an enterprise function object may be associated with a process (e.g., a business or enterprise processes) and/or a persona, which, in some examples, may include a subset of data describing permissions for a user to access personalized data as depicted in a workspace interface.

At 1606, data representing a first subset of permissions may be accessed via an application programming interface ("API") associated with an enterprise function data object. In some examples, data representing permission data may be configured to access an underlying application (or any other application), such as a CRM application or a third-party computing platform or data source.

At 1608, data representing a second subset of permissions associated with an application configured to use workspace data may be accessed. A second subset of permissions may represent data associated with another application, such as an ERP application. A second subset of permissions may be configured to access a subset of data associated with the ERP application, whereas a first subset of permissions may be configured to access the CRM application, whereby data representing any number permissions may be configured to access collectively the ERP application and the CRM application.

At 1610, data representing a control data signal may be received to perform a data operation. In some examples, a control data signal may be based on one or more of a first subset of permissions and a second subset of permissions, whereby a first subset of permissions may be relevant to CRM application and a second subset of permissions may be relevant to an ERP application. A control data signal may be generated in association with a workspace builder application (e.g., use of a workspace interface) and may include data configured to access data via an API based on one or more subsets of permissions. In at least one example, a control data signal may be generated at a user interface (e.g., a permissions workbench application) or may be generated automatically based on an update or versioning of an application, such as either a CRM, an ERP, or any other application.

In some examples, a control data signal to perform a data operation may include executable instructions configured to compare data representing a first subset of permissions and a second subset of permissions to detect a permission (e.g., a distinct permission) in either subsets of permissions, or both. In some cases, a group of permissions may be associated with a CRM or another application, and another group of permissions may be associated with an ERP or another application, whereby a set of permissions may be derived as a new set of permissions (e.g., a third subset of permissions)

based on current groups of permissions. Further, a data operation may include a data operation of one or more of comparing, adding, deleting (e.g., "muting" or excluding), and merging one or more permissions (e.g., distinct permissions) to form a new subset of permissions, which may exclude a distinct (or different) permission. In one example, a control data signal may be received automatically responsive to executable instructions configured to implement a version transition manager application, which may be configured to manage and maintain permission during transitions from one version of an application to another version of an application.

At 1612, data representing a subset of permissions may be generated based on a first subset of permissions and a second subset of permissions. For example, a subset of permissions may be generated in combination so as to access multiple applications. At 1614, a subset of one or more permissions (e.g., a third subset of permissions) may be associated with a data object (e.g., a permissions data object) to control access in association with an enterprise data object. In some examples, a permission set data model may be generated to store data representing subsets of permissions from a first version to a second version of the computing platform, whereby permissions may be used to transition from one version to another version (e.g., versioning of CRM, ERP, or other applications). Further, a permission set data model may include or constitute a component data object or any enterprise data object.

Figure 17:
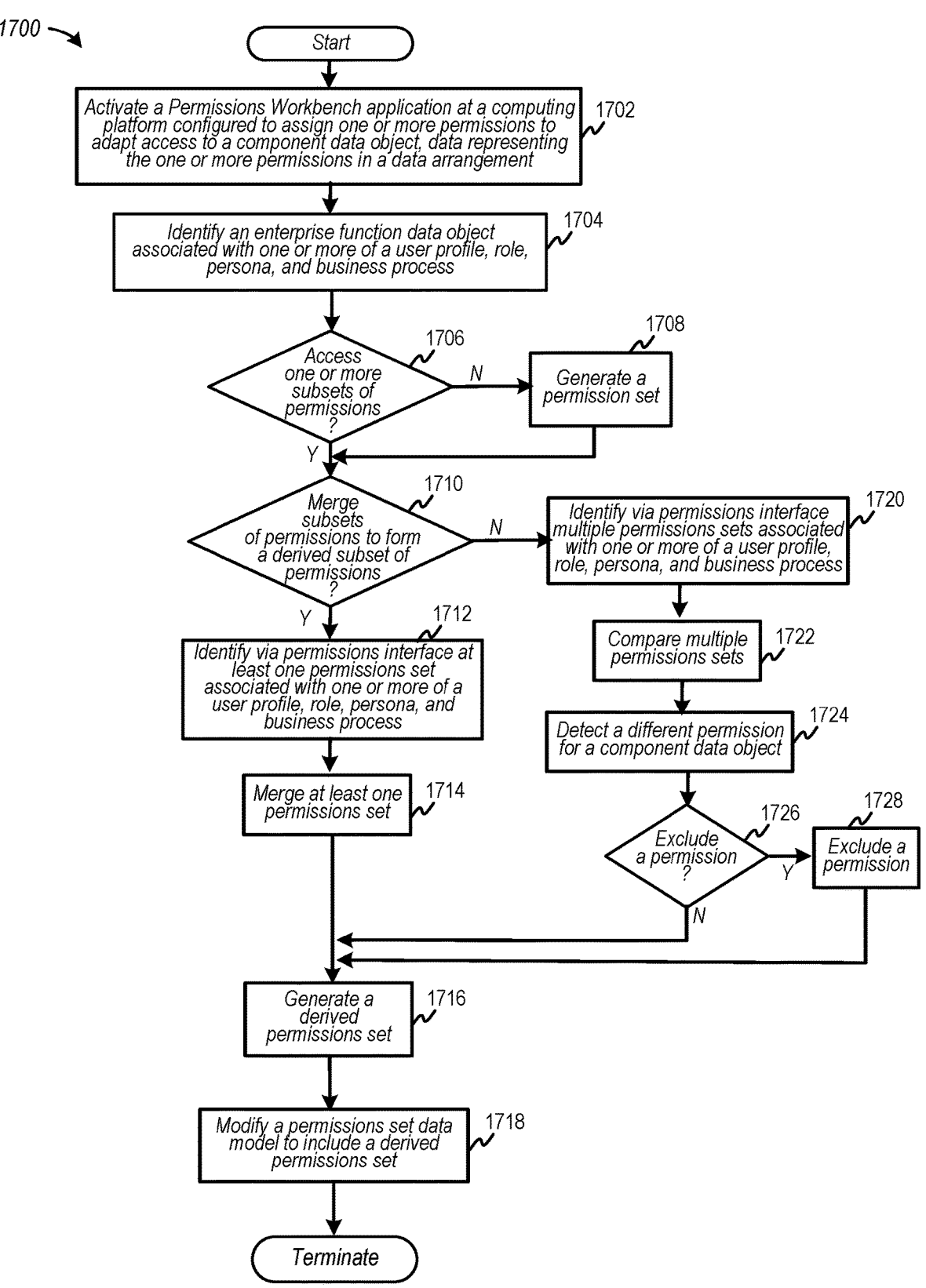
FIG. 17 is another flow diagram as another example of implementing an application configured to configure, manage, and identify data representing permissions associated with one or more data objects configured to manage enterprise processes, according to some embodiments.

FIG. 17 is another flow diagram as another example of implementing an application configured to configure, manage, and identify data representing permissions associated with one or more data objects configured to manage enterprise processes, according to some embodiments. At 1702 of flow 1700, a permissions workbench application may be activated at, for example, a computing platform (e.g., a cloud-based enterprise computing platform) to manage access to one or more logical components or processes in an organization or enterprise. A permissions workbench application may be configured to assign one or more permissions to a component data object, which may represent data representing a user, a business process, a persona, etc.

At 1704, an enterprise function data object may be associated with, or may include data representing, one or more of a user profile, a role, a persona, a business process, or the like, may be identified. At 1706, a determination is made as whether to access one or more permissions to form a new set of permissions. A permission set may be generated initially (e.g., manually) at 1708. Otherwise, another determination at 1710 may be made as to whether to merge subsets of permissions to form or derive a subset of permissions. If not, flow 1700 continues to 1720 at which multiple permission sets associated with one or more of a user profile, a role, a persona, and business process may be identified as one or more component data objects (e.g., via a permissions interface associated with a permissions workbench application). At 1722, multiple permission sets may be compared or matched to detect at 1724 whether a distinct or different permission is associated with a component data object. A distinct or different permission in one permission set may be added to another permission set, or may be excluded (or "muted") at 1728 after determining whether to exclude a permission at 1726. A derived permission set may be generated at 1716, at which a permission may be added or excluded.

Returning to 1710, a determination may be made to merge subsets of permissions to form a derived subset of permissions. At 1712, at least one permission set associated with one or more of a user profile, a role, a persona, and a business process may be identified for purposes of merging subsets of permissions together 1714 (e.g., via a permissions interface associated with a permissions workbench application). At 1716, a derived permission set may be generated as a result of merging permissions data. At 1718, a permissions set data model may be modified to include a derived permission set, whereby a permissions set data model may include a data arrangement in which subsets of permissions data are stored and inter-related (e.g., linked) based on data representing a user profile, a role, a persona, or a business process.

Figure 18:
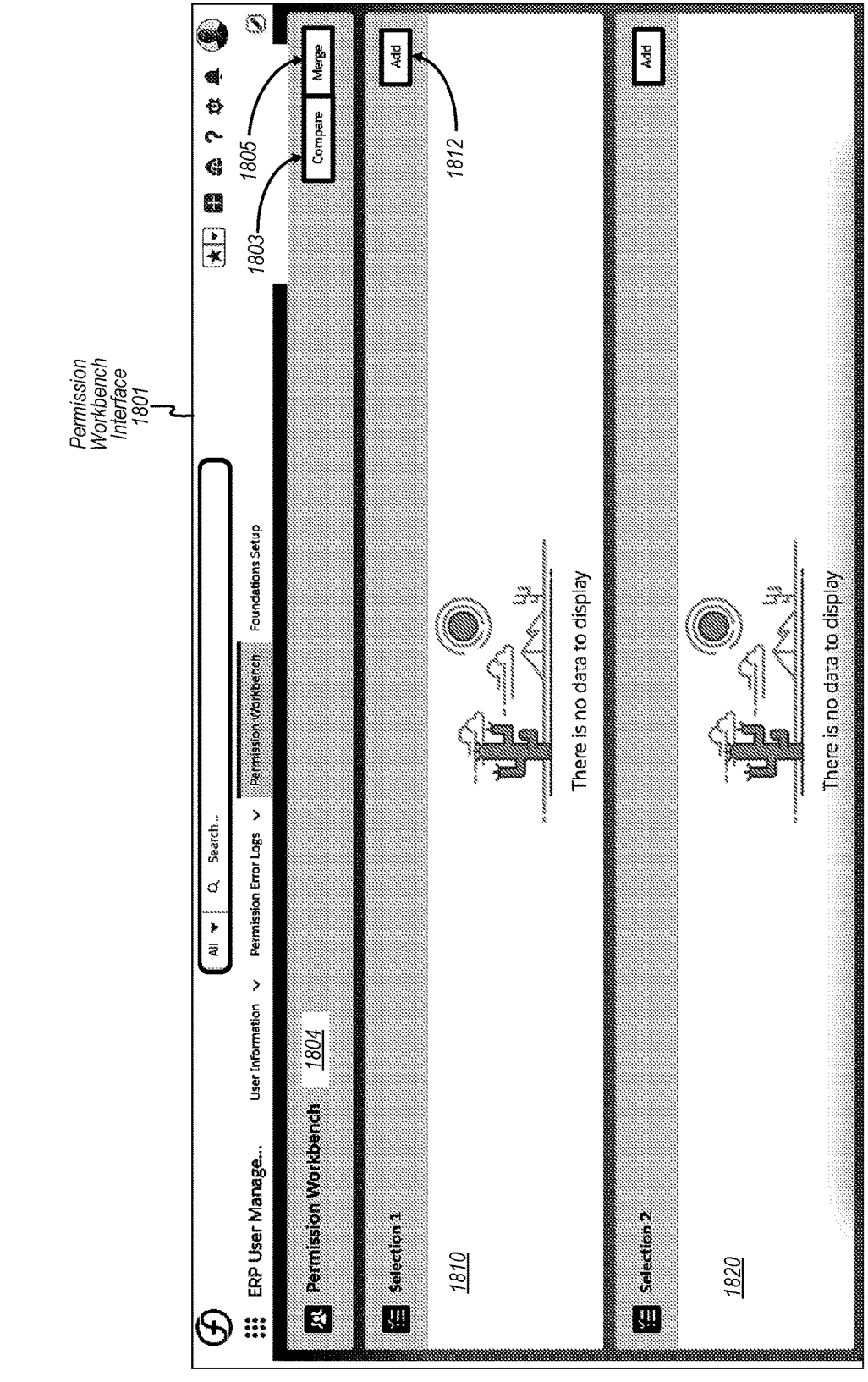
FIGS. 18 to 29 depict examples of permission workbench interfaces as a computerized tool for generating and managing permission, according to some examples.
Figure 19:
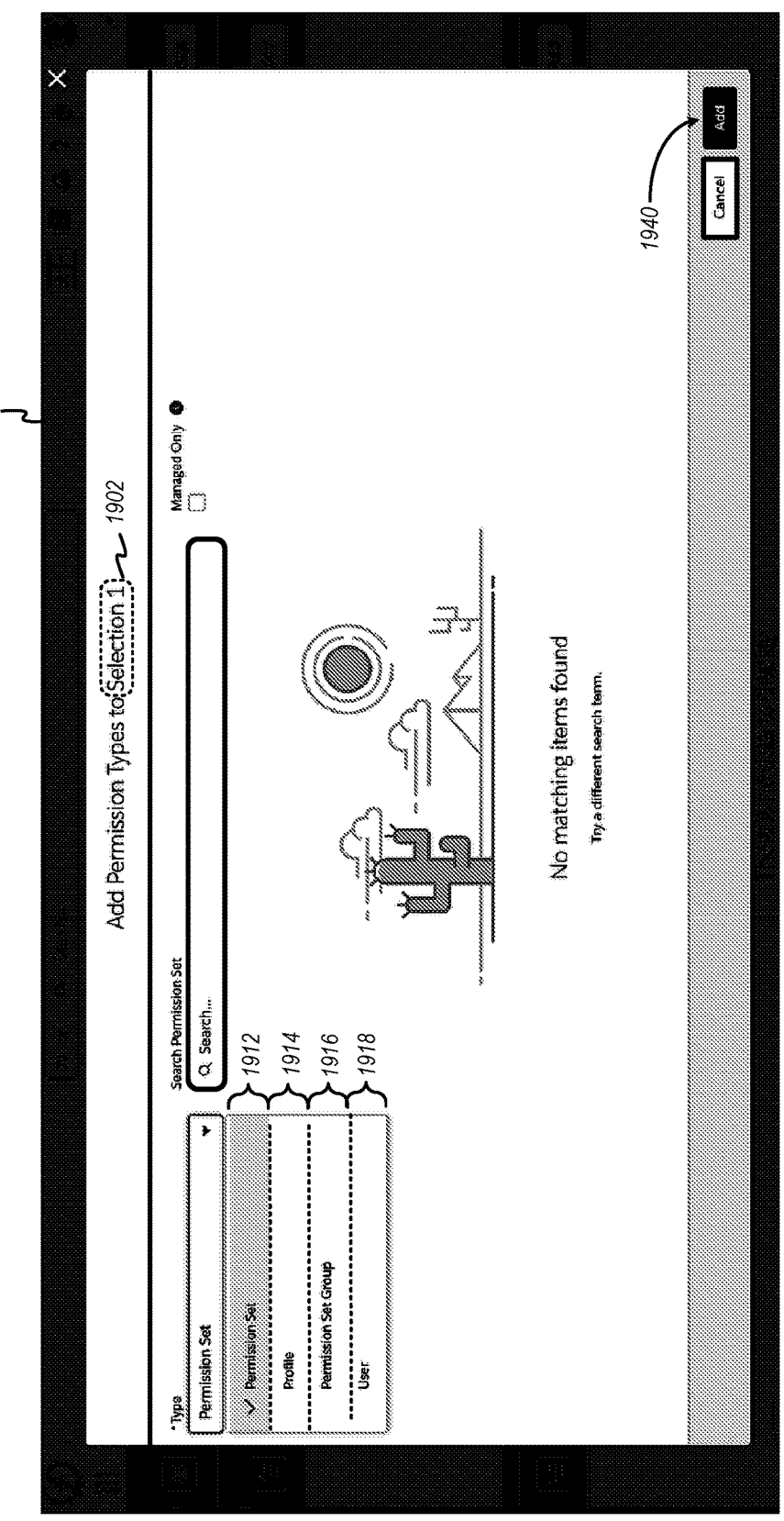

FIGS. 18 to 29 depict examples of permission workbench interfaces as a computerized tool for generating and managing permissions, according to some examples. FIG. 18 is a diagram 1800 depicting a permission workbench interface 1801 including a permission workbench application 1804 configured to receive data representing permissions as ("selection 1") 1810 and permissions as ("selection 2") 1820. User input 1812 may be configured to add one or more permissions with which to analyze and use to build one or more permission sets. User input 1803 may be configured to activate a comparison between two or more groups of permissions to add, exclude, or merge, or otherwise modify. User input 1805 may be configured to merge one or more groups of permissions to form a derived permission set. FIG. 19 is a diagram 1900 depicting a permission workbench interface 1901 configured to select or add a permission type to interface portion ("selection 1") 1902. A permission type may be selected as a permission set 1912, a profile or role 1914, a permission set group 1916 (e.g., groups of permission sets 1912), and a user account or data representing a user profile 1918, any of which may be entered as selection 1 by activating user input 1940 to save the selection.

Figure 20:
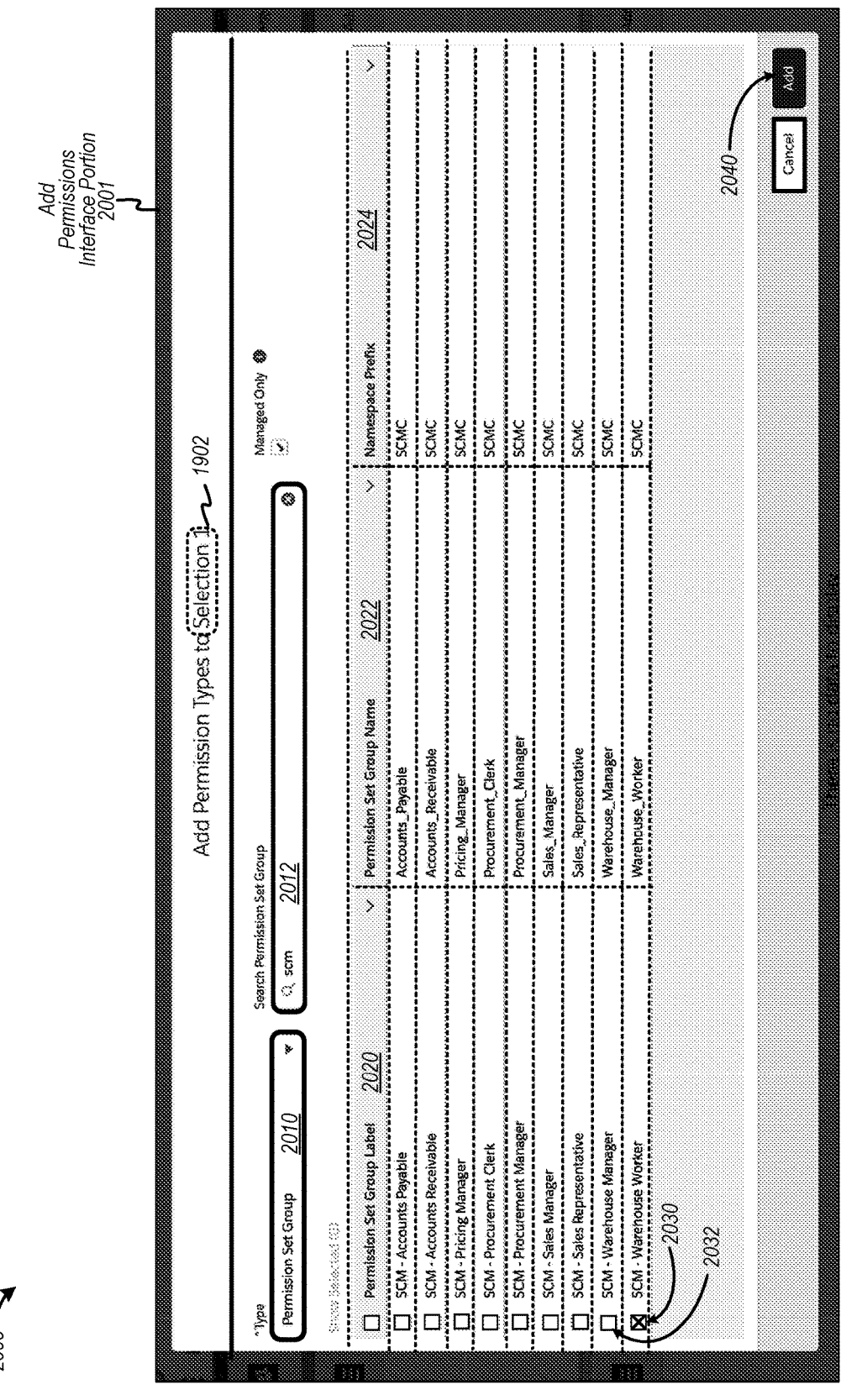

FIG. 20 is a diagram 2000 depicting a permissions workbench interface configured to add permissions using an interface portion 2001. User input 2010 selects a permission set group associated with search results entered into user input 2012, which includes a search of "SCM" to access permissions with supply chain management enterprise applications. As shown, interface portion 2001 includes permission set group labels 2020, permission set group names 2022 (each of which may be associated to an API), and namespace prefixes 2024. First, selection by user input 2030 may be configured to activate permission workbench application to cause permissions for a "warehouse worker" 2112 as to be entered into ("selection 1") 2110 of FIG. 21, whereas selection of user input 2032 of FIG. 20 may be configured to cause a permission workbench application to implement permissions for a "warehouse manager" to be entered into ("selection 2") 2120 of FIG. 21. User input 2040 of FIG. 20 may cause a permission workbench application to save selections for use in a permissions workbench interface 2101 of FIG. 21.

Figure 21:
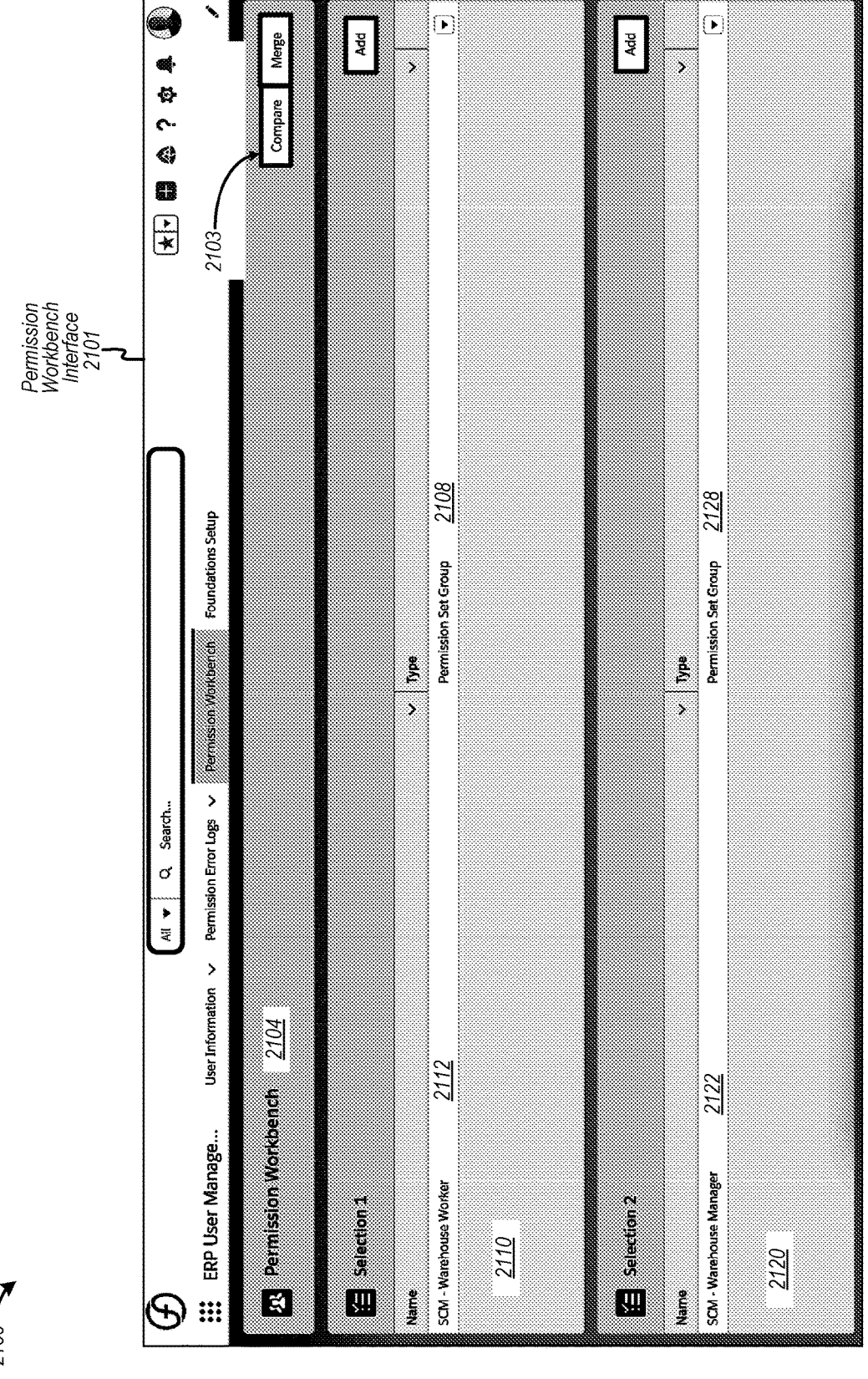

FIG. 21 shows a diagram 2100 including a permissions workbench interface 2101 for a permissions workbench application 2104. As shown, data representing a permission set group 2108 may be associated with a warehouse worker 2112 and data representing a permission set group 2128 may be associated with a warehouse manager 2122. Activation of user input 2103 may be configured to compare permission set groups 2108 and 2128.

Figure 22:
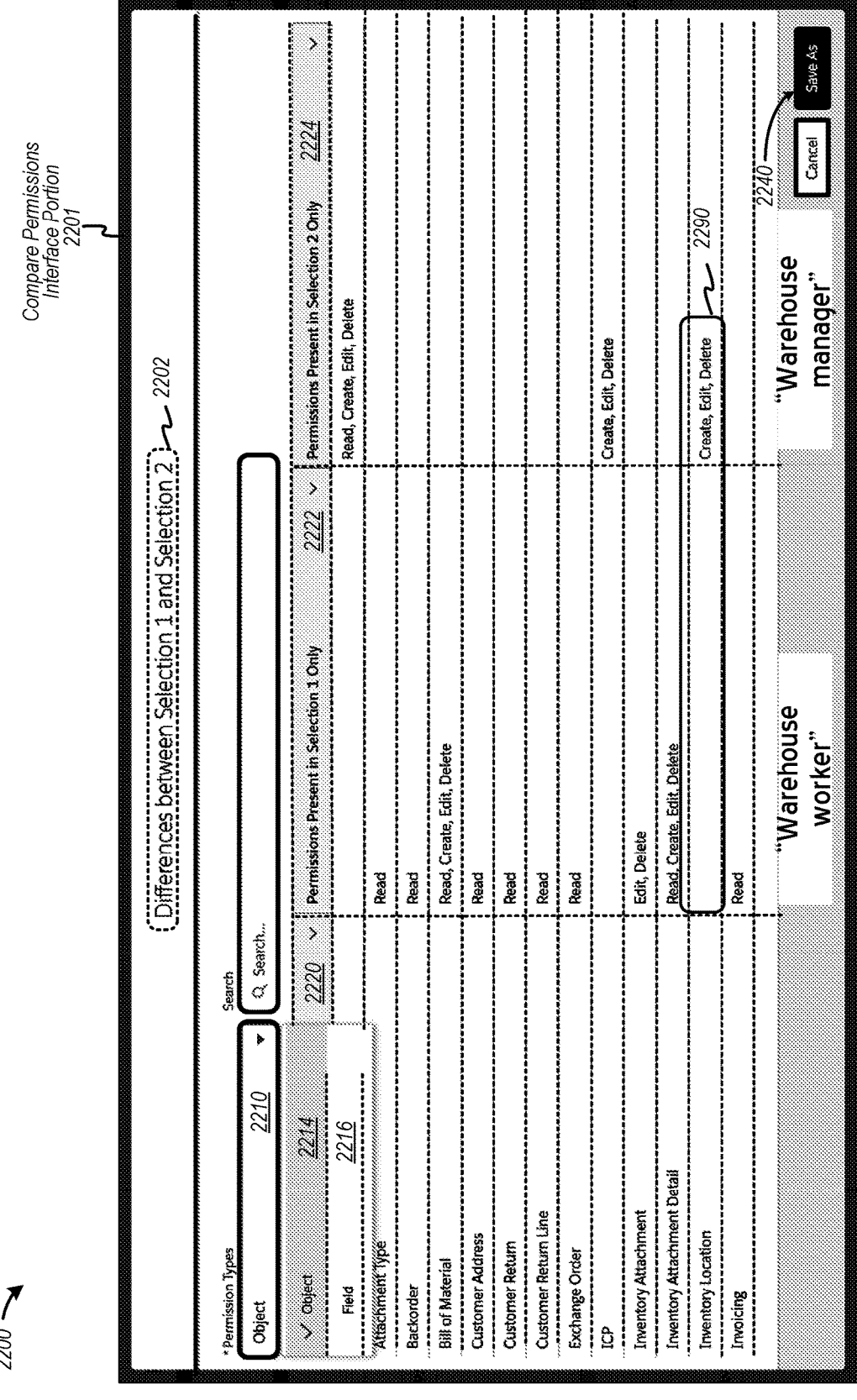

FIG. 22 is a diagram 2200 including a compare permissions interface portion 2201 configured to analyze and extract differences between selections ("1 and 2") 2202, whereby permissions 2222 associated with selection 1 (e.g., a "warehouse worker") and permissions 2224 associated with selection 2 (e.g., a warehouse manager") are shown. An object name 2220 may be selected by user input 2210 as input ("object") 2214. Object names 2220 each may be associated with an API configured to access an object, such as a component data object (or an object representing a permission data). In some examples, an object may represent a data arrangement, such as a database table or a graph data arrangement. User input 2216 may be configured to access data associated with a field (e.g., a column) of an object. Other user inputs (not shown) may be configured to access records of an object. Further, differences in permissions are shown in example 2290 in which a warehouse worker has no permissions for an object "Inventory Location," whereas a warehouse manager has "create," "edit," and "delete" permissions. User input 2240 may be configured to save the differences between roles of warehouse worker and warehouse manager.

Figure 23:
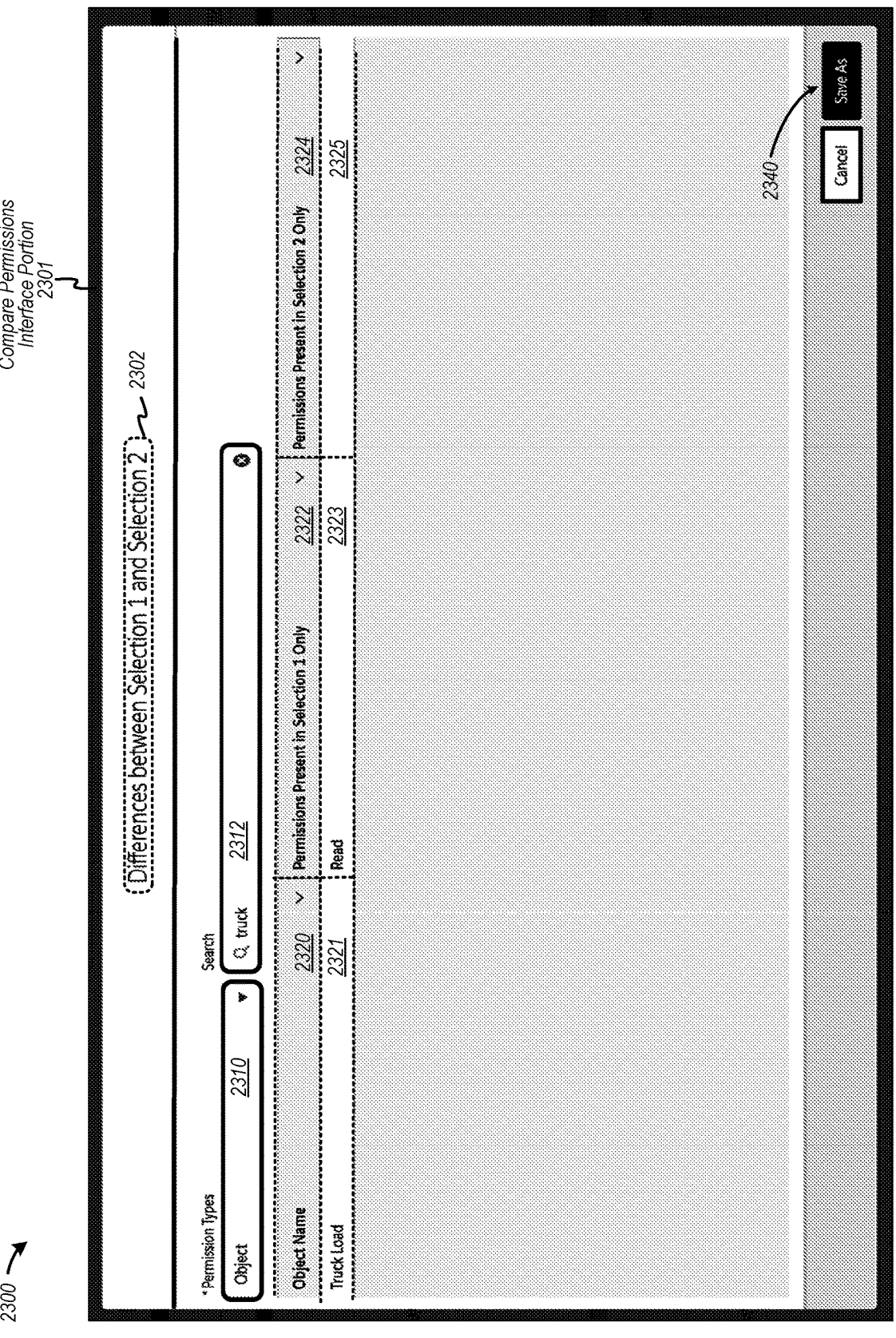

FIG. 23 is a diagram 2300 including a compare permissions interface portion 2301 configured to analyze and extract differences between selections ("1 and 2") 2302, whereby permissions 2322 associated with selection 1 (e.g., a "warehouse worker") and permissions 2324 associated with selection 2 (e.g., a warehouse manager") are shown as a result of a search using a user input 2312 for an object 2310 including "truck." The search results for an object name 2320 yield a "truck load" 2321 which may be associated with an API in some examples. The warehouse worker has a "read" permission 2323, whereas the warehouse manager has no permissions 2325. User input 2340 may be configured to save the differences for object "truck load."

Figure 24:
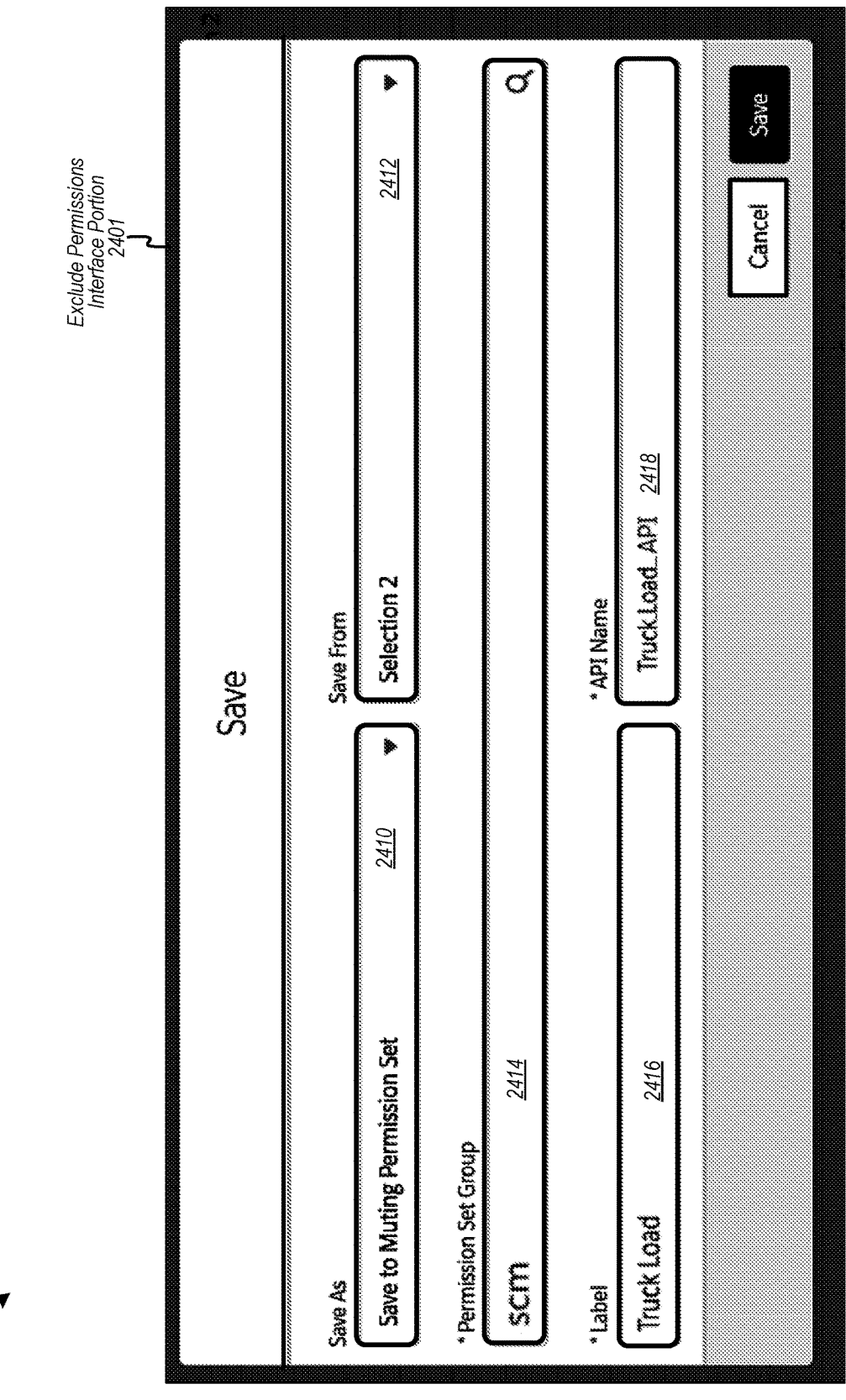

FIG. 24 is a diagram 2400 including an exclude permissions interface portion 2401, which is configured to exclude or "mute" one or more permissions associated with permission set group 2414 by activating user input 2410. As shown, a permission associated with selection 2 (e.g., "warehouse manager") 2412 may be excluded. For example, object "truck load" 2416 associated with an API ("Truck_Load_API") 2418 may exclude one or more permissions associated with selection ("2") 2412.

Figure 25:
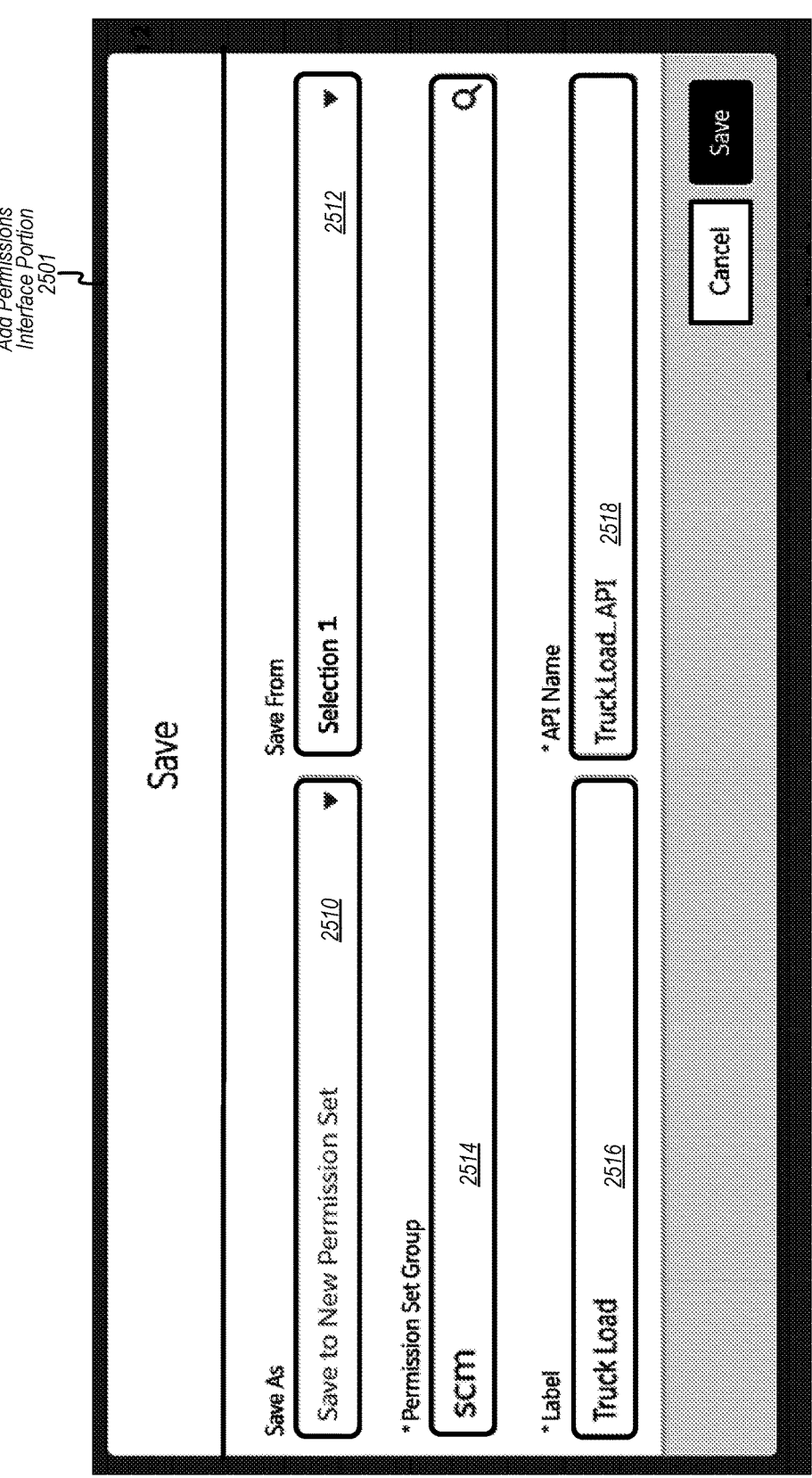

FIG. 25 is a diagram 2500 including an add permissions interface portion 2501, which is configured to include one or more permissions to generate a new permission set group 2514 by activating user input 2510. As shown, a permission associated with selection 1 (e.g., "warehouse worker") 2512 may include an added or modified permission. For example, object label ("truck load") 2516 associated with an API ("Truck_Load_API") 2518 may include one or more permissions associated with selection ("1") 2512.

Figure 26:
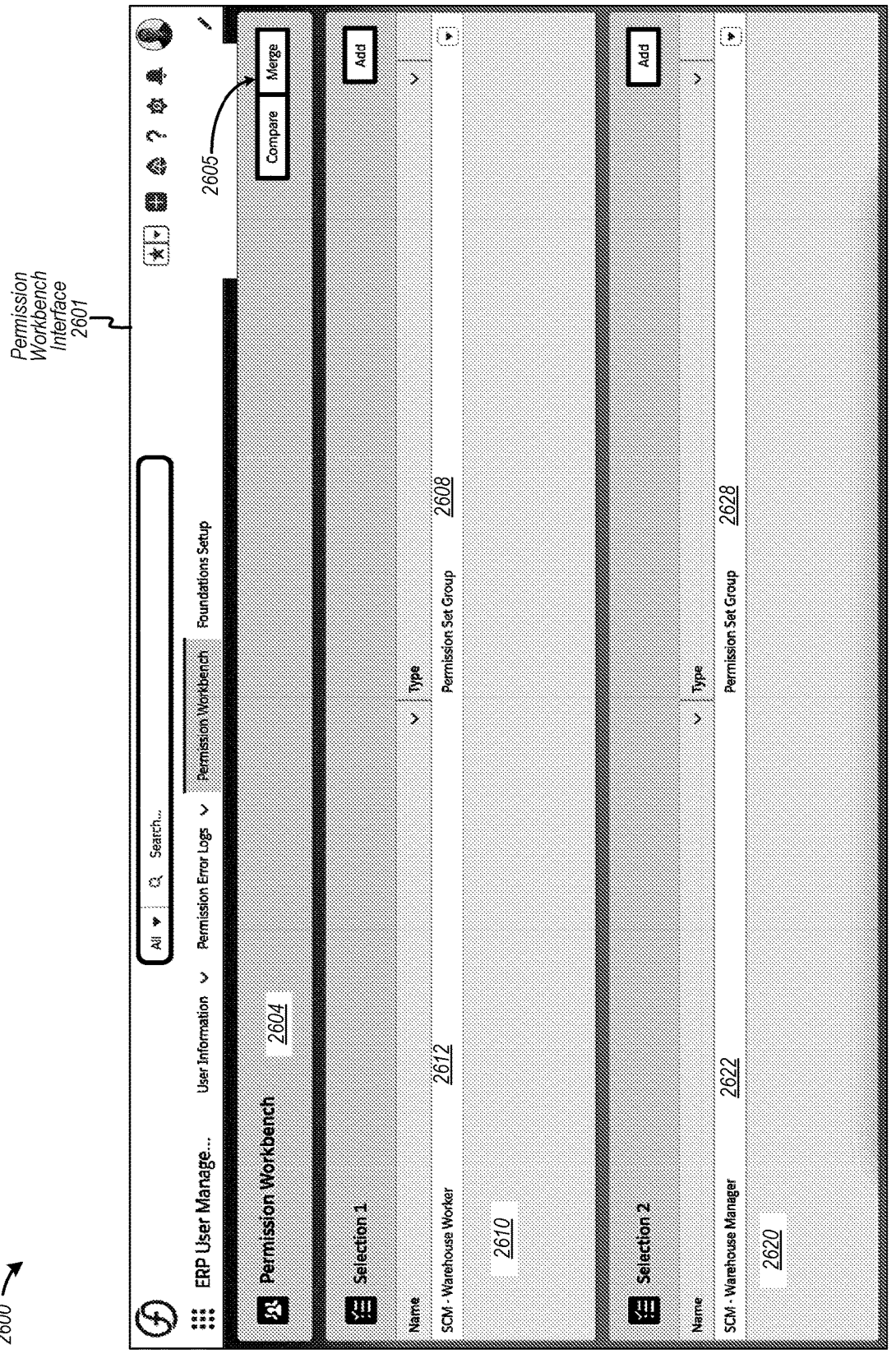

FIG. 26 is a diagram 2600 including a permission workbench interface 2601 configured to use a permissions workbench application 2604 to merge permissions in selection ("1") 2610 and selection ("2") 2620. User input 2605 may be configured to merge or combine permission set groups 2608 and 2628 associated with warehouse worker 2612 and warehouse manager 2622, respectively, to form a new merged set of permissions.

Figure 27:
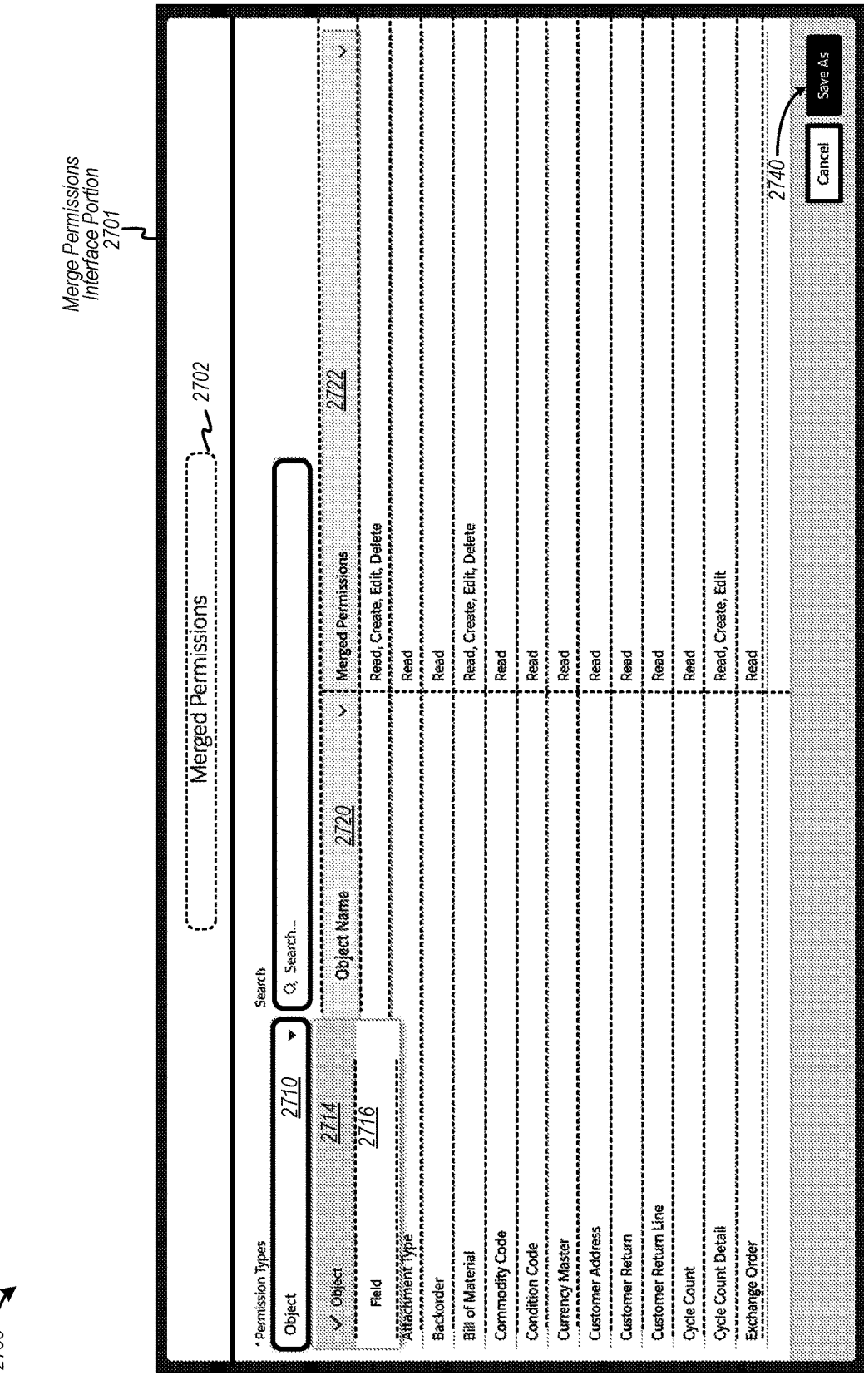

FIG. 27 is a diagram 2700 that includes a merged permissions interface portion 2701 to form merged permissions 2702. Merged permissions interface portion 2701 may be configured to merge permissions for object names 2720 to merge warehouse worker and warehouse manager permissions to form merged permissions 2722. An object name 2720 may be selected by user input 2710 as input ("object") 2714. Object names 2720 each may be associated with an API configured to access an object (or access executable instructions or code), such as a component data object (or an object representing a permission data. User input 2716 may be configured to access data associated with a field (e.g., a column) of an object. Other user inputs (not shown) may be configured to access records of an object. User input 2740 may be configured to save a merged set of permissions.

Figure 28:
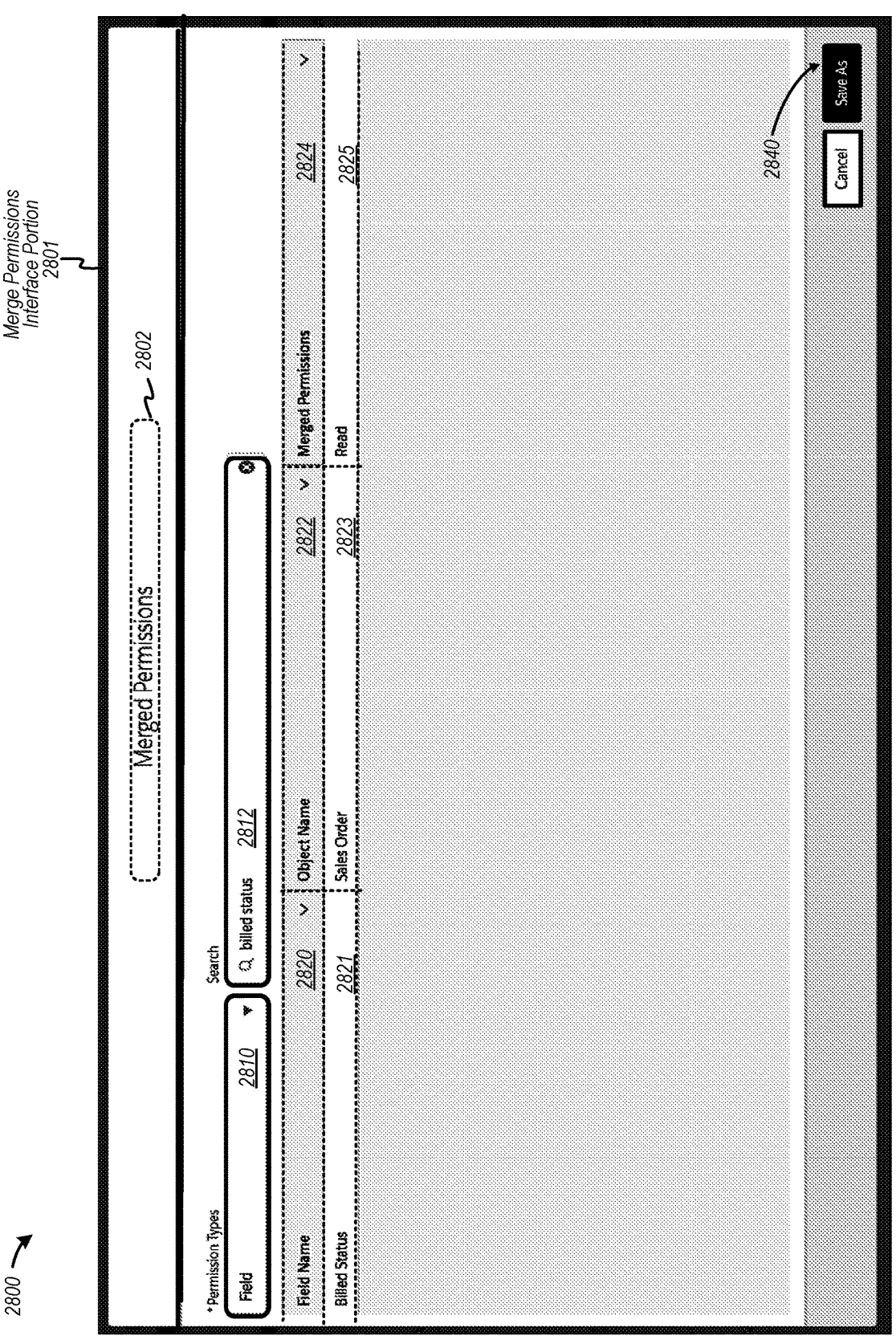

FIG. 28 is a diagram 2800 including a merged permissions interface portion 2801 configured to form merged permissions 2802. In the example shown, user input 2810 can be selected to search for a field in which "billed status" is entered into a search field 2812. A field name 2820 associated with an object name 2822 illustrates that data representing a billed status 2821 associated with an object ("sales order") 2823 has a merged permission 2824 as a "read" permission 2825. User input 2840 is configured to save merged permission 2824 for field name "billed status."

Figure 29:
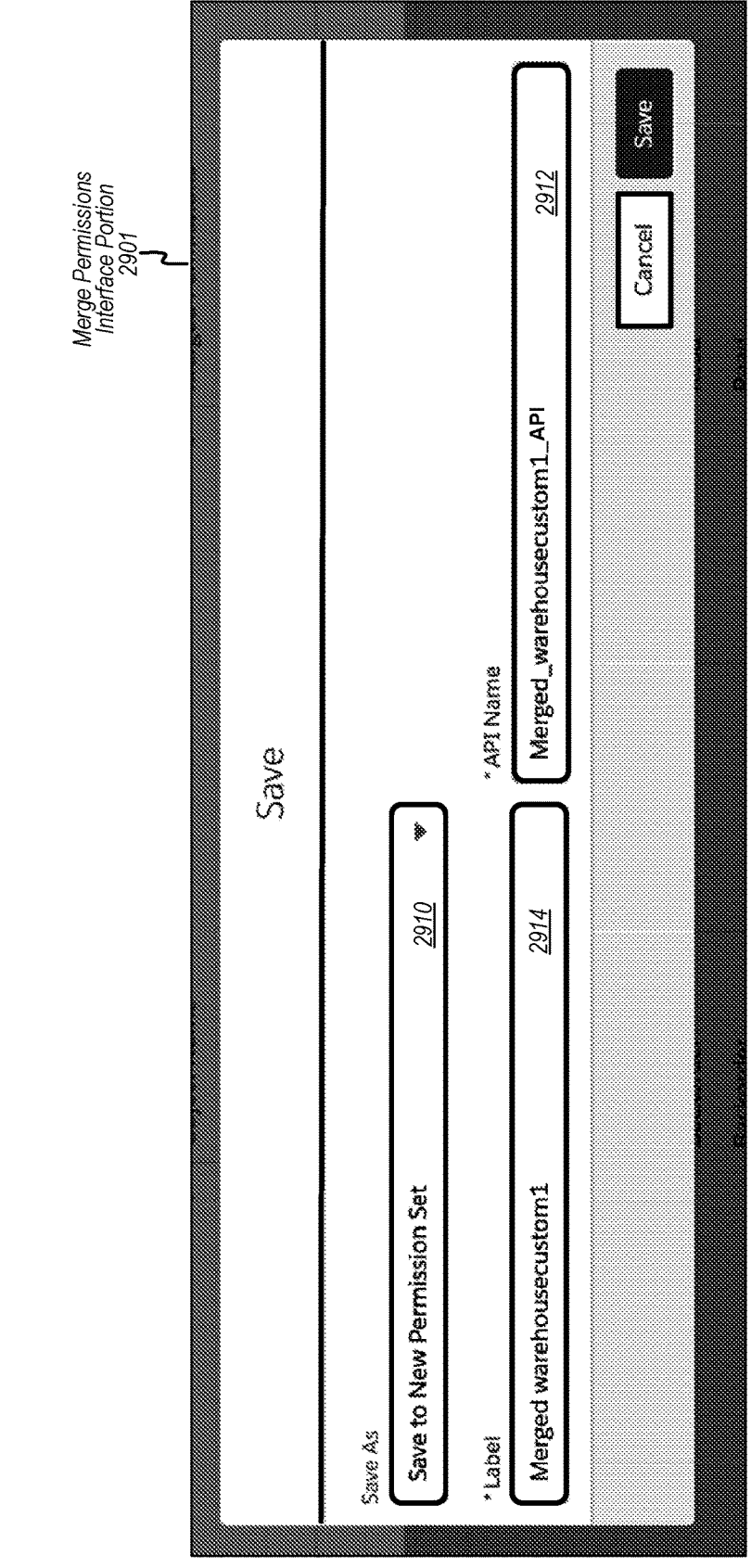

FIG. 29 is a diagram 2900 that depicts a merged permissions interface portion 2901 configured to save a merged permission using a new permission set user input 2910. The merge permission as a label or object name 2914 of "Merged warehousecustom1." A permission workbench application may be configured to generate a new API 2912 directed to a new merged permission set, such as "Merged_warehousecustom1_API."

Figure 30:
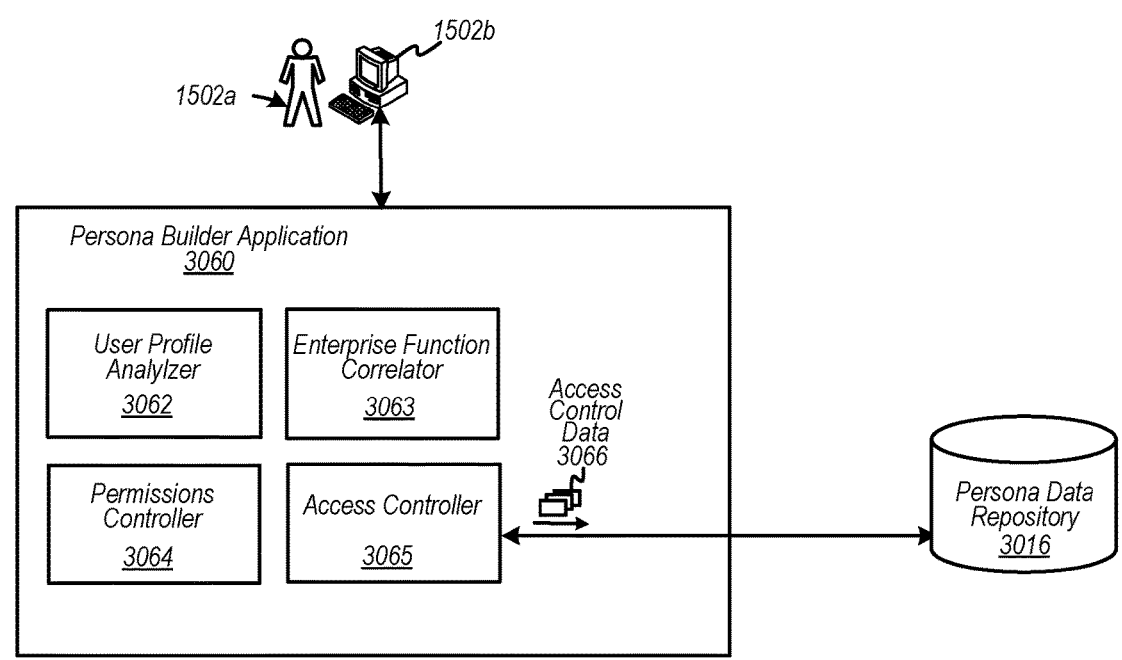
FIG. 30 is a diagram depicting an example of a persona builder application configured to generate access control data associated with a persona, according to some examples.

FIG. 30 is a diagram depicting an example of a persona builder application configured to generate access control data associated with a persona, according to some examples. Diagram 3000 illustrates a persona builder application framework 3060 with which a user, such as a system administrator 1502*a*, may access via computing device 1502*b*. Persona builder application framework 3060 may be implemented as a portion of enterprise data computing platform, such as within enterprise foundational engine 1540 of FIG. 15. Persona builder application framework 3060 of FIG. 30 may include executable instructions to implement a user profile analyzer 3062, an enterprise function correlator 3063, a permissions controller 3064, and an access controller 3065 configured to generate access control data 3066, which may be stored in persona data repository 3016. User profile analyzer 3062 may be configured to analyze user input and attributes relating to a user, including roles or other data representing a user profile. Enterprise function correlator 3063 may be configured to correlate one or more enterprise functions, tasks (e.g., data representing task objects), process flows, etc. for generating data representing a persona. Permissions controller 3064 may be configured to assign one or more permissions to a persona. Access controller 3065 may be configured to generate access control data 3066 as a function of a user profile, a role, a set of one or more permissions, a persona, etc., whereby access control data 3066 may be implemented to control access or filter access to, for example, one or more enterprise applications (and portions thereof). An example of enterprise application may include a workspace builder application.

Figure 31:
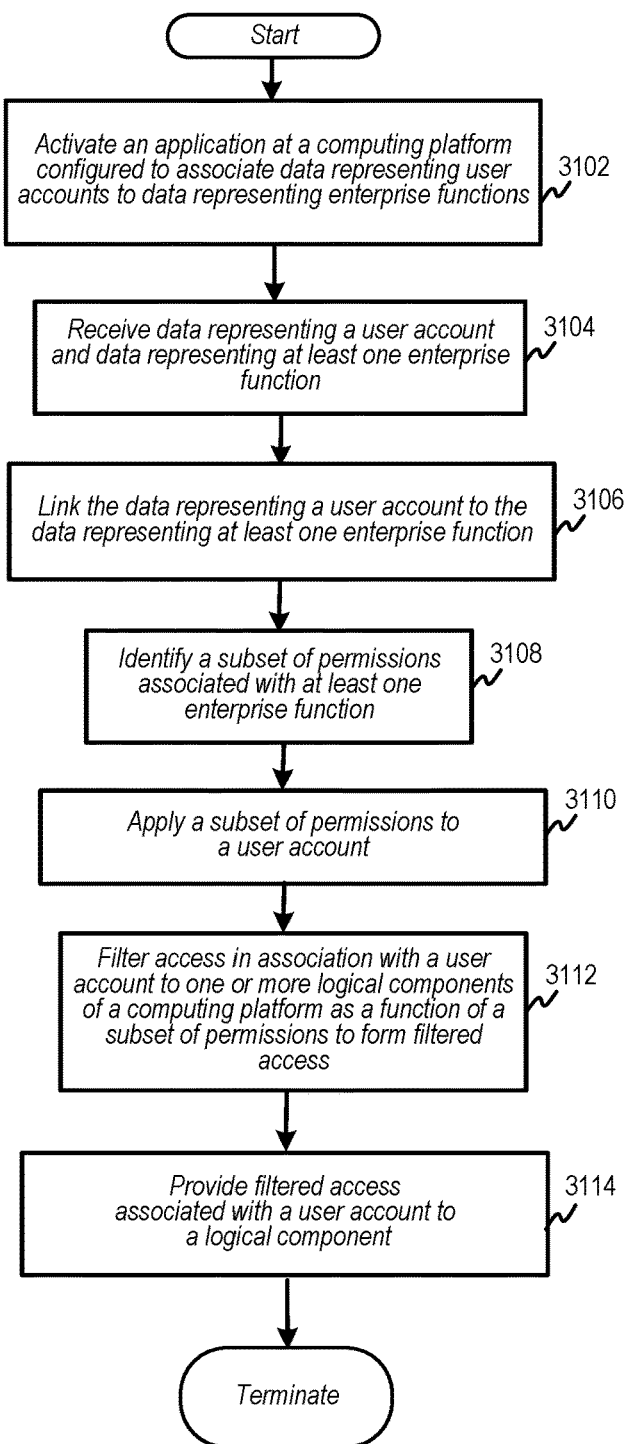
FIG. 31 is a flow diagram as an example of implementing an application configured to configure, manage, and identify data representing personas associated with one or more data objects configured to manage enterprise processes, according to some embodiments.

FIG. 31 is a flow diagram as an example of implementing an application configured to configure, manage, and identify data representing personas associated with one or more data objects configured to manage enterprise processes, according to some embodiments. In some examples, a persona may include data representing a persona data object that may include role data (e.g., representing a role or task in an enterprise) or business process data representing a business process, or a combination there between. In particular, data representing a persona data object may include data representing a role or a portion of a functional flow in an organization based on skills of a user in a role as well as accessibility to perform one or more functions in a workflow in an enterprise. In at least one example, a user account associated with a user and user profile may include data representing various attributes of the user as a portion of role data representing one or more enterprise functions or roles to perform a task of a business or organization. Business process data may include data representing a process in any organization, such as depicted in FIG. 33, any of which may be associated with a role or a user account. A business process may be configured to conform to "best practices," such as defined by financial planning and analysis ("FP&A") with which to execute business applications to provide planning, forecasting, budgeting, and analytical activities of an enterprise. In some examples, a persona data object includes data representing permissions and roles within the organization to facilitate presentation of a workspace application.

At 3102 of flow 3100, an application at a computing platform, such as a persona builder application, may be activated to identify or assign data representing a persona in association with a data object, such as a component data object, which may represent a user or user account linked to role, permissions, workbench applications, and the like. In some examples, a component data object may include data as an object as described herein, and, in some instances, may be implemented to support enterprise data management via a workspace interface of a computerized tool, such as a computerized tool implemented in association with an enterprise data computing platform interacting with a CRM application. As an example, a persona builder application may be activated to assign data representing a persona to a data object may constitute at least assigning a component data object with which to customize a workspace interface computerized tool for use to implement a user profile, a process flow (e.g., a business process flow), a permission set, or the like. In some examples, a persona builder application may be configured to manage personas over a CRM and ERP applications or any other application.

At 3104, data representing a user account and data representing at least one enterprise function (e.g., a role or business process) may be received at, for example, a persona builder application. In some cases, persona data representing a role associated with an element of a process (e.g., a business process) may define interactions with other personas (e.g., other roles, other users, other applications, other permissions, etc.) based on the subset of permissions. At 3106, data representing a user account may be linked to data representing at least one enterprise function or task object. In some cases, linking a user account to an enterprise function may form a subset of data representing a persona or a persona data object, which may be stored in a data arrangement constituting an enterprise data model that includes any number of component data objects.

At 3108, a subset of permissions associated with at least one enterprise function, task, role, or business process may be identified and may be linked or otherwise applied to a user account at 3110. At 3112, access to one or more logical components of a computing platform may be filtered based on a user account and as a function of a subset of permissions to form filtered access. A logical component may include any application or sub-application, or a portion of code, configured to facilitate analysis and implementation of enterprise data as described herein. In some examples, a logical component may constitute a portion of the component data object, and may include an application or a portion thereof. In other examples, a logical component may include data representing a workspace as well as any component thereof, including a navigational component. In at least one instance, a logical component may include data representing a page layout based on executable instructions exchanged via an API with an underlying platform application, such as a CRM application. In some examples, a page layout may be configured as an interface including an arrangement of visual elements as a computerized tool with which to interact with one or more enterprise and CRM applications. The visual elements may include user inputs and user outputs. At 3114, filtered access may be provided to a user account to access a logical component of an enterprise computing platform or application, such as a workspace interface or any other computerized tool.

FIG. 32 is a flow diagram as another example of implementing an application configured to configure, manage, and identify data representing personas associated with one or more data objects configured to manage enterprise processes, according to some embodiments. At 3202 of flow 3200, a number of actions or tasks in a process flow may be defined. Each action or task may be associated with data representing a task data object, which includes data representing an enterprise function or role which an enterprise application (e.g., an ERP or PSA application) may use to perform a data operation. At 3204, each action or task may be represented as a task data object assigned to a subset of data representing a role (e.g., project management, accounting, inventory management, resource management, sales, marketing, etc.).

At 3206, data representing a persona may be formed based on one or more task data objects and data representing user account, which may be based on user profile data describing any attribute of a user (e.g., a name, a geographic location, a role, a title, a phone number, an email address, etc.). Also, an attribute of a user may also include data representing other roles with which a user may interact with, such as a resource manager, a human resource manager, a finance specialist, a salesperson, any customer, any subcontractor, any vendor, etc. Such other roles may be defined by flow links, such as depicted in FIG. 33.

At 3208 of FIG. 32, one or more actions or tasks may be identified, whereby a performance of one or more actions or tasks may be associated with a user account and related roles. At 3210, data representing a persona may be linked to data representing one or more permissions to access one or more logical components of an enterprise data computing platform. At 3212, data representing one or more permissions may be applied to persona to modulate access by a user associated with the user account. Hence, access by a user may be modulated to filter access to one or more logical components or one or more applications implementing component data objects. As an example, a user may have access to a subset of enterprise applications and portions thereof based roles, permissions, etc., as defined by a persona and data representing a persona data object. At 3214, filtered access to one or more logical components may be based on one or more permissions or other persona-related data.

FIG. 33 is a diagram depicting a process flow and sub-flows associated with an enterprise and personas linked to task data objects, according to some examples. Diagram 3300 depicts a process flow 3301 for processing a sales opportunity as an example of one process flow and is not intended to be limiting. That is, any number of process flows may be developed, created, managed, and executed using an enterprise application over any number of roles, users, and enterprise functions. As shown, sales representative persona data 3302 may be associated with a sales flow including sales flow tasks 3320, project manager persona data 3304 may be associated with a project management flow including project flow tasks 3340, and resource manager persona data 3306 may be associated with a resource management flow depicted in resource flow tasks 3360. Note that subsets of persona data 3302, 3304, and 3306 provide permissions and access to applications associated with each of the personas. In one example, subsets of persona data 3302, 3304, and 3306 may be implemented to generate personalized workspace interfaces corresponding to a role of a user. In some examples, a workspace builder application (not shown) may access data representing a business process, such as process flow 3301, to implement a personalized or workspace interface configured for a subset of permissions or a set of roles and responsibilities of a user.

As shown, process flow 3301 may begin at 3341 when, for example, a project manager learns of a sales opportunity and generates task object 3342 to request available sales resources to leverage a sales opportunity. Task objects 3362, 3364, and 3366 may be implemented via a flow link 3352 as part of resource flow tasks 3360 as assigned to a resource manager (e.g., a human resource manager) associated with resource manager persona data 3306. Process flow 3301 continues via flow link 3354 to task objects 3344, 3346, and 3348, which are performed as part of project flow tasks 3340 associated with a user having, for example, a role of a project manager. Thereafter, process flow 3301 continues via flow link 3356 to task object 3322 as a part of sales flow tasks 3320, thereby completing process flow 3301 at end point 3324.

In at least one cases, business processes, such as process flow 3301, may be configured to conform to "best practices," such as defined by financial planning and analysis ("FP&A") techniques as pre-configured solutions, with metrics describing, for example, key performance indicators ("KPIs") or any other type of data associated with component data object with which to manage data operations of an enterprise application. For example, process flow 3301 may be configured to manage a number of opportunities as well as an amount of revenue that may be at risk. Or process flow 3301 may be configured to manage a number of resources that are available during a period of time.

In some examples, an enterprise computing platform may configured to implement any machine learning algorithm, deep-learning algorithm, or any other predictive algorithm (e.g., Bayesian, etc.), including, but not limited to algorithms implementing support vector machines ("SVMs"), various types of neural networks (e.g., convolutional neural networks ("CNN"), recurrent neural networks ("RNN"), artificial neural networks ("ANN"), and the like), various regression techniques, various k-means computations, or any other like algorithms. In one example, an enterprise computing platform may be configured to determine optimized flow links among various roles and task object based on analyzing data patterns of interactions among various users or roles (e.g., via email, phone calls, etc.) that may be matched against machine-predicted patterns or against a set of one or more rules to generate optimized business process flows.

Figure 34:
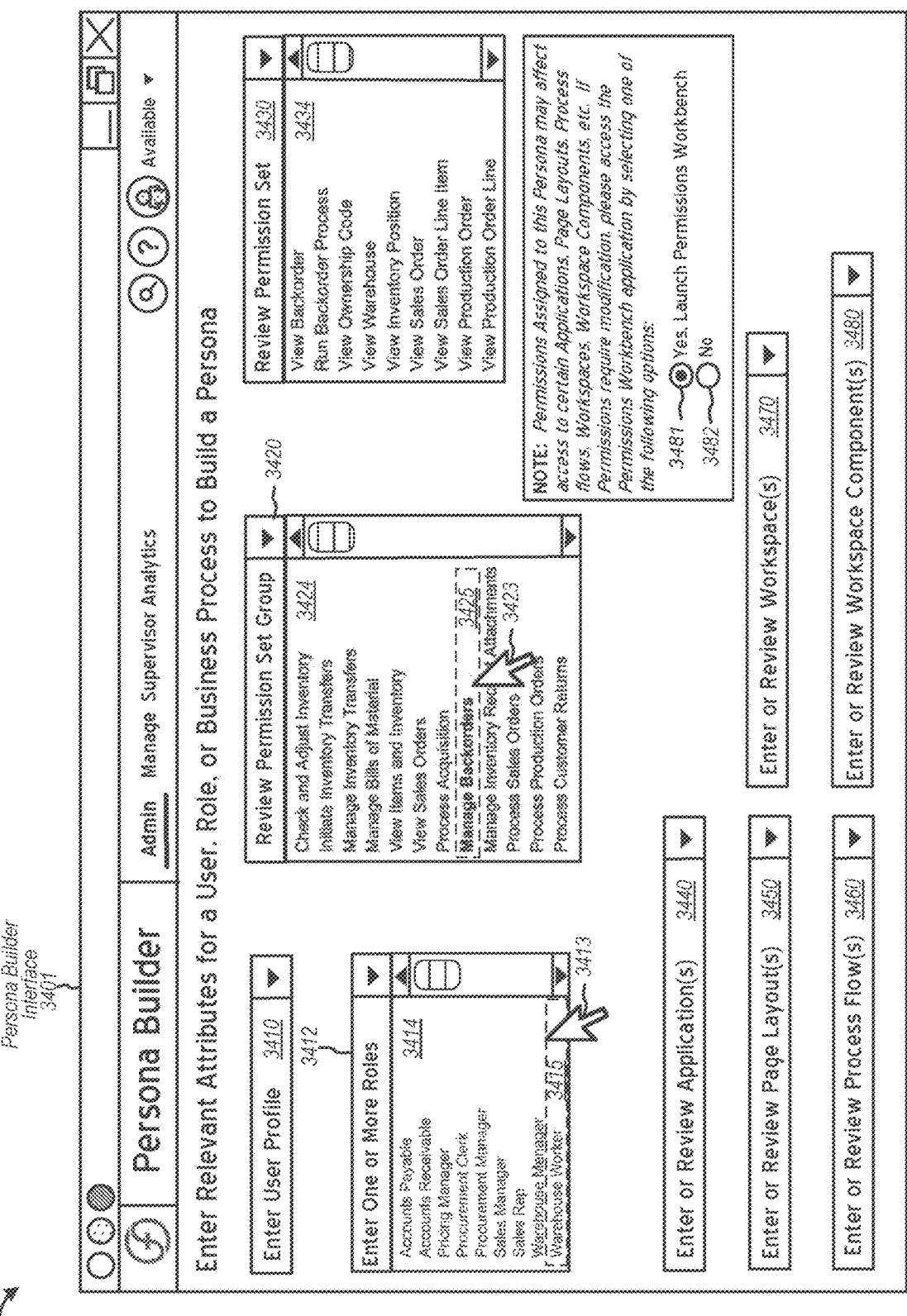
FIG. 34 is a diagram depicting an example of a persona builder interface as a computerized tool, according to some examples.

FIG. 34 is a diagram depicting an example of a persona builder interface as a computerized tool, according to some examples. Diagram 3400 includes a persona builder interface 3401 configured to generate data representing personas with which to provide access by one or more users to one or more permissions, one or more roles, one or more applications, one or more process flows, one or more workspace interfaces, one or more workspace components, etc. Persona builder interface 3401 is an example and is not intended to be limiting. As shown, persona builder interface 3401 includes a number of user inputs in the form of pull-down or dropdown menus for providing data to cause a persona builder application to generate data representing a persona.

In the example shown, user input 3410 may be configured to enter various attributes of a user profile. User input 3412 may be configured to present a number of roles 3414 from which a role ("warehouse worker") 3415 may be selected by selectable tool 3413. User input 3420 may be configured to present a number of permission set groups 3424 from which a permission set group ("manage backorders") 3425 may be selected by selectable tool 3423. For permission set group 3425, user input 3430 may be configured to view and assign or more permissions 3434. User inputs 3481 and 3482 may be implemented to activate or launch a permissions workbench application to modify one or more permissions associated with a role or a user. User inputs 3440 may be implemented to configure accessibility of one or more applications associated with a persona. User inputs 3450 may be implemented to configure accessibility of one or more page layouts associated with a persona. User inputs 3460 may be configured to modify access to one or more process flows associated with a persona. User inputs 3470 may be implemented to configure access to one or more workspace interfaces associated with a persona, whereby user inputs 3480 may be configured to modify access to one or more workspace components associated with one or more workspace interfaces.

Figure 35:
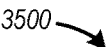
FIG. 35 depicts an example of a system architecture configured to facilitate implementation of an enterprise data model to generate and manage component data objects representing enterprise tasks and processes, as well as portions thereof, by using, for example, a workspace interface as a computerized tool, which may be based on a permission or a persona, according to some examples.

FIG. 35 depicts an example of a system architecture 3500 configured to facilitate implementation of an enterprise data model to generate and manage component data objects representing enterprise tasks and processes, as well as portions thereof, by using, for example, a workspace interface as a computerized tool, which may be based on a permission or a persona, according to some examples.

Data constituting executable instructions (e.g., remote applications) and other content, such as text, video, audio, etc. may be stored in (or exchanged with) various communication channels or storage devices. Further, data configured to correlate subsets of permissions and subset of personas to generate workspaces as computerized tools that may be derived from a variety of data sources. For example, various units of message data or content may be stored or implemented using one or more of a web application 3524 (e.g., a public data source, such as a news aggregation web site), an email application service 3526, an electronic messaging application 3528 (e.g., a texting or messenger application), social networking services 3530 and a services platform and repository 3532 (e.g., cloud computing services provided by Google® cloud platform, an AWS® directory service provided by Amazon Web Services, Inc., or any other platform service, such as Salesforce.com, Inc. CRM cloud-based applications). A server 3515 may implement an enterprise data computing platform application 3550 to perform various functionalities as described herein. As an example, server 3515 may be a web server or any other type of server configured to provide the applications 3550 via networks 3510. As an example, a client computing device may be implemented and/or embodied in a computing device 3505, a mobile computing device 3506 (e.g., a smart phone), a wearable computing device 3507, or other computing device. Any of these client computing devices 3505 to 3507 may be configured to transmit electronic messages and content (e.g., as electronic text or documents, video content, audio content, or the like) from data store 3516, and may be configured to receive content (e.g., other electronic content), whereby enterprise data computing platform application 3550 may be configured to facilitate implementation of an enterprise data model to generate and manage component data objects representing enterprise tasks and processes, as well as portions thereof. Further, enterprise data computing platform application 3550 may be configured to use, create, and modify an enterprise data flow or a process flow, for example, using an enterprise computerized tool based on, for example, a subset of permissions or a persona, as set forth herein.

Figure 36:
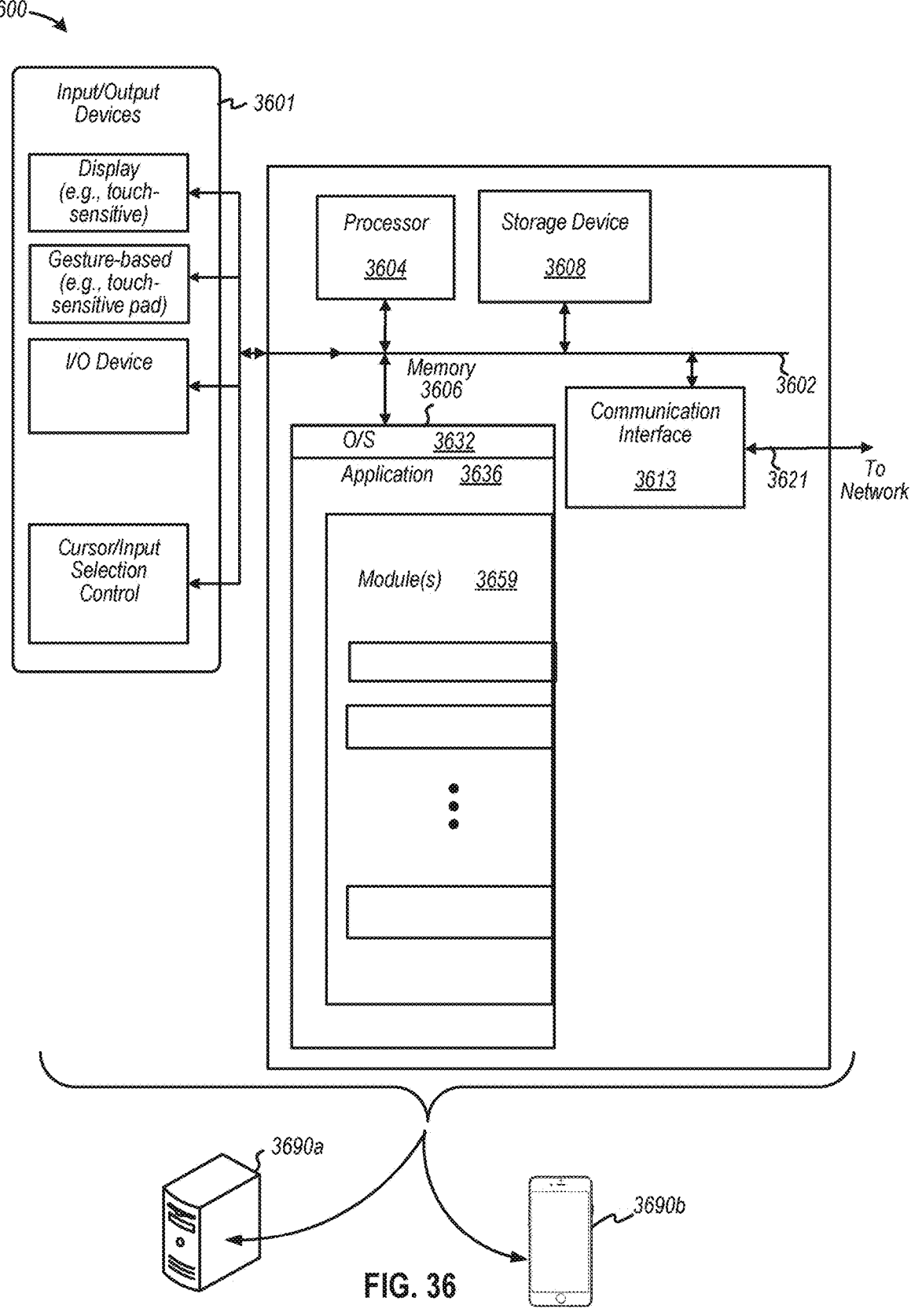
FIG. 36 illustrates examples of various computing platforms configured to provide various functionalities to components of a computing platform configured to provide functionalities described herein.

FIG. 36 illustrates examples of various computing platforms configured to provide various functionalities to components of a computing platform 3600 configured to provide functionalities described herein. Computing platform 3600 may be used to implement computer programs, applications, methods, processes, algorithms, or other software, as well as any hardware implementation thereof, to perform the above-described techniques.

In some cases, computing platform 3600 or any portion (e.g., any structural or functional portion) can be disposed in any device, such as a computing device 3690a, mobile computing device 3690b, and/or a processing circuit in association with initiating any of the functionalities described herein, via user interfaces and user interface elements or components, according to various examples.

Computing platform 3600 includes a bus 3602 or other communication mechanism for communicating information, which interconnects subsystems and devices, such as processor 3604, system memory 3606 (e.g., RAM, etc.), storage device 3608 (e.g., ROM, etc.), an in-memory cache (which may be implemented in RAM 3606 or other portions of computing platform 3600), a communication interface 3613 (e.g., an Ethernet or wireless controller, a Bluetooth controller, NFC logic, etc.) to facilitate communications via a port on communication link 3621 to communicate, for example, with a computing device, including mobile computing and/or communication devices with processors, including database devices (e.g., storage devices configured to store data in any data arrangement in accordance with any data model, as described herein. Processor 3604 can be implemented as one or more graphics processing units ("GPUs"), as one or more central processing units ("CPUs"), such as those manufactured by Intel® Corporation, or as one or more virtual processors, as well as any combination of CPUs and virtual processors. Or, a processor may include a Tensor Processing Unit ("TPU"), or equivalent. Computing platform 3600 exchanges data representing inputs and outputs via input-and-output devices 3601, including, but not limited to, keyboards, mice, audio inputs (e.g., speech-to-text driven devices), user interfaces, displays, monitors, cursors, touch-sensitive displays, touch-sensitive input and outputs (e.g., touch pads), LCD or LED displays, and other I/O-related devices.

Note that in some examples, input-and-output devices 3601 may be implemented as, or otherwise substituted with, a user interface in a computing device associated with, for example, a user account identifier in accordance with the various examples described herein.

According to some examples, computing platform 3600 performs specific operations by processor 3604 executing one or more sequences of one or more instructions stored in system memory 3606, and computing platform 3600 can be implemented in a client-server arrangement, peer-to-peer arrangement, or as any mobile computing device, including smart phones and the like. Such instructions or data may be read into system memory 3606 from another computer readable medium, such as storage device 3608. In some examples, hard-wired circuitry may be used in place of or in combination with software instructions for implementation. Instructions may be embedded in software or firmware. The term "computer readable medium" refers to any tangible medium that participates in providing instructions to processor 3604 for execution. Such a medium may take many forms, including but not limited to, non-volatile media and volatile media. Non-volatile media includes, for example, optical or magnetic disks and the like. Volatile media includes dynamic memory, such as system memory 3606.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 3602 for transmitting a computer data signal.

In some examples, execution of the sequences of instructions may be performed by computing platform 3600. According to some examples, computing platform 3600 can be coupled by communication link 3621 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 3600 may transmit and receive messages, data, and instructions, including program code (e.g., application code) through communication link 3621 and communication interface 3613. Received program code may be executed by processor 3604 as it is received, and/or stored in system memory 3606 or other non-volatile storage for later execution.

In the example shown, system memory 3606 can include various modules that include executable instructions to implement functionalities described herein. System memory 3606 may include any operating system ("O/S") 3632, as well as any application 3636 and/or logic module(s) 3659. In the example shown in FIG. 36, system memory 3606 may include any number of modules 3659, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. These can be varied and are not limited to the examples or descriptions provided.

In some embodiments, modules 3659 of FIG. 36, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 3659 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 3659 or one or more of its/their components, or any process or device described herein, can be implemented in one or more computing devices (i.e., any mobile computing device, such as a wearable device, such as a hat or headband, or mobile phone, whether worn or carried) that may include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit. For example, modules 3659 or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method comprising:

activating an application at a computing platform configured to identify a permission in association with a data object to facilitate access to one or more logical components of the computing platform;

identifying data representing an enterprise function data object;

accessing a first subset of permissions via an application programming interface ("API") associated with the enterprise function data object;

accessing a second subset of permissions;

detecting an upgrade or versioning of one or more applications associated with the computing platform, the detecting being performed by a version transition manager application associated with the computing platform;

based on the detected upgrade or versioning of the one or more applications associated with the computing platform, automatically generating a control data signal to perform a data operation based on the first subset of permissions and the second subset of permissions by:

comparing data representing the first subset of permissions and the second subset of permissions; and detecting a distinct permission in either the first subset of permissions or the second subset of permissions, or both;

based on the detected upgrade or versioning of the one or more applications, automatically reconciling the first subset of permissions and the second subset of permissions, so as to maintain permissions throughout the detected upgrade or versioning;

generating a third subset of one or more permissions based on the data operation; and applying the third subset of the one or more permissions to the data object to control functionality in association with the enterprise function data object.

2. The method of claim 1 wherein the identifying data representing the enterprise function data object comprises:

identifying data representing either a persona including data representing a role for a user or a process flow including data representing an enterprise process, or both.

3. The method of claim 1 wherein the detecting the distinct permission in either the first subset of permissions or the second subset of permissions, or both comprises:

deleting the distinct permission in either the first subset of permissions or the second subset of permissions, or both, to form the third subset of permissions excluding the distinct permission.

4. The method of claim 1 wherein the detecting the distinct permission in either the first subset of permissions or the second subset of permissions, or both comprises:

adding the distinct permission in either the first subset of permissions or the second subset of permissions, or both, to form the third subset of permissions including the distinct permission.

5. The method of claim 1 wherein the automatically generating the control data signal to perform the data operation comprises:

merging data representing the first subset of permissions and the second subset of permissions to form the third subset of permissions.

6. The method of claim 1 wherein the applying the third subset of the one or more permissions to the data object associated with the enterprise function data object further comprises:

generating a permissions set data model configured to store data representing subsets of permissions from a first version to a second version of the computing platform.

7. The method of claim 6 wherein the computing platform is associated with an enterprise data computing platform in electronic communication with a networked customer relationship management ("CRM") application.

8. The method of claim 1 wherein the applying the third subset of the one or more permissions to the data object associated with the enterprise function data object further comprises:

generating a permissions set data model configured to store data representing subsets of permissions from a first version to a second version of application data, the permissions set data model including data representing the permission in association with the data object.

9. The method of claim 8 wherein the application data is associated with a workspace builder application.

10. The method of claim 1 wherein the activating the application comprises:

activating a permissions workbench application.

11. The method of claim 1 wherein the automatically generating the control data signal comprises:

receiving the control data signal originating at a user interface configured to exchange data with a permissions workbench application.

12. The method of claim 1 wherein the automatically generating the control data signal comprises:

receiving the control data signal automatically responsive to executable instructions configured to implement a version transition manager application.

13. The method of claim 1 wherein the accessing the first subset of permissions comprises:

accessing permissions via the API associated with a networked customer relationship management ("CRM") application.

14. The method of claim 1 wherein the accessing the first subset of permissions comprises:

accessing permissions via the API associated with a third party application.

15. A system comprising:

a data store configured to store executable instructions; and a processor configured to implement the executable instructions to implement an application configured to:

activate an application at a computing platform configured to assign a permission in association with a data object to facilitate access one or more logical components of the computing platform;

identify data representing an enterprise function data object; access a first subset of permissions via an application programming interface ("API") associated with the enterprise function data object;

access a second sub set of permissions;

detect an upgrade or versioning of one or more applications associated with the computing platform, the detecting being performed by a version transition manager application associated with the computing platform;

based on the detected upgrade or versioning of the one or more applications associated with the computing platform, automatically generate a control data signal to perform a data operation based on the first subset of permissions and the second subset of permissions by:

comparing data representing the first subset of permissions and the second subset of permissions; and detecting a distinct permission in either the first subset of permissions or the second subset of permissions, or both;

based on the detected upgrade or versioning of the one or more applications, automatically reconcile the first subset of permissions and the second subset of permissions, so as to maintain permissions throughout the detected upgrade or versioning;

generate a third subset of the one or more permissions based on the data operation; and apply the third subset of the one or more permissions to the data object to control functionality associated with the enterprise function data object.

16. The system of claim 15 wherein the processor is further configured to:

identify data representing the enterprise function data object as including data representing either a persona including data representing a role for a user or a business process flow including data representing an enterprise process, or both.

17. The system of claim 15 wherein the processor is further configured to:

merge data representing the first subset of permissions and the second subset of permissions to form the third subset of permissions.

18. The system of claim 15 wherein the processor is further configured to:

receive the control data signal automatically responsive to the executable instruction configured to implement a version transition manager application.

* * * * *